US011580162B2

(12) United States Patent
Ganeshan et al.

(10) Patent No.: US 11,580,162 B2
(45) Date of Patent: Feb. 14, 2023

(54) KEY VALUE APPEND

(71) Applicant: Stellus Technologies, Inc., San Jose, CA (US)

(72) Inventors: Balakrishnan Ganeshan, Foster City, CA (US); Alex Dininno, Morgan Hill, CA (US); Giridhar G. Basava, Sammamish, WA (US)

(73) Assignee: SAMSUNG ELECTRONICS CO., LTD.

(*) Notice: Subject to any disclaimer, the term of this patent is extended or adjusted under 35 U.S.C. 154(b) by 729 days.

(21) Appl. No.: 16/440,978

(22) Filed: Jun. 13, 2019

(65) Prior Publication Data

US 2020/0334292 A1  Oct. 22, 2020

Related U.S. Application Data

(60) Provisional application No. 62/836,065, filed on Apr. 18, 2019.

(51) Int. Cl.
*G06F 16/90* (2019.01)
*G06F 16/901* (2019.01)
*G06F 16/907* (2019.01)
*G06F 9/54* (2006.01)
*G06F 3/06* (2006.01)

(52) U.S. Cl.
CPC ........ *G06F 16/9014* (2019.01); *G06F 3/0604* (2013.01); *G06F 3/0644* (2013.01); *G06F 3/0679* (2013.01); *G06F 9/54* (2013.01); *G06F 16/907* (2019.01)

(58) Field of Classification Search
CPC ... G06F 16/9014; G06F 16/907; G06F 3/0604
See application file for complete search history.

(56) References Cited

U.S. PATENT DOCUMENTS

| | | | |
|---|---|---|---|
| 6,061,690 A * | 5/2000 | Nori | G06F 16/2219 707/999.005 |
| 8,700,683 B2 | 4/2014 | Cooney et al. | |
| 8,924,663 B2 | 12/2014 | Szczepkowski et al. | |
| 9,361,408 B2 | 6/2016 | Marukame et al. | |
| 9,977,600 B1 | 5/2018 | Sanvido et al. | |
| 10,019,504 B2 | 7/2018 | Huang et al. | |
| 10,169,387 B1 | 1/2019 | Zhao et al. | |

(Continued)

OTHER PUBLICATIONS

Metreveli, Zviad, "CPHash: A Cache-Partitioned Hash Table with LRU Eviction," Department of Electrical Engineering and Computer Science, Jun. 2011, 47 pages.

(Continued)

*Primary Examiner* — Loc Tran
(74) *Attorney, Agent, or Firm* — Renaissance IP Law Group LLP

(57) ABSTRACT

Software that may be implemented using a circuit is disclosed. The software may include an Application Programming Interface (API) to receive a request from an application relating to a key-value pair for a Key-Value Solid State Drive (KV-SSD). The key-value pair may include a key and a value; the application may be executed by a processor. The software may also include combiner software to combine the key with an index to produce an indexed key, and execution software to execute an operation on the KV-SSD using the indexed key and the value.

18 Claims, 28 Drawing Sheets

(56) References Cited

U.S. PATENT DOCUMENTS

| | | |
|---|---|---|
| 2013/0250686 A1* | 9/2013 | Marukame ............ G06F 3/0644 |
| | | 365/185.12 |
| 2016/0041918 A1 | 2/2016 | Jeong et al. |
| 2016/0099810 A1 | 4/2016 | Li et al. |
| 2016/0203102 A1 | 7/2016 | Meng et al. |
| 2016/0335299 A1 | 11/2016 | Vemulapati et al. |
| 2016/0350302 A1 | 12/2016 | Lakshman |
| 2017/0139594 A1 | 5/2017 | Ahn et al. |
| 2017/0192892 A1 | 7/2017 | Pundir et al. |
| 2017/0220572 A1 | 8/2017 | Ding et al. |
| 2017/0255508 A1 | 9/2017 | Lee et al. |
| 2018/0089244 A1 | 3/2018 | Velayudhan Pillai et al. |
| 2018/0218023 A1 | 8/2018 | Fanghaenel et al. |
| 2018/0285376 A1 | 10/2018 | Duan et al. |
| 2019/0014188 A1 | 1/2019 | Schreter |
| 2019/0042571 A1 | 2/2019 | Li et al. |
| 2019/0384530 A1* | 12/2019 | Twitto .................. G06F 3/0604 |
| 2020/0210114 A1* | 7/2020 | Hu ...................... G06F 16/2379 |

OTHER PUBLICATIONS

Wu, Chin-Hsien, et al., "An Efficient B-Tree Layer for Flash-Memory Storage Systems," ACM Transactions on Embedded Computing Systems 6(3), Jul. 2007, 20 pages.

* cited by examiner

KEY VALUE APPEND

RELATED APPLICATION DATA

This application claims the benefit of U.S. Provisional Patent Application Ser. No. 62/836,065, filed Apr. 18, 2019, which is incorporated by reference herein for all purposes.

FIELD

The inventive concepts relate generally to computer systems, and more particularly to enhancing the functionality of Key-Value Solid State Drives (KV-SSDs).

BACKGROUND

Key-value stores are the simplest form of database management systems. They may store pairs of keys and values, as well as retrieve values when a key is known. These simple systems are normally not adequate for complex applications without additional features. For example, these systems do not support appending values to keys.

A need remains to support append operations for key-value stores.

DETAILED DESCRIPTION

Figure 1:
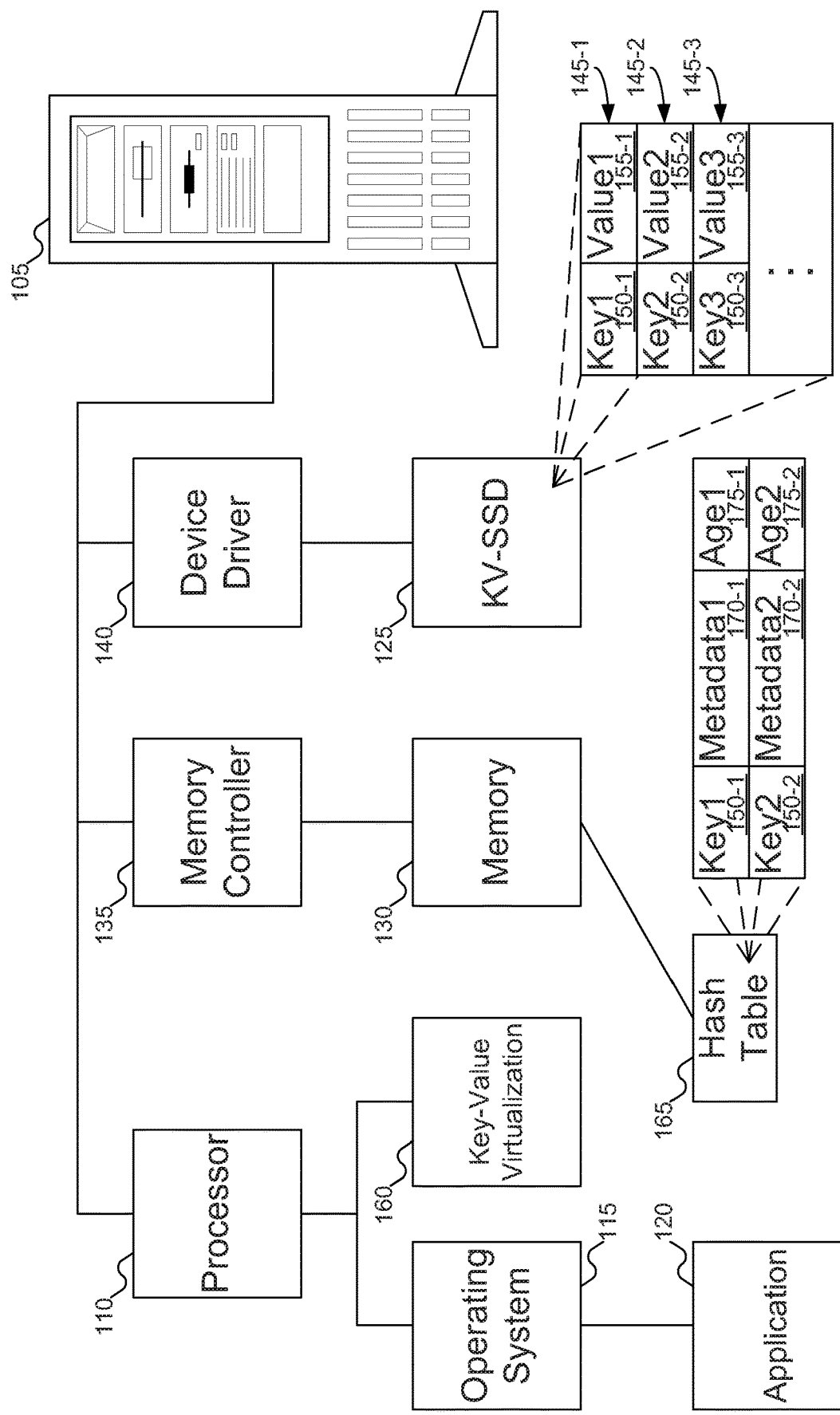
FIG. 1 shows a machine designed to support append operations to values stored in a Key-Value Solid State Drive (KV-SSD) using a Key Value Virtualization (KVV) layer, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

At a high level, the append functionality may write each append as a separate key value pair, maintaining an in-memory using a Least Recently Used (LRU) hash table. For durability, key metadata may prefix each value written to the KV-SSD. The architecture may be implemented as a layer between the application and the Key-Value Solid State Drive (KV-SSD)—for example, within the operating system or as a layer between the operating system and the KV-SSD—or within firmware on the KV-SSD itself.

To perform append operations, a separate key value pair may be written to the KV-SSD. The original key may be prefixed with two bytes of the sequence number ('append index') of the append index, although append indices of other lengths may be supported. When data is first written to the KV-SSD for a key, the append index used may be 0, or the key may be left unmodified.

For each key, an in-memory data structure may be maintained in a LRU hash table to keep track of the appends. In case the in-memory LRU hash table lacks room to store a new key, an existing key may be selected for eviction. Techniques described in papers such as "CPHash: A cache-partitioned hash table with LRU eviction", a Master's thesis submitted by Zviad Metreveli in the Department of Electrical Engineering and Computer Science at the Massachusetts Institute of Technology, which is incorporated by reference herein, may be implemented to provide a concurrency control in a multi core system. The size of the hash table may be a function of the number of keys that can be stored in a KV-SSD and the amount of memory available in the system. Least recently used keys may be evicted to make room for the new keys.

The metadata stored in the hash table may store current append information and a self-balancing binary search tree (or other data structure) with the information of all appends. An example data structure for metadata may be:

```
struct metadata
{
    unsigned int        cur_append_index;
    unsigned int        cur_append_offset;
    unsigned int        cur_append_length
    bin_search_tree     appends;
};
```

Each node in the tree (or other data structure) may contain a sequence number (append index), an offset, and the length of each append request. This representation of the metadata may improve the performance of the GET with an Offset.

The insertions into the self-balancing binary search tree (or other data structure) may be monotonically increasing with respect to the append index. When using self-balancing binary search trees, two popular choices are AVL trees and Red Black trees.

AVL Tree

In an AVL tree, the heights of the two child subtrees of any node differ by at most one; if at any time they differ by more than one, rebalancing is done to restore this property. Lookup, insertion, and deletion all take O(log n) time in both the average and worst cases, where 'n' is the number of nodes in the tree prior to the operation. Insertions and deletions may require the tree to be rebalanced by one or more tree rotations.

Red Black Tree

The balancing of the Red Black Tree is not perfect, but it is good enough to allow it to guarantee searching in O(log n) time, where 'n' is the total number of elements in the tree. The insertion and deletion operations, along with the tree rearrangement and recoloring, are also performed in O(log n) time. For monotonically increasing data, red and black tree gives good balance between insert and lookup performance. Since append indexes are monotonically increasing, Red and Black trees are a good way to keep track of the metadata.

To achieve a balance between the amount of memory required and cache misses, the maximum number of append operations may be fixed: for example, 1 K (1024) appends. This maximum number of appends may be configurable and may be a function of the number of keys, available memory and append requirements of the application.

Each appended value may be prefixed with the metadata for durability. Serialized 'metadata' may be encoded, prefixed to value, and written to the KV-SSD.

Important considerations may include system performance—minimizing the number of device read and write operations performed—and durability—ensuring that append operation is durable and recoverable.

In optimal situations, each append request may generate only one write Input/Output (I/O) request to the KV-SSD. If the metadata is not available in memory, the worst case should incur "log n" additional reads to retrieve the metadata from an append with a highest sequence number, where 'n' is the (configurable) maximum number of appends allowed.

Processing a PUT (Key1, Value, Overwrite) Request from the Application

1) Look up the metadata for Key1 in the hash table. If the Key1 metadata is not found in hash table, retrieve the Key1 metadata from the KV-SSD by performing a binary search to find the highest append index previously used.

2) If the Key1 metadata is not found, this must be a new key and a new entry in the hash table and a new instance of the Key1 metadata may be generated.

3) If the Key1 metadata is found:
  a) If the 'overwrite' flag is set, delete all appends of the existing key.
  b) If the 'overwrite' flag is not set, return 'key exists error' to the application.

4) If this is the first write for this key, set the append index as '0' and insert a new node (append index, offset of this append, length of value) into the Key1 metadata.

5) Prefix the append index to the key, prefix the serialized Key1 metadata to the value, and write them to the KV-SSD.

Processing an Append (Key1, Value) Request from the Application

1) Look up the metadata for Key1 in the hash table. If the Key1 metadata is not found in memory, retrieve the Key1 metadata from the KV-SSD by performing a binary search for the highest append index previously used.

2) If the Key1 metadata is not found, return 'key not found error' to the application.

3) If the Key1 metadata is found, increment the append index and insert a new node (append index, offset of this append, length of value) into the Key1 metadata.

Prefix the append index to the key, prefix the serialized Key1 metadata to the value, and write them to the KV-SSD.

Processing a Get (Key1) Request from the Application

1) Look up the metadata for Key1 in the hash table. If the Key1 metadata is not found in the hash table, perform a binary search to find the highest append index and retrieve the Key1 metadata from the KV-SSD.

2) If the Key1 metadata is not found in the KV-SSD, return an error to the application.

3) Leveraging the information in the Key1 metadata, the entire value of the key may be assembled by retrieving the values of all appends. Applications may also have a choice of receiving an iterator that enables retrieval of one append at a time.

Note: The capability of KV-SSD's 'GET with an OFFSET' may improve performance by avoiding memory copies.

Processing a Delete (Key1, Value, Overwrite) request from the application

1) Look up the metadata for Key1 in the hash table. If the Key1 metadata is not found in memory, retrieve the Key1 metadata from the KV-SSD by performing a binary search for the highest append index previously used.

2) If the Key1 metadata is not found, return 'key not found error' to the application.

3) If the Key1 metadata is found, delete all appends of the Key (including the original write request with append index 0000).

4) Alternatively, since the objective is to delete all the append requests, delete requests may be issued to the KV-SSD starting with append index 0000 until the KV-SSD returns a 'key not found' error, without first searching for the highest append index.

Embodiments of the inventive concept support the following technical advantages. First, embodiments of the inventive concept introduce an append semantic that is currently not offered by KV-SSDs. Second, the append semantic protects against data loss or data corruption—for example, in case of a power failure. Third, the append semantic avoids the performance penalty associated with a conventional Read-Modify-Write sequence to append new data to a value. Fourth, the append semantic enables storing data values that exceed the maximum object size of the KV-SSD without the application having to manage the data storage into multiple objects.

Additional optimizations are also possible:

1) The hash table may be periodically flushed, which may reduce the binary searches required to recover the metadata in case of power failure and other error conditions.

2) The hash table may be stored in persistent memory (either in main memory or within persistent memory in the KV-SSD controller), which may avoid the need for the LRU hash table and the need to rebuild the metadata in case of a power failure.

3) Advanced technologies may be used to store the hash table and associated metadata somewhere on the KV-SSD, thus eliminating need for third party non-volatile memory technologies.

4) Instead of using a standard LRU replacement algorithm, the selection of data for eviction from the hash table may use another algorithm, such as a weighted LRU replacement algorithm.

5) To avoid the (configurable, but otherwise fixed) maximum number of appends, cascaded appends may be used to store more data.

6) A bloom filter may be used to improve the performance in case of keys without any appends.

7) Rather than searching the KV-SSD for the highest append index, a special key-value pair (for example, using the append index −1 and the original key) may be used to store the current highest append index for the key when the metadata for the key is rotated out of the hash table. Then, when metadata is loaded back into the hash table, this special key may be accessed to immediately determine the highest append index. To avoid stale data, when a key's metadata is loaded into the hash table this special key may be deleted. That way, if a power failure occurs when the metadata is stored in the hash table (and therefore lost), the metadata may be completely reconstructed from metadata stored on the KV-SSD.

8) Either at the application's instruction or when other conditions are met (e.g., low SSD activity, or as part of or otherwise related to garbage collection), keys with large numbers of appends that could fit in fewer objects (depending on the size of the appends and the maximum object size of the SSD) may be read, the append data consolidated into a single object or a smaller set of objects, and then written back to the SSD (with the original object and appends invalidated for later garbage collection and reuse).

9) As part of a GET request for a key, the application may provide an optional value for an append index. The system may then return, depending on implementation and/or other parameters from the application, the original data plus any appends up to the provided append index (and exclude any data from later append operations), the data that was appended associated with that append index, or the data that was appended associated with that append index and all subsequent append operations. The application may also provide two append indices, specifying a range of append operations to be returned (and excluding any data that was appended outside those append indices). The append index may be replaced with alternative indicators regarding how many append operations to include: for example, a date/time stamp (if such information is included in the metadata/nodes in the binary search tree or other data structure).

FIG. 1 shows a machine designed to support append operations to values stored in a Key-Value Solid State Drive (KV-SSD) using a Key Value Virtualization (KVV) layer, according to an embodiment of the inventive concept. In FIG. 1, machine 105 is shown. Machine 105 may include processor 110. Processor 110 may be any variety of processor: for example, an Intel Xeon, Celeron, Itanium, or Atom processor, an AMD Opteron processor, an ARM processor, etc. While FIG. 1 shows a single processor 110 in machine 105, machine 105 may include any number of processors, each of which may be single core or multi-core processors, and may be mixed in any desired combination.

Processor 110 may execute operating system 115 and application 120. Operating system 115 may be any desired operating system, examples of which may include any version of the Microsoft® Windows® operating system or a Unix-like operating system, among other possibilities. (Microsoft and Windows are trademarks or registered trademarks of Microsoft Corporation in the U.S. and in other countries.) Application 120 may be any application that may issue Input/Output (I/O) requests of storage devices, such as Key-Value Solid State Drive (125) (discussed below).

Machine 105 may also include memory 130. Memory 130 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 130 may also be any desired combination of different memory types. Memory 130 may be managed by memory controller 135.

Machine 105 may also include Key-Value Solid State Drive (KV-SSD) 125, which may be controlled by device driver 140. For example, KV-SSD 125 is shown as storing various key-value pairs 145-1, 145-2, and 145-3, each including a key (150-1, 150-2, and 150-3, respectively) and a value (155-1, 155-2, and 155-3, respectively). A single key-value pair 145-1, 145-2, or 145-3 may be stored in an object on KV-SSD 125: value 155-1, 155-2 or 155-3 may be written to a particular physical address in KV-SSD 125, and key 150-1, 150-2, or 150-3 may be stored associated with that physical address, thereby permitting easy later retrieval of value 150-1, 150-2, or 150-3. While FIG. 1 shows KV-SSD 125 as storing three key-value pairs 145-1, 145-2, and 145-3, embodiments of the inventive concept may include KV-SSD 125 storing any number of key-value pairs.

While FIG. 1 shows only one KV-SSD 125, embodiments of the inventive concept may support any number of KV-SSDs 125. As discussed below, multiple KV-SSDs 125 may be virtualized to appear as a single KV-SSD. KV-SSDs 125 may be of different manufacturer, model, and/or capacity. In addition, KV-SSD 125 may include other storage devices that use a similar key-value storage system (for example, a key-value database stored on one or more storage devices of other types, such as block-access SSDs or hard disk drives).

Processor 110 may also execute Key-Value Virtualization (KVV) 160, which may offer a virtualized view of KV-SSD. KVV 160 may be implemented in any location desired. For example, KVV 160 may be implemented within operating system 115 or as a separate layer between operating system 115 and KV-SSD 125 running on processor 110. KVV 160 may also be implemented using a separate logic coupled to processor 110. KVV 160 may also be implemented as part of the firmware (or other software) running on KV-SSD 125. Finally, KVV 160 may be implemented using a circuit that is part of a hardware component sitting between processor 110 and KV-SSD 125: for example, interposed between a connector on KV-SSD 125 and a connector on some circuit board in machine 105. Examples of circuits that may be used to implement KVV 160 include a Field Programmable Gate Array (FPGA), a Graphics Processing Unit (GPU), and an Application-Specific Integrated Circuit (ASIC), among other possibilities.

KVV 160 may also support virtualization of multiple KV-SSDs 125. For example, if machine 105 includes two or more KV-SSDs 125, KVV 160 may, by being in-line between application 120 and KV-SSDs 125, make it appear as though there is only one KV-SSD 125 (but offering the combined capacity of the multiple KV-SSDs 125). KVV 160 may then be responsible for determining where any particular key-value pair is stored. This management may be accomplished in any desired manner. The keys assigned by the application may be used to determine which KV-SSD 125 stores the key-value pair: for example, the key might be hashed, or the least significant bit(s) of the key might be used to map the key-value pair to a particular KV-SSD. An ID associated with the application might be used to determine which KV-SSD 125 stores the key-value pair (which would keep all data associated with a particular application on a single KV-SSD 125). KVV 160 might also arbitrarily assign data to different KV-SSDs 125 (although in that case KVV 160 might need to search all KV-SSDs 125 when data needs to be read from KV-SSDs 125). KVV 160 may also use other techniques to determine which KV-SSD 125 should store a particular key-value pair. In the remainder of this document, it is assumed that machine 105 includes only a single KV-SSD 125, but embodiments of the inventive concept may nevertheless include any number of KV-SSDs 125 by adding the appropriate logic to determine which KV-SSD 125 stores which key-value pair.

Memory 130 may be used to store hash table 165. Hash table 165 may store metadata about various keys paired with values stored on KV-SSD 125. For example, FIG. 1 shows hash table 165 as storing metadata 170-1 and 170-2 for keys 150-1 and 150-2, respectively. Note that hash table 165 does not store metadata for key 150-3: this fact demonstrates that at any point in time hash table 165 may or may not store metadata for any particular key associated with data stored on KV-SSD 125.

Hash table 165 may also store age 175-1 and 175-2 for keys 150-1 and 150-2. Age 175-1 and 175-2 may store aging information relating to keys 150-1 and 150-2, which may then be used to determine which metadata to evict from hash table 165 when metadata for a new key is to be stored in hash table 165. Age 175-1 and 175-2 may be managed in any desired manner. For example, age 175-1 and 175-2 may store a clock time when the metadata for keys 150-1 and 150-2 respectively were last accessed from hash table 165. Or, age 175-1 and 175-2 may store a value representing the number of accesses of hash table 165 since the metadata for keys 150-1 and 150-2 respectively were last accessed: whenever the metadata for a key is accessed, that key's age may be set to zero and the ages of all other keys in hash table 165 may be incremented by one. Other techniques may also be used to determine age 175-1 and 175-2, and age 175-1 and 175-2 may be omitted in some implementations without loss of functionality.

Thus, when application 120 issues an I/O request destined for KV-SSD 125, KVV 160 may instead receive the I/O request and process it according to new semantics that support data append requests. KVV 160 may then issue appropriate I/O requests to KV-SSD 125 and ultimately return any resulting information to application 120.

Although FIG. 1 depicts machine 105 as a server (which could be either a standalone or a rack server), embodiments of the inventive concept may include machine 105 of any desired type without limitation. For example, machine 105 could be replaced with a desktop or a laptop computer or any other machine that may benefit from embodiments of the inventive concept. Machine 105 may also include specialized portable computing machines, tablet computers, smartphones, and other computing machines.

Figure 2:
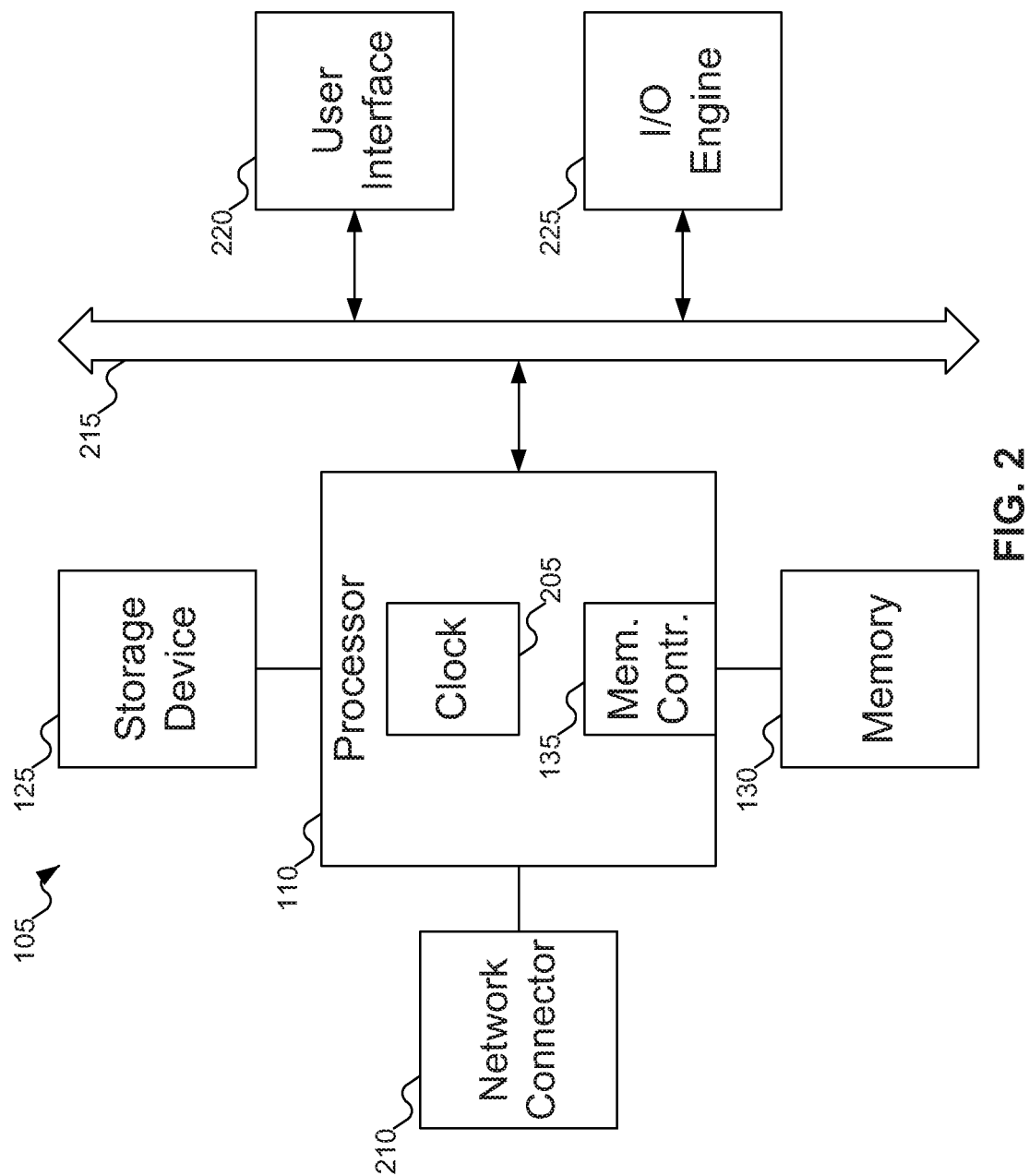
FIG. 2 shows additional details of the machine of FIG. 1.

FIG. 2 shows additional details of the machine of FIG. 1. In FIG. 2, typically, machine 105 includes one or more processors 110, which may include memory controllers 135 and clocks 205, which may be used to coordinate the operations of the components of machine 105. Processors 110 may also be coupled to memories 130, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3:
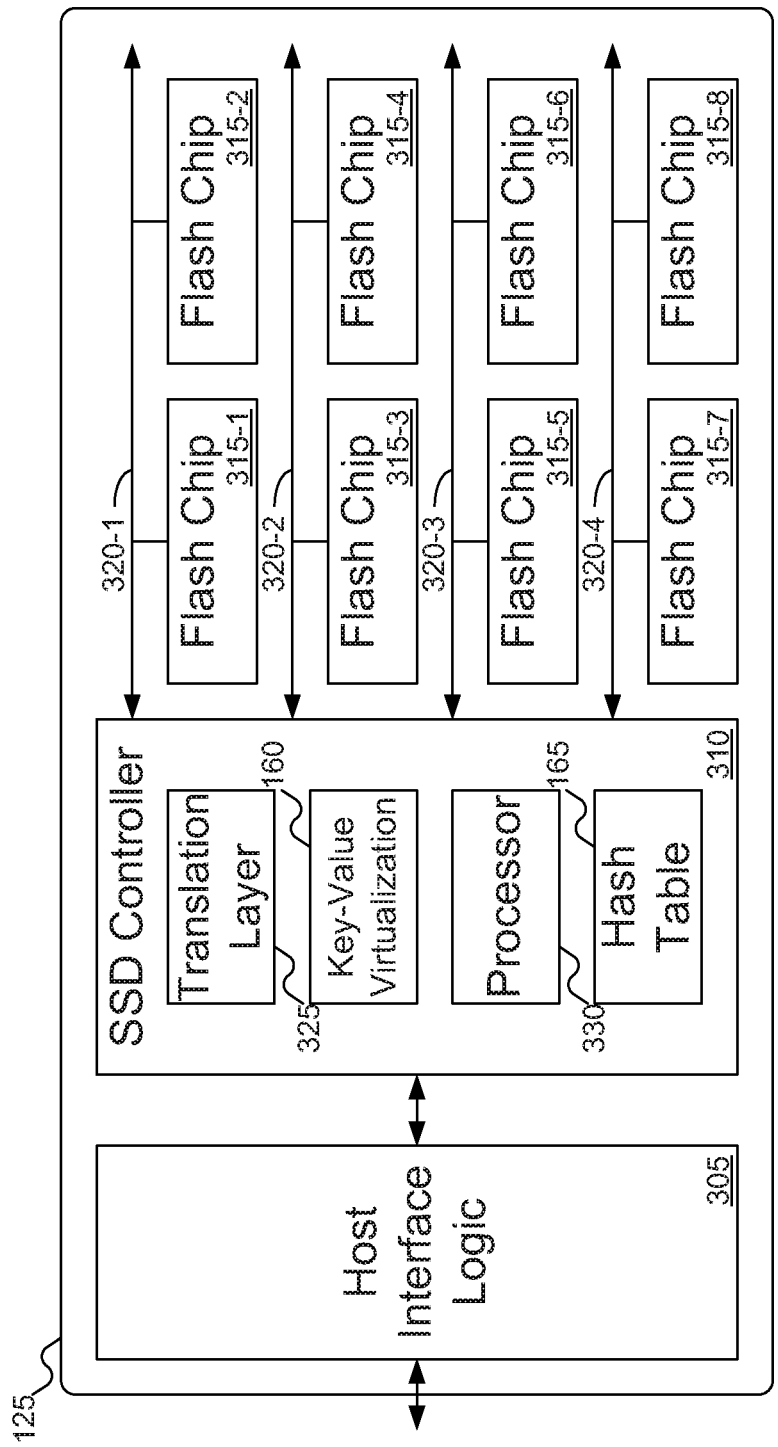
FIG. 3 shows details of the KV-SSD of FIG. 1.

FIG. 3 shows details of the KV-SSD of FIG. 1. In FIG. 3, KV-SSD 125 may include host interface logic 305, KV-SSD controller 310, and various flash memory chips 315-1 through 315-8, which may be organized into various channels 320-1 through 320-4. Host interface logic 305 may manage communications between KV-SSD 125 and machine 105 of FIG. 1. KV-SSD controller 310 may manage the read and write operations, along with garbage collection and other operations, on flash memory chips 315-1 through 315-8.

KV-SSD controller 310 may include translation layer 325. Translation layer 325 may perform the conventional functions of translating keys, as provided by application 120 of FIG. 1 in I/O requests, into physical addresses of objects stored on KV-SSD 125. KV-SSD 310 may also include processor 330, which may execute instructions that govern how to use KV-SSD 125. Thus, KV-SSD 125 may also include KVV 160, rather than KVV 160 being executed by processor 110 of FIG. 1. To fully support KVV 160, KV-SSD controller 310 may also include hash table 165 (which may be stored in a memory—either volatile or non-volatile—in KV-SSD 125 (this memory is not shown in FIG. 3).

While FIG. 3 shows KV-SSD 125 as including eight flash memory chips 315-1 through 315-8 organized into four channels 320-1 through 320-4, embodiments of the inventive concept may support any number of flash memory chips organized into any number of channels.

Figure 4:
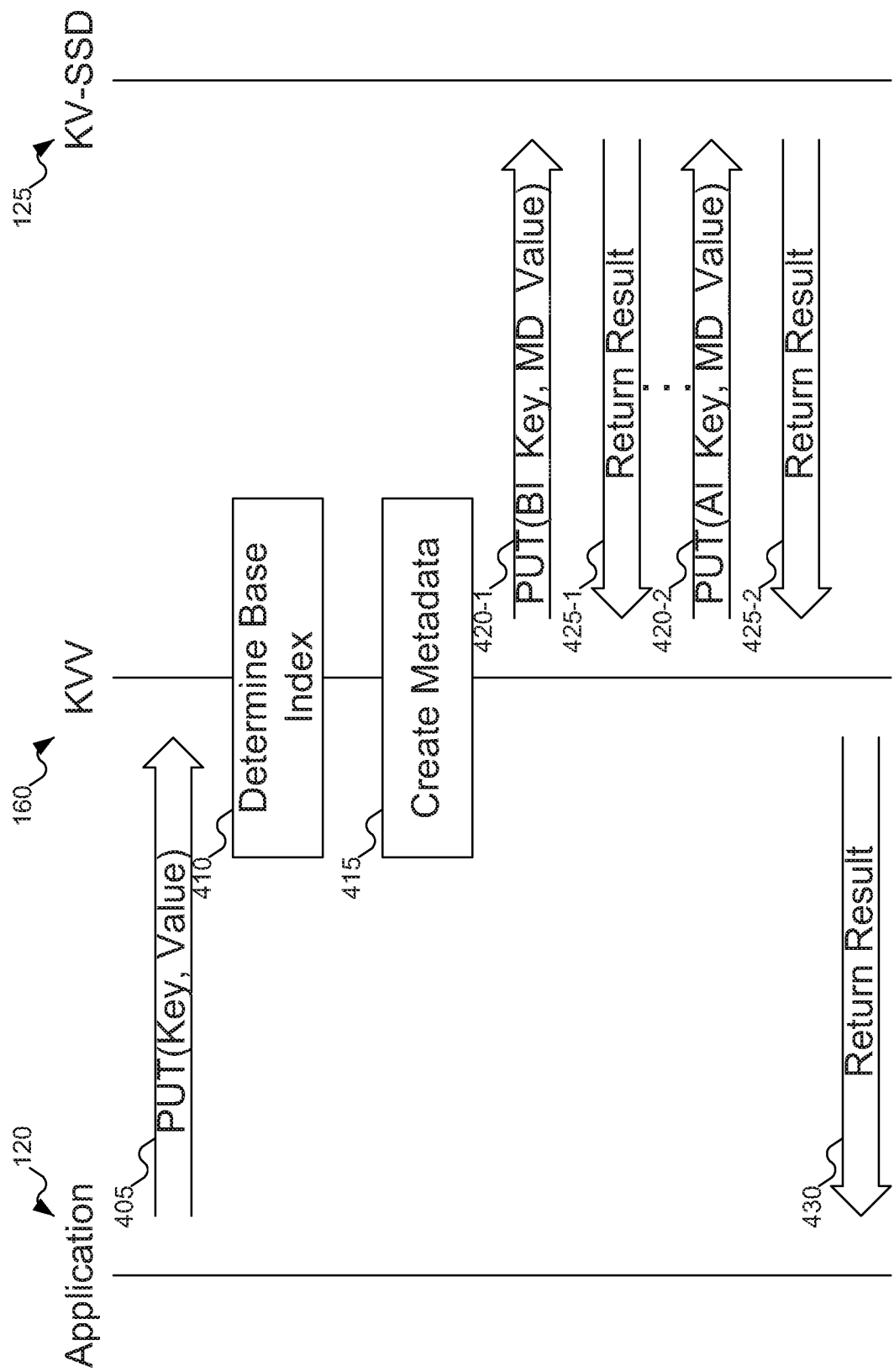
FIG. 4 shows the application of FIG. 1, the KVV of FIG. 1, and the KV-SSD of FIG. 1 performing a write operation on the KV-SSD of FIG. 1.

FIG. 4 shows application 120 of FIG. 1, KVV 160 of FIG. 1, and KV-SSD 125 of FIG. 1 performing a write operation on KV-SSD 125 of FIG. 1. In FIG. 4, application 120 may send write request 405, which may be a request to write data to KV-SSD 125. Typically, KV-SSD 125 receives a command structured as PUT (key, value[, parameter]), where "PUT" is the command, key is the key of the key-value pair (such as keys 150-1, 150-2, and 150-3 of FIG. 1), value is the value of the key-value pair (such as values 155-1, 155-2, and 155-3 of FIG. 1), and parameter is an optional parameter, but other syntaxes, different parameter names, and different parameter lists may be used in various embodiments of the inventive concept. An example parameter that may be used is "overwrite". If "overwrite" is not included as a parameter and KV-SSD 125 stores a key-value pair with the key key, KV-SSD 125 may return an error rather than performing the write operation (omitting the parameter "overwrite" may prevent collisions between multiple applications that might associate different data with the same key on KV-SSD 125). By including the parameter "overwrite", application 120 may indicate that any existing key-value pair including the key key may be deleted and the new key-value pair using the key key be used instead. Another example parameter that may be used is a parameter that indicates that the key-value pair is not subject to append commands. When this parameter is used, KVV 160 might simply pass write request 405 directly to KV-SSD 125 without modification. In such situations, application 120 would be responsible for handling appends by itself (rather than relying on KVV 160): but if application 120 knows or expects that the data is not going to be modified, this cost may be acceptable.

In some embodiments of the inventive concept, the syntax for write request 405 offered by the Application Programming Interface (API) of KVV 160 may differ from that offered by KV-SSD 125. In other embodiments of the inventive concept, the syntax for write request 405 may be the same as that offered by KV-SSD 125. By using the same API where possible, it may be possible to avoid applications needing software updates to benefit from the use of KVV 160.

In operation 410, KVV 160 may determine a base index to be used for the key-value pair to be written in write request 405. This base index may be zero, or any other desired value may be used. In operation 415, KVV 160 may create metadata, such as metadata 170-1 and 170-2 of FIG. 1.

In write operation 420-1, KVV 160 may send a write request (again, possibly using the PUT command or an analogous command offered by an API of KV-SSD 125) to store a key-value pair on KV-SSD 125. But instead of storing the original value sent by application 120 in write request 405, or associating that value with the original key sent by application 120 in write request 405, KVV 160 may send a request to store a modified value with an indexed key. The indexed key may be a combination of the base index (as determined in operation 410) with the original key sent by application 120 in write request 405. Similarly, the modified value may be a combination of a serialized form of the metadata with the original value sent by application 120 in write request 405. Finally, in operation 425-1, KV-SSD 125 may return a write result to KVV 160, and in operation 430 KVV 160 may return a write result to application 120.

The term "combination" is intended to mean any desired mechanism for combining the two pieces of data. For example, the indexed key may be the concatenation of the base index with the original key, and the modified data may be the concatenation of the serialized metadata with the original value. Or, the order of the concatenations may be reversed. Separators may be added or omitted, or the various data being combined may be set to fixed lengths so that they may be consistently generated. Thus, for example, the index may be the first two bytes of the indexed key, with the rest of the indexed key length being made up of the original key. Any other desired mechanism for "combining" two values may be used: the only "caveat" is that the data that was "combined" should be separately recoverable. (This caveat does not even necessarily extend to the indexed key, as there may be no mechanism for querying about what keys are stored on KV-SSD 125. As the only aspect that matters is knowing whether a particular key identifies data stored on KV-SSD 125, it may only be important to be able to deterministically generate the key, rather than reverse that process. Thus, for example, a hash function may be applied somehow to some combination of the base index and the original key, provided that hash function produces a unique hash on KV-SSD 125.)

Note that FIG. 4 shows multiple PUT commands sent from KVV 160 to KV-SSD 125. This is intended to represent that the original value might be larger than may be stored in a single object on KV-SSD 125. For example, consider a situation in which KV-SSD 125 has a maximum object size of 1 GB, and application 120 sends a 2 GB value in write request 405. Conventionally, KV-SSD 125 would return an error to application 120, indicating that the value was too large to store. But KVV 160 may determine that the value is too large to store in a single object, and may divide the value into multiple portions to be written separately. For analogy purposes, think of KVV 160 as treating the single write request 405 as a write request for a first GB of data followed by an append request for a second GB of data. (In actually, KVV 160 might need to divide the value into three portions, since the serialized metadata will take up some space used by the object, but this consideration may be ignored for basic understanding.) Thus, KVV 160 might send two write operations 420-1 and 420-2 to KV-SSD 125, and receive two results 425-1 and 425-2. While FIG. 4 shows two write operations 420-1 and 420-2, embodiments of the inventive concept may include any number of write operations being sent from KVV 160 to KV-SSD 125.

Note that in write operation 420-1, the index used is the base index (BI), whereas in write operation 420-2, the index used is an append index (AI). The append index may be determined in any desired manner, just as the base index was determined in any desired manner. In some embodiments of the inventive concept, the append index may be one larger than the base index (that is, an incrementing of the base index). If KVV 160 needs to send more than two write operations 420-1 and 420-2, then the append index may be incremented for each write operation after the first. This approach creates unique keys for the objects stored on KV-SSD 125 despite all the objects being related (as appends to earlier data for a particular key), yet allows for easy reconstruction of the appends in sequence (for later reading the value from KV-SSD 125, as discussed in FIG. 6 below).

In write operations 420-1 and 420-2, the same metadata is shown as being used in the modified values stored on KV-SSD 125. This fact may be true in some embodiments of the inventive concept (since the various write operations were the result of a single write request 405 from application 120). In other embodiments of the inventive concept, the metadata used to modify each portion of the value being stored on KV-SSD 125 may vary (for example, to mimic separate write and append requests).

Figure 5:
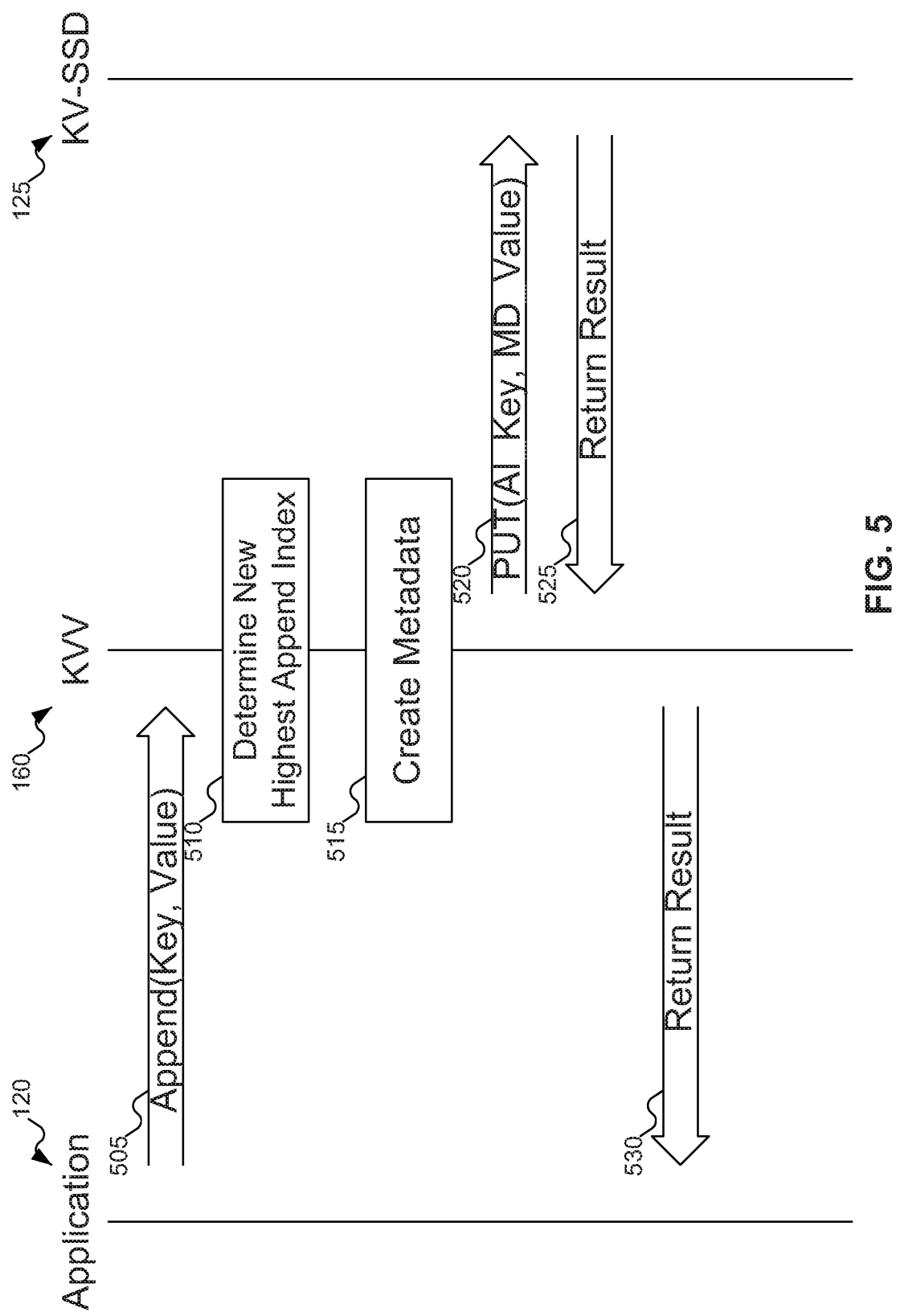
FIG. 5 shows the application of FIG. 1, the KVV of FIG. 1, and the KV-SSD of FIG. 1 performing an append operation on the KV-SSD of FIG. 1.

FIG. 5 shows application 120 of FIG. 1, KVV 160 of FIG. 1, and KV-SSD 125 of FIG. 1 performing an append operation on KV-SSD 125 of FIG. 1. In FIG. 5, application 120 may send append request 505, which may be a request to append data to a value stored on KV-SSD 125. The append syntax offered by KVV 160 (which may have no analog in the API of KV-SSD 125) may be of the form APPEND (key, value), where "APPEND" is the command, key is the key of the key-value pair (such as keys 150-1, 150-2, and 150-3 of FIG. 1), and value is the value to be appended to the existing value of the key-value pair (such as values 155-1, 155-2, and 155-3 of FIG. 1). This append syntax may also include optional parameters, not discussed here, and may vary from this form in embodiments of the inventive concept.

In operation 510, KVV 160 may determine a new highest append index to be used for the key-value pair to be written in append request 505. This new highest append index may be determined by identifying the highest append index used to date, then generating the next append index (for example, by incrementing the existing highest append index). In operation 515, KVV 160 may create metadata, such as metadata 170-1 and 170-2 of FIG. 1.

In write operation 520, KVV 160 may send a write request (again, possibly using the PUT command or an analogous command offered by an API of KV-SSD 125) to store a key-value pair on KV-SSD 125. As with write operations 420-1 and 420-2 of FIG. 4, KVV 160 may send write operation 520 that includes both an indexed key and a modified value. The indexed key may be a combination of the new highest append index (as determined in operation 510) with the original key sent by application 120 in append request 505. Similarly, the modified value may be a combination of a serialized form of the metadata with the original value sent by application 120 in append request 505. Finally, in operation 525, KV-SSD 125 may return a write result to KVV 160, and in operation 530 KVV 160 may return a write result to application 120.

FIG. 5 shows only a single write operation 520 being sent from KVV 160 to KV-SSD 125, which implies that the value being appended to the key will fit in a single object on KV-SSD 125. But as with the handling of write request 405 of FIG. 4, if need be KVV 160 may divide the append value into multiple portions, assign each to a unique append index (and therefore a unique indexed key), and store the portions (modified by metadata) associated with those unique indexed keys on KV-SSD 125. As with FIG. 4, the same metadata may be used when storing the various portions of the value on KV-SSD 125, or different metadata may be used with different portions of the value when stored on KV-SSD 125.

Figure 6:
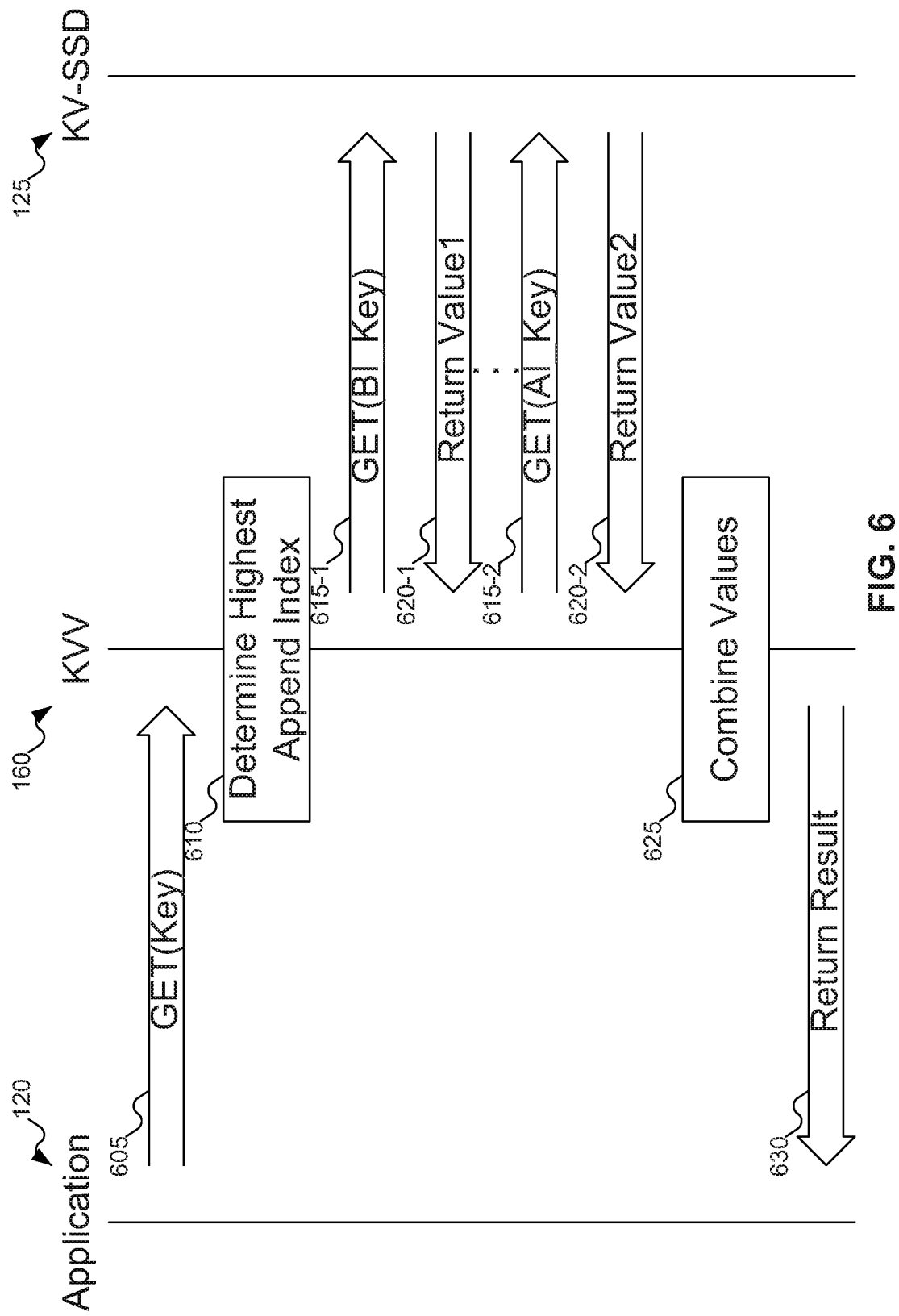
FIG. 6 shows the application of FIG. 1, the KVV of FIG. 1, and the KV-SSD of FIG. 1 performing a read operation on the KV-SSD of FIG. 1.

FIG. 6 shows application 120 of FIG. 1, KVV 160 of FIG. 1, and KV-SSD 125 of FIG. 1 performing a read operation on KV-SSD 125 of FIG. 1. In FIG. 6, application 120 may send read request 605, which may be a request to read data from KV-SSD 125. Typically, KV-SSD 125 receives a command structured as GET (key[, parameter]), where "GET" is the command, key is the key of the key-value pair (such as keys 150-1, 150-2, and 150-3 of FIG. 1), and parameter is an optional parameter, but other syntaxes, different parameter names, and different parameter lists may be used in various embodiments of the inventive concept. An example parameter that may be used is, is a parameter that indicates that the key-value pair is not subject to append commands. When this parameter is used, KVV 160 might simply pass read request 605 directly to KV-SSD 125 without modification. Another example parameter that may be used would be one or more append indices, specifying particular portions of the value to retrieve. For example, the application might request all appends that occurred within a particular range of append indices, or all data written from the original write request through a particular append index, or all data written from a particular append index until the end of the appends. Without such parameters, the default operation may be to retrieve the entire value associated with the key, including all appends.

Assuming that read request 605 requests data through the last append request, in operation 610, KVV 160 may determine the highest append index used to date. In read operation 615-1, KVV 160 may send a read request (again, possibly using the GET command or an analogous command offered by an API of KV-SSD 125) to read the value associated with an indexed key on KV-SSD 125. This first read request 615-1 may combine the key with the base index for the key (as shown, if application 120 did not specify a lower end for the range of appends to read), or it may combine the key with the lower end for the range as provided by application 120 in read request 605. Similarly, in operation 620-1 KV-SSD 125 may return the modified value stored on KV-SSD 125. KVV 160 may send as many read requests as there are append indices to retrieve, as shown by read operation 615-2, to which KV-SSD 125 may return result 620-2: while FIG. 6 shows two read operations 615-1 and 615-2, there may be any number of read operations sent from KVV 160 to KV-SSD 125. After receiving the modified values in operations 620-1 and 620-2, KVV 160 may separate out the original values from the metadata stored in the modified values on KV-SSD 125 (in some embodiments of the inventive concept the metadata may be discarded, as it is not returned to application 120).

In operation 625, KVV 160 may combine the values to produce the complete value (possibly including as much as the value from write request 405 of FIG. 4 and all subsequent append requests 505 of FIG. 5). Finally, in operation 630, KVV 160 may send the complete value back to application 120.

In some embodiments of the inventive concept, KVV 160 may also return to application 120 the highest append index for the key. This information may be of use to application 120. For example, if application 120 needs to allocate memory to store the returned value, the highest append index for the key, combined with the maximum size of an object stored on KV-SSD 125, may provide a rough guide as to how much memory will be needed to store the value. For example, if the maximum size of an object stored on KV-SSD 125 is 1 GB and there were two append requests 505 of FIG. 5 after write request 405 of FIG. 4, the highest append index would be 2. Increasing this index by one (to account for write request 405 of FIG. 4) and multiplying by 1 GB indicates that the total storage needed for the full value would not be more than 3 GB. If KVV 160 were to return the highest append index to application 120, KVV 160 would typically return this value before sending the value associated with the key (as constructed).

Figure 7:
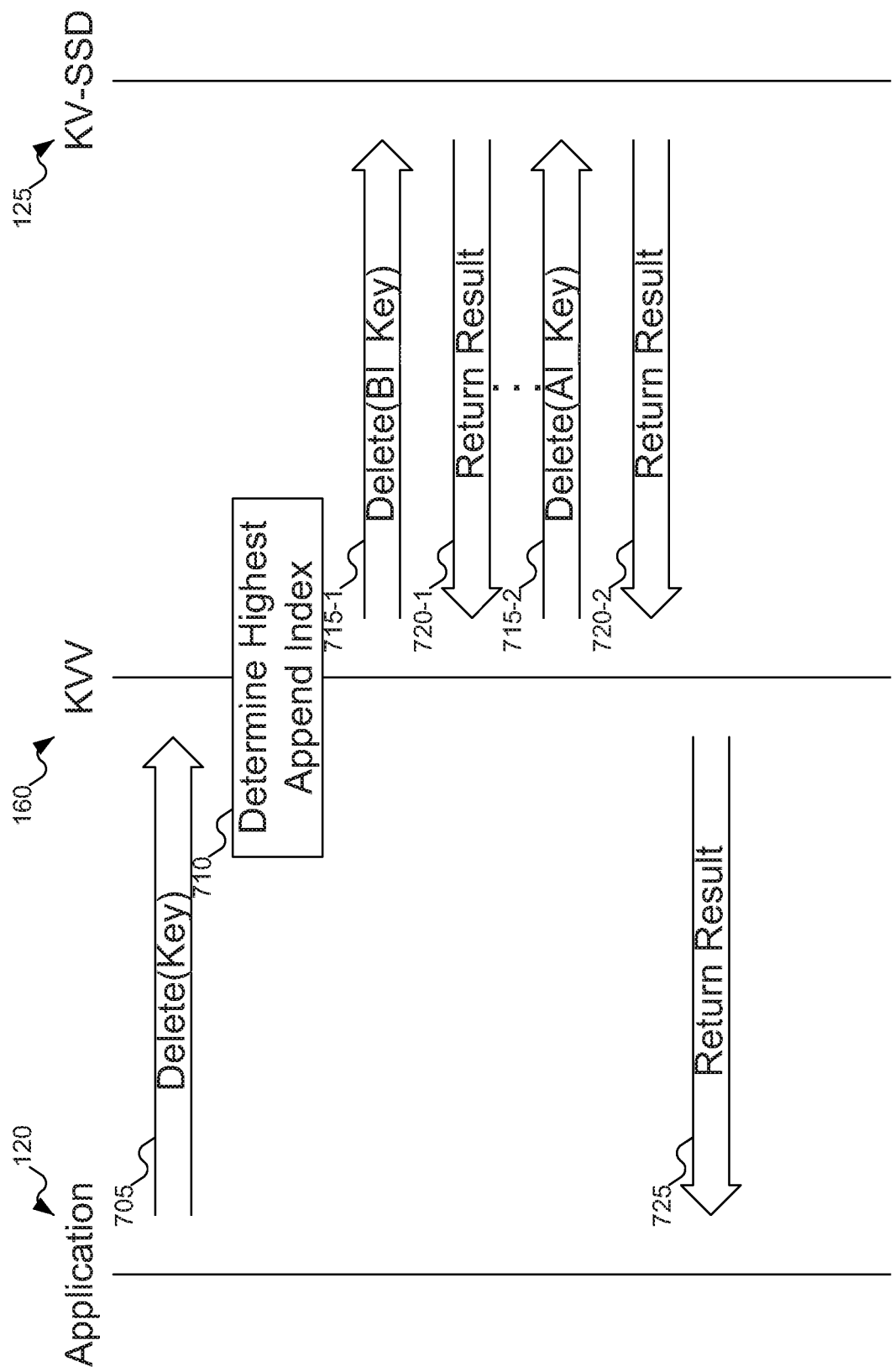
FIG. 7 shows the application of FIG. 1, the KVV of FIG. 1, and the KV-SSD of FIG. 1 performing a delete operation on the KV-SSD of FIG. 1

FIG. 7 shows application 120 of FIG. 1, KVV 160 of FIG. 1, and KV-SSD 125 of FIG. 1 performing a delete operation on KV-SSD 125 of FIG. 1. In FIG. 7, application 120 may send delete request 705, which may be a request to delete the data associated with the key on KV-SSD 125. Typically, KV-SSD 125 receives a command structured as ERASE (key[, parameter]), where "ERASE" is the command, key is the key of the key-value pair (such as keys 150-1, 150-2, and 150-3 of FIG. 1), and parameter is an optional parameter, but other syntaxes, different parameter names, and different parameter lists may be used in various embodiments of the inventive concept.

In operation 710, KVV 160 may determine the highest append index used for the key-value pair to be deleted in delete request 705. Then, for each append index (starting with the base index), in operations 715-1 and 715-2, KVV 160 may send delete requests to delete the values associated with the indexed keys to KV-SSD 125, to which KV-SSD 125 may respond in operations 720-1 and 720-2. While FIG. 7 shows two delete operations being sent from KVV 160 to KV-SSD 125, embodiments of the inventive concept may include any number of delete operations (as there may be any number of indexed keys stored on KV-SSD 125). Finally, in operation 725, KVV 160 may report the result of delete request 705 to application 120.

While FIG. 7 shows KVV 160 first determining the highest append index used to date in operation 710, this operation may be omitted. For example, KVV 160 may simply send delete requests to KV-SSD 125 for each indexed key until KV-SSD 125 responds that no such key was found, at which point KVV 160 knows that all the appends for that key have been deleted.

Figure 8:
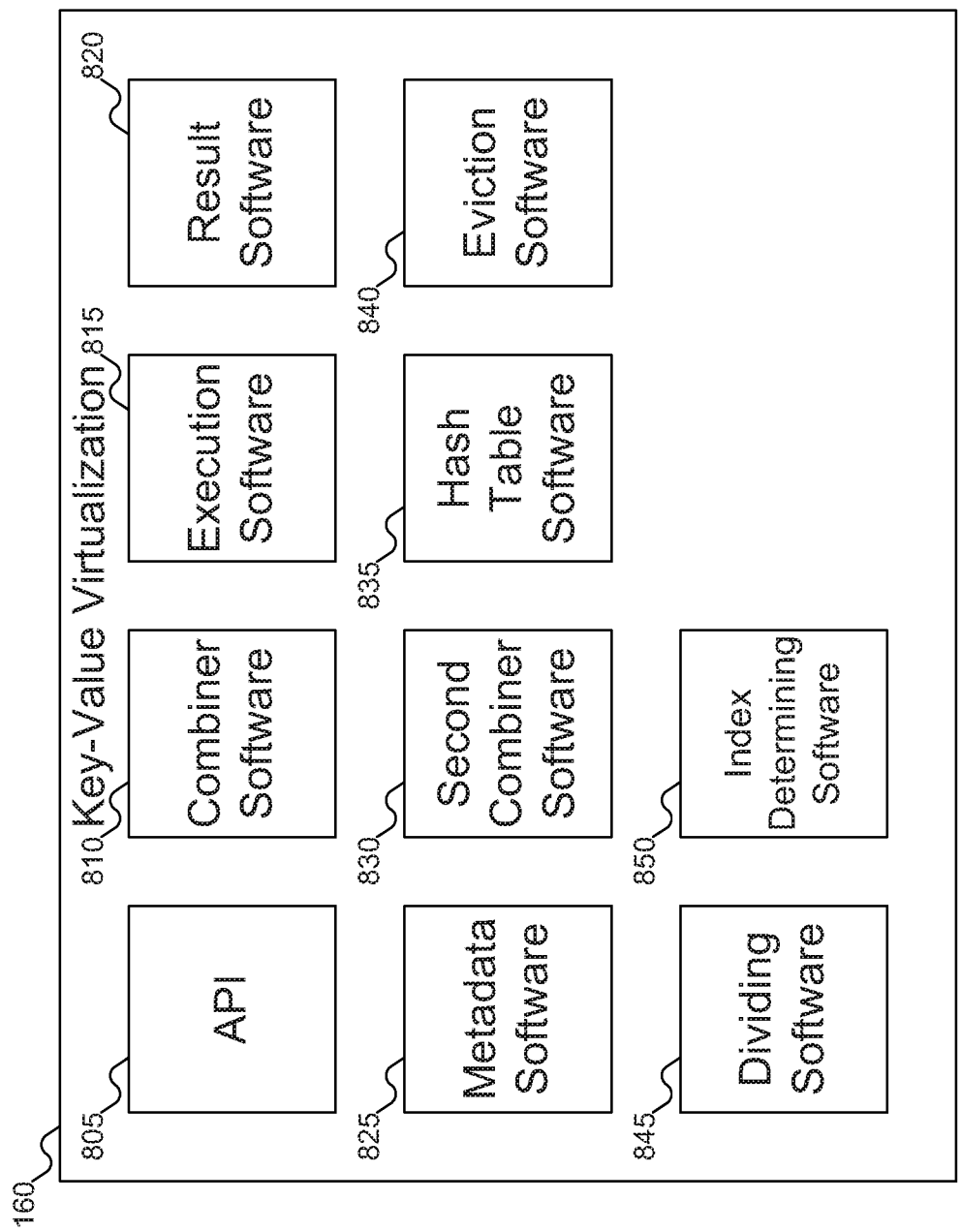
FIG. 8 shows details of the KVV of FIG. 1.

FIG. 8 shows details of KVV 160 of FIG. 1. In FIG. 8, KVV 160 is shown as including API 805, combiner software 810, execution software 815, result software 820, metadata software 825, second combiner software 830, hash table software 835, eviction software 840, dividing software 845, and index determining software 850. While FIG. 8 shows various elements, not all are necessary for each implementation, and different embodiments of the inventive concept may include or omit various elements as appropriate. In addition, some (or all) elements may be combined into a single "package" that implements both (or all) described software objectives, and/or functions described as performed by one element may be implemented using a different element. Finally, while the various elements shown in FIG. 4 are all labeled as "software", embodiments of the inventive concept may implement the elements as circuits that are suitably programmed rather than as software that is executed by a processor: the term "software" is intended to mean to the general concept of instructions that may be implemented using some circuit design, rather than being limited to instructions that are stored in some memory (or other storage) and are executed by a general purpose processor. Thus, "software" may include instructions stored in an operating system file and executed by a host processor (such as a Central Processing Unit (CPU)), instructions stored in firmware and executed by a processor or a GPU in KV-SSD 125 of FIG. 1, a suitably designed and/or programmed FPGA or ASIC, or any other mechanism by which a computer or its equivalent may be understood to execute a particular set of instructions.

API 805 is an API that exposes functions that may be accessed by application 120 of FIG. 1. API 805 may be designed so that it includes all of the functions normally offered by the API of KV-SSD 125 of FIG. 1, plus some additional functionalities that benefit from the capabilities introduced by KVV 160. For example, API 805 may include PUT, GET, and ERASE functions similar to those offered by the API of KV-SSD 125 (and as described above with reference to FIGS. 4 and 6-7), but may include other functions such as APPEND (as described above with reference to FIG. 5). Other functions that may be exposed by API 805 may include a CONSOLIDATE function (as with PUT, GET, ERASE, and APPEND, this function may be offered using a different name). CONSOLIDATE may operate as a built-in read-modify-erase functionality, enabling application 120 to ask KVV 160 to consolidate all of the append data associated with a single key into a single object. That is, application 120 of FIG. 1 may ask KVV 160 to consolidate a particular key. KVV 160 may then perform a read request on the key (similar to that described above with reference to FIG. 6), but instead of returning the value to the application KVV 160 may then perform a delete request on the key (similar to that described above with reference to FIG. 7) followed by a write request on the key with the consolidated value (similar to that described above with reference to FIG. 4). By consolidating the value into a single object, some space on KV-SSD 125 of FIG. 1 may be released for other use (subject, of course, to conventional garbage collection as performed on flash memory devices).

Figure 9:
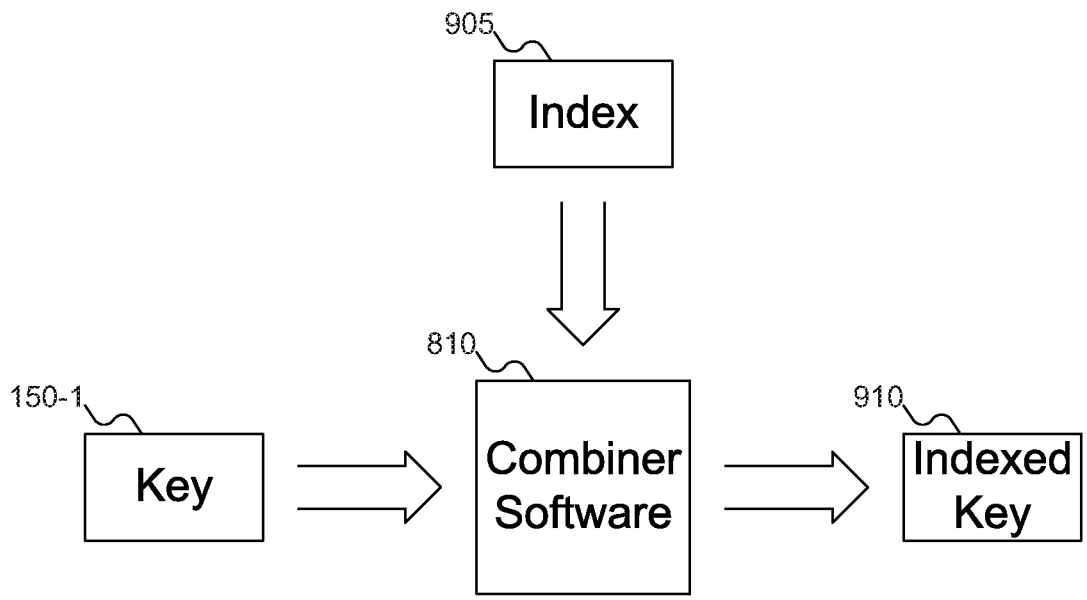
FIG. 9 shows the combiner software of FIG. 8 combining a key with an index to produce an indexed key.

Combiner software 810 may take an index and a key and combine the two into an indexed key. As discussed above, the indexed key provides a mechanism by which multiple different objects associated with the same key (as provided by application 120 of FIG. 1) may be stored on KV-SSD 125 of FIG. 1 (as KV-SSD 125 of FIG. 1 does not permit more than one object to be stored with a given key) with easy retrieval of the data. FIG. 9 illustrates the operation of combiner software 810: given key 150-1 and index 905, combiner software 810 may produce indexed key 910. As discussed above, indexed key 910 may be any desired combination of index 905 and key 150-1, including (for example) a concatenation of index 905 and key 150-1.

Returning to FIG. 8, execution software 815 may send commands to KV-SSD 125 of FIG. 1 and receiving results from KV-SSD 125 of FIG. 1. In other words, execution software 815 may use the functions offered by KV-SSD 125 to achieve the enhanced functionality offered by KVV 160. Result software 820 may return a result to application 120 of FIG. 1 appropriate to the request issued by application 120.

Figure 10:
FIG. 10 shows a structure for the metadata of FIG. 1, according to an embodiment of the inventive concept.

Metadata software 825 may create metadata that KVV 160 may use in handling the requests shown in FIGS. 4-7. FIG. 10 elaborates on this metadata, and shows that metadata 170-1 and 170-2 may include, among other elements, append index 905 (the index assigned to the particular append request issued by application 120 of FIG. 1), append offset 1005 (how much data was written previously, either in original write request 405 of FIG. 4 for this key or in append requests 505 of FIG. 5 for this key), append length 1010 (how much data is being written in this append request 505 of FIG. 5 for this key), and append search structure 1015 (the data structure storing information about all append requests 505 of FIG. 5 for this key to date, including original write request 405 of FIG. 4 for this key).

Figure 11:
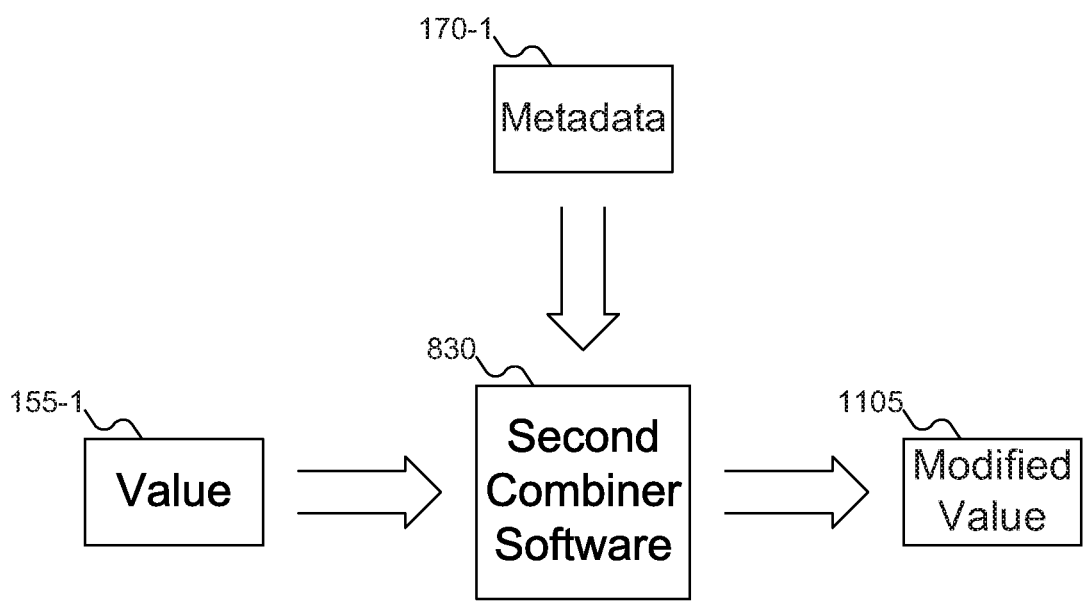
FIG. 11 shows the second combiner software of FIG. 8 combining value with metadata to produce a modified value.

Returning to FIG. 8, second combiner software 830 may combine serialized metadata with a value to be written to KV-SSD 125 of FIG. 1 to produce a modified value. This modified value permits both the metadata and the value to be stored together on KV-SSD 125 of FIG. 1, permitting retrieval of both based on the same indexed key. FIG. 11 illustrates the operation of second combiner software 830: given value 155-1 and metadata 170-1, second combiner software 830 may produce modified value 1105. As discussed above, modified value 1105 may be any desired combination of metadata 170-1 and value 155-1, including (for example) a concatenation of metadata 170-1 and value 155-1. As combiner software 810 and second combiner software 830 operate identically (just on different data), combiner software 810 and second combiner software 830 may be the same software, rather than being different software.

Returning to FIG. 8, hash table software 835 may manage hash table 165 of FIG. 1. This management may include adding new entries to hash table 165 of FIG. 1 and looking up metadata from hash table 165 of FIG. 1 for a given key. For example, hash table software 845 may receive a key, locate the associated metadata (or report that hash table 165 of FIG. 1 does not store the associated metadata), and report the highest append index used for that key: this information may then be used to perform a further append request 505 of FIG. 5. Hash table software 845 may also include eviction software 840, which may be responsible for selecting entries in hash table 165 of FIG. 1 for eviction (in which case eviction software 840 is part of hash table software 840).

Dividing software 845 may divide a given value into multiple portions. As discussed above with reference to FIG. 4, it might occur that application 120 of FIG. 1 may request a value be written that is larger than may be stored in a single object on KV-SSD 125 of FIG. 1. Dividing software 845 may divide that value into portions, each of which may fit in a single object on KV-SSD 125 of FIG. 1. For example, if the maximum size for an object on KV-SSD 125 of FIG. 1 is 1 GB and a 3 GB value is to be stored, dividing software 845 may divide that value into three portions. Dividing software may also take into consideration the size of any serialized metadata that might be combined with the portion of the value before being written, as that information may affect how many portions into which the value should be divided.

Finally, index determining software 850 may determine an append index for a given key. Index determining software 850 may use metadata for the key stored in hash table 165 of FIG. 1 (which may involve accessing that metadata using hash table software 835), or index determining software 850 may determine this information directly from objects stored on KV-SSD 125.

Figure 12:
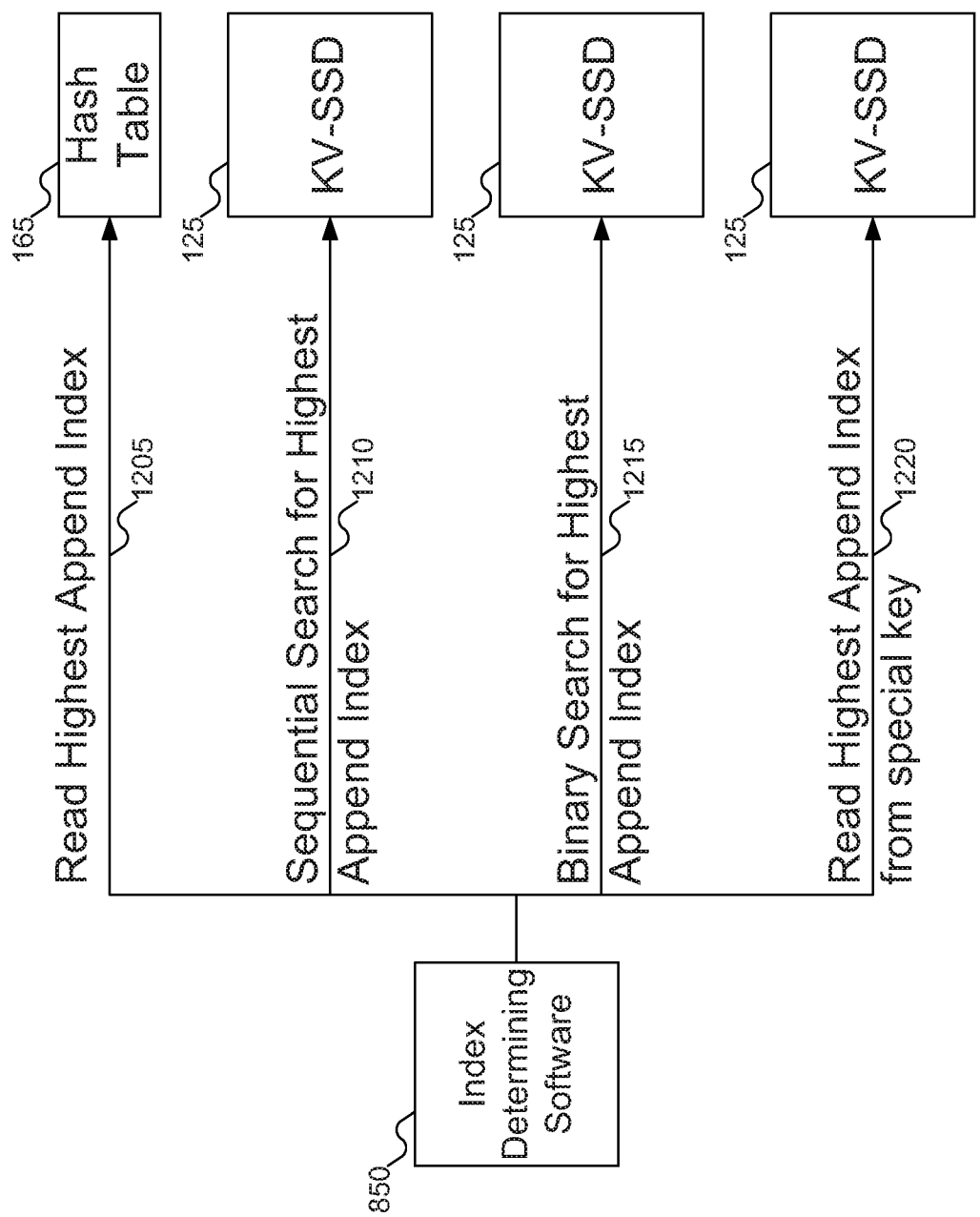
FIG. 12 shows different techniques the index determining software of FIG. 8 might use to determine a highest append index for a key on the KV-SSD of FIG. 1, according to various embodiments of the inventive concept.

FIG. 12 shows different techniques index determining software 850 of FIG. 8 might use to determine a highest append index for a key on KV-SSD 125 of FIG. 1, according to various embodiments of the inventive concept. FIG. 12 shows various embodiments of the inventive concept: these embodiments may be combined in any manner desired. That is, these embodiments should not be considered mutually exclusive.

As shown in FIG. 12, in one embodiment of the inventive concept, index determining software 850 may simply access the highest append index from metadata stored in hash table 165. In a second embodiment of the inventive concept, index determining software 850 may perform a sequential search of indices that might be stored on KV-SSD 125. For example, index determining software 850 might combine the base index with the key (perhaps using combiner software 810 of FIG. 8) and query KV-SSD 125 for any value associated with that indexed key. If KV-SSD 125 indicates that a value is stored for that indexed key, index determining software 850 may then increment the base index, combine the new index with the key, and query KV-SSD 125 again. This process may repeat until KV-SSD 125 indicates that a particular indexed key was not found on KV-SSD 125, at which point index determining software has determined the highest append index used for that key (the last index that resulted in a successful query). In a third embodiment of the inventive concept, index determining software 850 may perform the same sequential search, but starting from the highest possible append index rather than the base index, decrementing the index rather than incrementing the index, and knowing that the highest append index has been located when KV-SSD 125 first indicates a successful query.

In a fourth embodiment of the inventive concept, index determining software 850 may perform a binary search for the highest append index. In a binary search, a range of possible values is identified: for example, the range that starts at the base index and ends at the highest possible append index (for example, 0 and 1023, if a total of 1024 writes plus appends are supported by KVV 160 of FIG. 1). This range may be divided in half and a value in the middle selected (continuing the above example, 511). That middle index may then be combined with the key to produce an indexed key, and KV-SSD 125 may be queried for any value associated with that indexed key. If the query is successful— that is, KVV 125 stores an object for that indexed key—then the lower end of the range may be replaced with the middle index; otherwise, the upper end of the range may be replaced with the middle index (continuing the above example, if the indexed key was not found, then the upper end of the range may be reduced from 1023 to 511). The process of selecting a middle index, combining the middle index with the key, and querying KV-SSD 125 for that indexed key may be repeated until the range has been reduced to a single index, which may then be determined as the highest append index for the key.

In a fifth embodiment of the inventive concept, index determining software 850 may identify a special key that stores the highest append index for the key. For example, when metadata for a particular key is evicted from hash table 165, a special key may be used to store this highest append index value. Continuing the above example, if append indices for the key may vary from 0 to 1023, the special key might be generated from a combination of −1 and the key (perhaps using combiner software 810 of FIG. 8). Or (since no data should be written to KV-SSD 125 using the original key without being combined with an index), the special key might be the original key without modification. The special key may be formed in any other desired manner. By storing the highest append index for the key in an index object on KV-SSD 125, determining the highest append index for that key may be accomplished using a single read request from KV-SSD 125.

The various embodiments of the inventive concept may offer different levels of performance. In general, the first embodiment of the inventive concept may be expected to operate the fastest (as queries to memory tend to be faster than queries to KV-SSD 125), but only if the metadata is stored in hash table 165. If the metadata is not stored in hash table 165, then another embodiment of the inventive concept may be needed.

The second, third, and fourth embodiments of the inventive concept described above may be expected to take different amounts of time. If n represents the highest possible append index (that is, the maximum number of writes plus appends for a single key), then on average, the second and third embodiments of the inventive concept may be expected to require n/2 queries of KV-SSD 125 to find the highest append index (mathematically, this may be expressed as $\Theta(n)$, which identifies the polynomial amount of time required in the average case). But in the worst case, n queries of KV-SSD 125 may be required (mathematically, this may be expressed as Θ(n), which identifies the polynomial amount of time required in the worst case). In contrast, the fourth embodiment of the inventive concept may be expected to require $\log_2$ n queries of KV-SSD 125 in both average and worst case (Θ($\log_2$ n) and Θ($\log_2$ n)). On the other hand, in the best case scenario, the second and third embodiments of the inventive concept might require no more than two queries of KV-SSD 125 to find the highest append index, whereas even in the best case the fourth embodiment of the inventive concept still requires $\log_2$ n queries of KV-SSD 125. Thus, which approach is best may depend on circumstances that KVV 160 of FIG. 1 may not know in advance.

Finally, the fifth embodiment of the inventive concept may require only one query of KV-SSD 125 to determine the highest append index: but as with the first embodiment of the inventive concept described above, the fifth embodiment of the inventive concept depends on the index object being stored on KV-SSD 125. In the fifth embodiment of the inventive concept, the index object may be deleted when metadata is loaded into hash table 165. (This choice prevents the index object from providing stale information in case of a power failure after the metadata is loaded into hash table 165 and updated therein: KV-SSD 125 may be searched to reconstruct the metadata in that situation.) If the index object is not stored on KV-SSD 125, then index determining software 850 may need to use a different approach to identify the highest append index for a key.

Figure 13A:
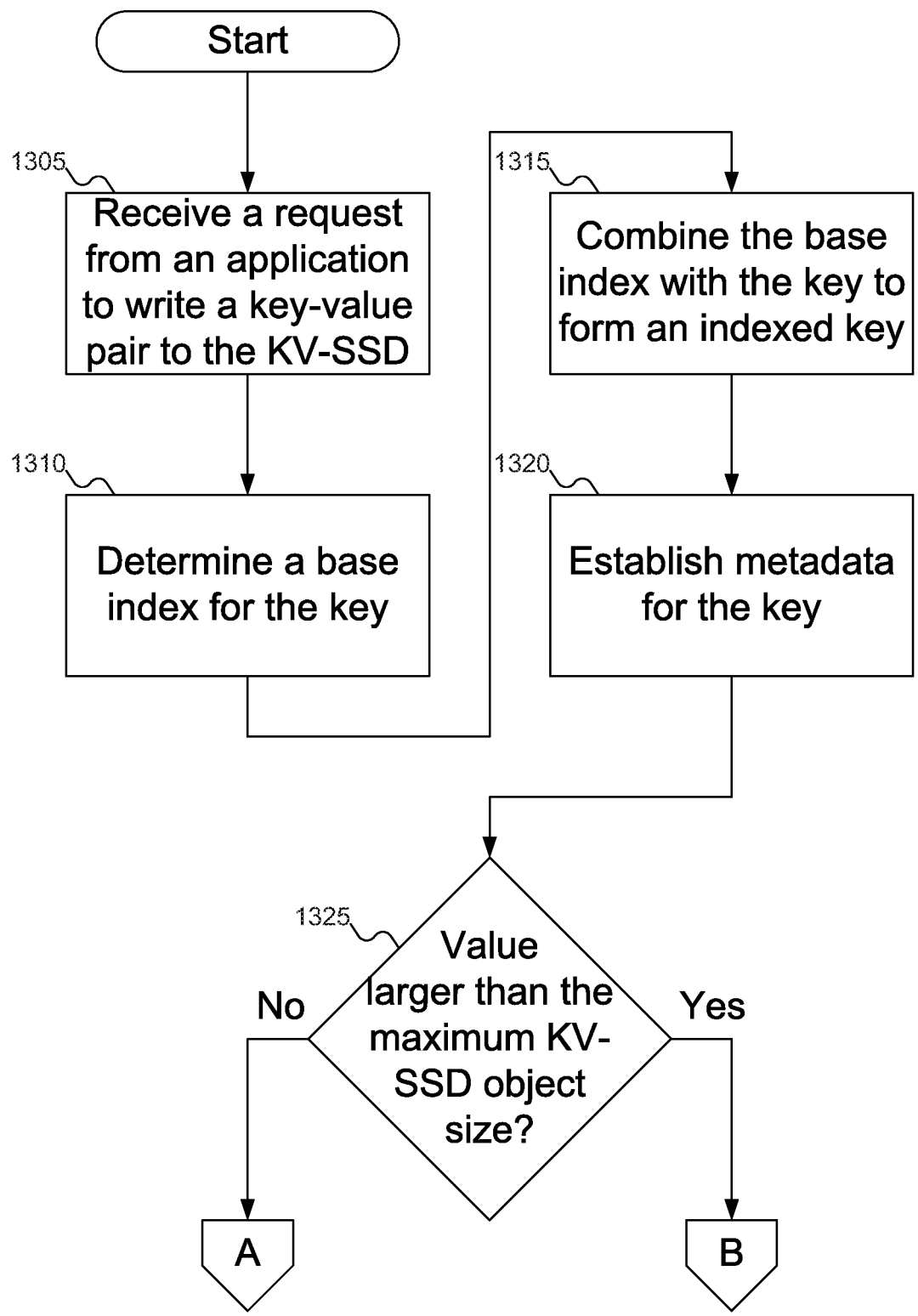
FIGS. 13A-13C show a flowchart of an example procedure for the KVV of FIG. 1 to support the write request of FIG. 4 on the KV-SSD of FIG. 1, according to an embodiment of the inventive concept.
Figure 13B:
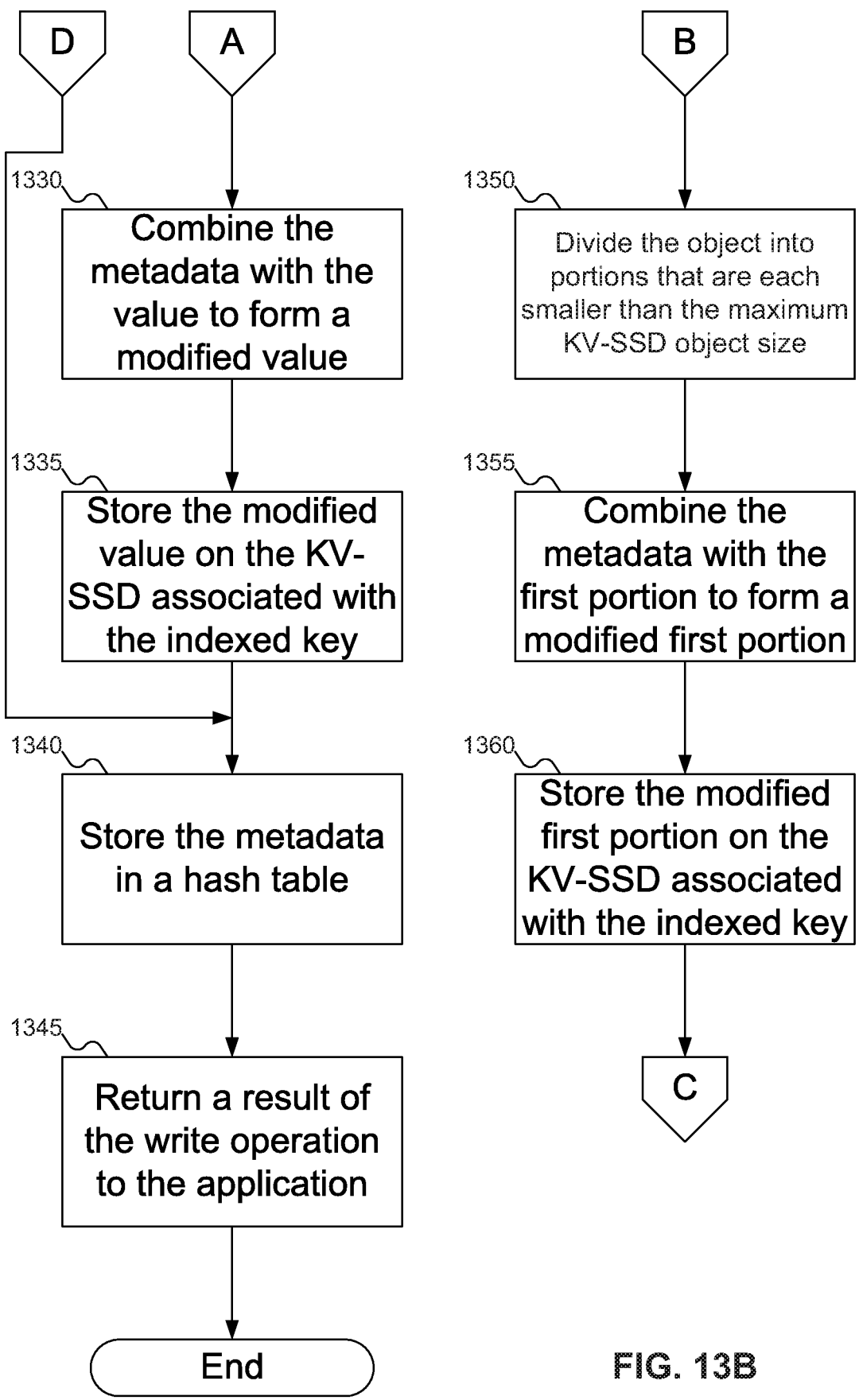
Figure 13C:
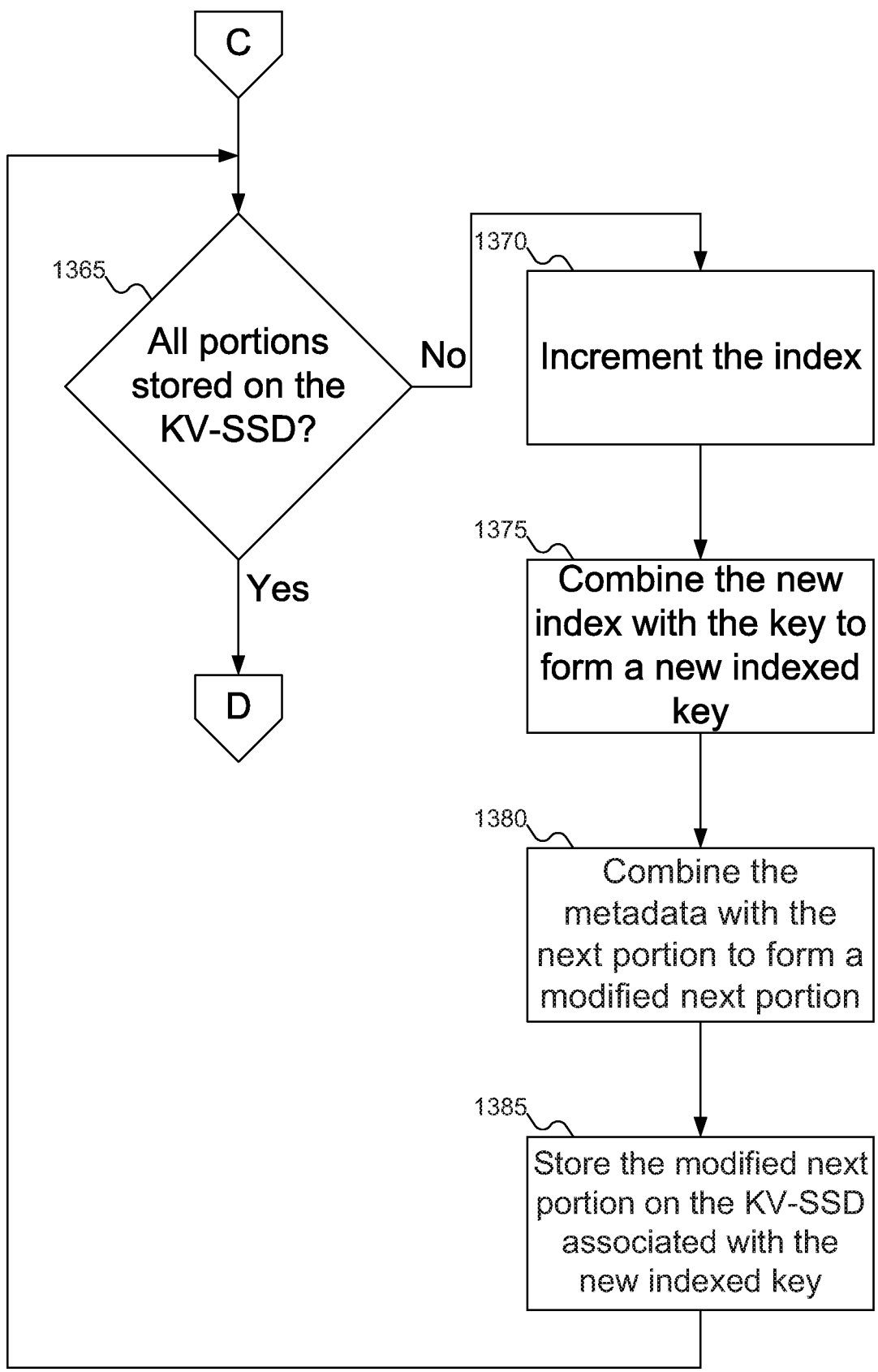

FIGS. 13A-13C show a flowchart of an example procedure for KVV 160 of FIG. 1 to support write request 405 of FIG. 4 on KV-SSD 125 of FIG. 1, according to an embodiment of the inventive concept. In FIG. 13A, at block 1305, application 120 of FIG. 1 may send write request 405 of FIG. 4 to KVV 160 of FIG. 1, requesting that value 155-1 of FIG. 1 be paired with key 150-1 of FIG. 1 when stored on KV-SSD 125 of FIG. 1. At block 1310, KVV 160 of FIG. 1 may determine a base index for key 150-1 of FIG. 1. At block 1315, combiner software 810 of FIG. 8 may combine the base index with key 150-1 of FIG. 1 to form indexed key 910 of FIG. 9. At block 1320, metadata software 825 of FIG. 8 may generate metadata 170-1 of FIG. 1 for key 150-1 of FIG. 1. At block 1325, KVV 160 of FIG. 1 may determine whether value 155-1 of FIG. 1 is larger than will fit in a single object on KV-SSD 125.

If value 155-1 of FIG. 1 will fit in a single object on KV-SSD 125 of FIG. 1, then at block 1330 (FIG. 13B) second combiner software 830 of FIG. 8 may combine metadata 170-1 of FIG. 1 with value 150-1 of FIG. 1, forming modified value 1105 of FIG. 11. At block 1335, execution software 815 of FIG. 8 may execute a store operation on KV-SSD 125 to store modified value 1105 of FIG. 1 associated with indexed key 910 of FIG. 9. At block 1340, KVV 160 of FIG. 1 may store metadata 170-1 of FIG. 1 in hash table 165 of FIG. 1. Finally, at block 1345, result software 820 may return a result from KVV 160 of FIG. 1 to application 120 of FIG. 1.

Alternatively, if value 155-1 of FIG. 1 will not fit in a single object on KV-SSD 125 of FIG. 1, then at block 1350 dividing software 845 of FIG. 8 may divide value 155-1 of FIG. 1 into portions. At block 1355, second combiner software 830 of FIG. 3 may combine metadata 170-1 of FIG. 1 with the first portion of the value 155-1 of FIG. 1 to form modified value 1105 of FIG. 11. At block 1360, execution software 815 may store modified value 1105 of FIG. 11 on KV-SSD 125 of FIG. 1 associated with indexed key 910 of FIG. 9.

At block 1365 (FIG. 13C), KVV 160 of FIG. 1 may determine whether all portions of value 155-1 of FIG. 1 have been stored on KV-SSD 125 of FIG. 1. If so, then processing continues at block 1340 of FIG. 13B. Otherwise, at block 1370 (FIG. 13C) KVV 160 of FIG. 1 may increment or otherwise adjust the index to a new index value. At block 1375, combiner software 810 of FIG. 8 may combine the new index with key 150-1 of FIG. 1 to form new indexed key 910 of FIG. 9. At block 1380, second combiner software 830 of FIG. 3 may combine metadata 170-1 of FIG. 1 with the next portion of the value 155-1 of FIG. 1 to form new modified value 1105 of FIG. 11. At block 1385, execution software 815 may store new modified value 1105 of FIG. 11 on KV-SSD 125 of FIG. 1 associated with new indexed key 910 of FIG. 9, after which control returns to block 1365.

Figure 14A:
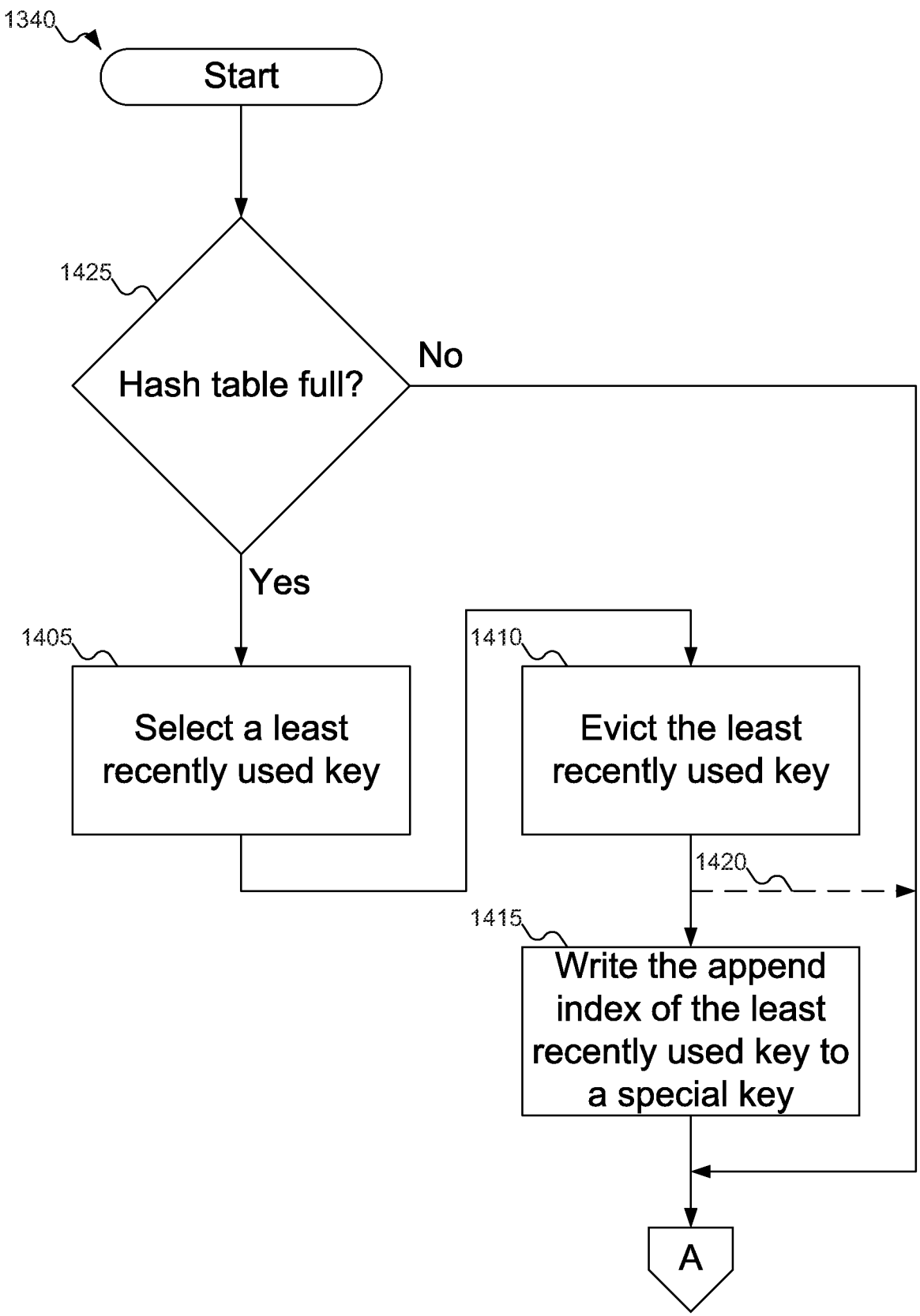
FIGS. 14A-14B show a flowchart of an example procedure to store metadata for a key in the hash table of FIG. 1, according to an embodiment of the inventive concept.
Figure 14B:
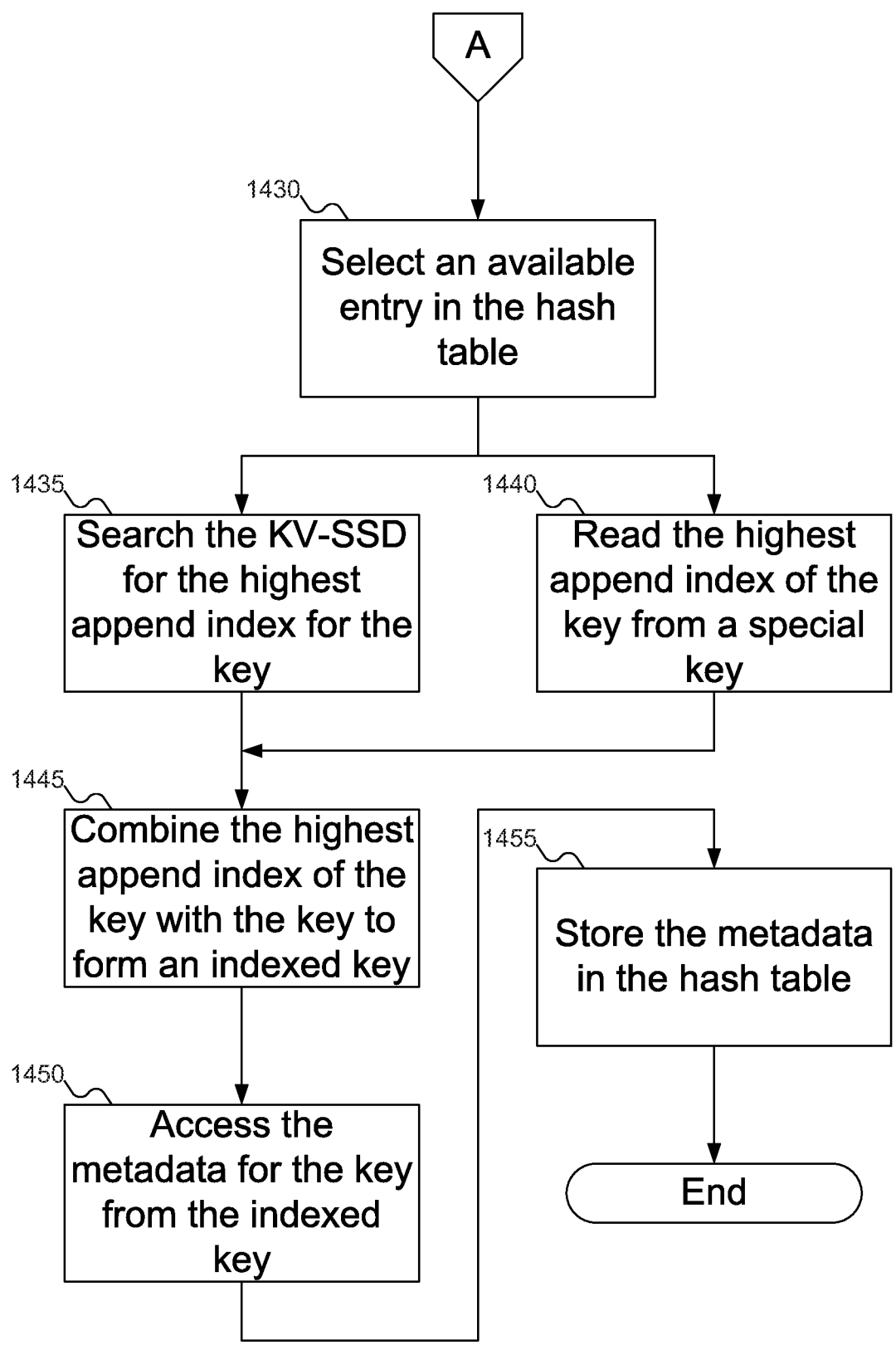

FIGS. 14A-14B show a flowchart of an example procedure to store metadata for a key in hash table 165 of FIG. 1, according to an embodiment of the inventive concept. In FIG. 14A, at block hash table software 835 of FIG. 8 may check to see if hash table 165 of FIG. 1 is full. If so, then hash table software 835 of FIG. 8 needs to evict an entry from hash table 165 of FIG. 1 before the new metadata may be stored in hash table 165 of FIG. 1. At block 1405, eviction software 840 of FIG. 8 may select an entry for eviction. Eviction software 840 of FIG. 8 may use, for example, age 175-1 and 175-2 of FIG. 1 to help decide which entry to evict. Eviction software 840 of FIG. 8 may select for eviction the least recently used entry, or the least frequently used entry, or may select an entry using any other desired mechanism. Once selected, at block 1410 eviction software 840 of FIG. 8 may evict the selected entry. At block 1415, execution software 815 of FIG. 8 may store the highest append index for the key whose metadata is being evicted from hash table 165 of FIG. 1: this highest append index may be stored in an index object on KV-SSD 125 of FIG. 1. As shown by dashed line 1420, block 1415 may be omitted.

At this point, there is at least one open entry in hash table 165 of FIG. 1 (either because hash table 165 of FIG. 1 was not full at block 1425, or because an entry was evicted from hash table 165 of FIG. 1 by eviction software 840 of FIG. 8 in block 1410). At block 1430 (FIG. 14B), hash table software 835 of FIG. 8 may select an available entry in hash table 165 of FIG. 1 to store the new metadata. Since the new metadata is not yet in hash table 165 of FIG. 1, hash table software 835 of FIG. 8 needs to load the metadata from KV-SSD 125 of FIG. 1. At block 1435, index determining software 850 of FIG. 8 may determine the highest append index for the key whose metadata is to be stored in hash table 165 of FIG. 1. The operation of index determining software 850 of FIG. 8 is discussed further with reference to FIGS. 18A-20 below. Alternatively, at block 1440, hash table software 835 of FIG. 8 may access the highest append index from an index object stored on KV-SSD 125 of FIG. 1. Either way, at block 1445 combiner software 810 may be used to combine the highest append index with key 150-1 of FIG. 1 to form indexed key 910 of FIG. 9. At block 1450, hash table software 835 of FIG. 8 may use execution software 815 of FIG. 8 to access modified value 1105 of FIG. 11 from KV-SSD 125 of FIG. 1 for indexed key 910 of FIG. 9, after which hash table software 835 of FIG. 8 may isolate metadata 170-1 of FIG. 1 from modified value 1105 of FIG. 11. Finally, at block 1455, hash table software 835 of FIG. 8 may store metadata 170-1 of FIG. 1 may store metadata 170-1 of FIG. 1 in hash table 165 of FIG. 1.

Figure 15A:
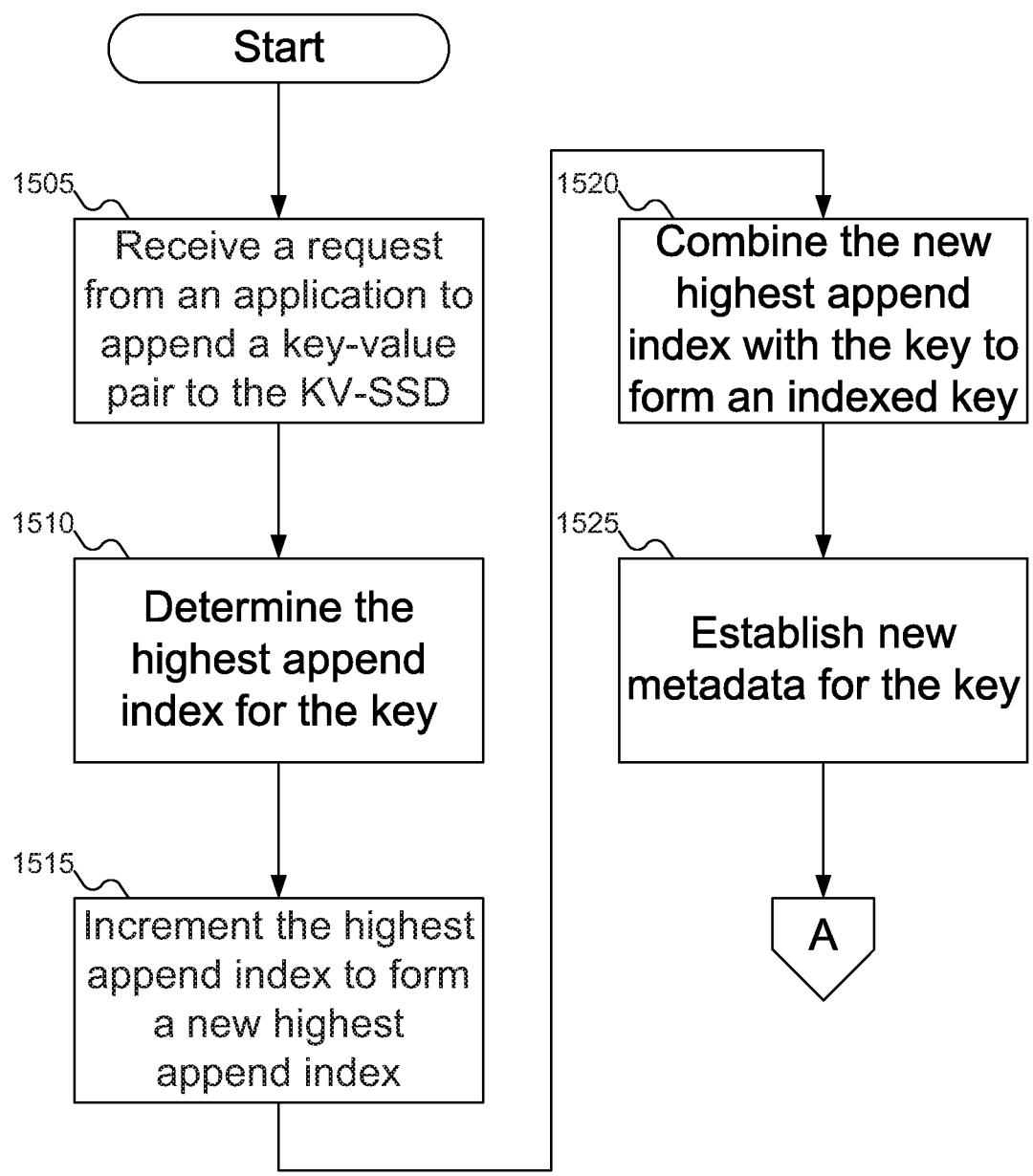
FIGS. 15A-15B show a flowchart of an example procedure for the KVV of FIG. 1 to support the append request of FIG. 5 on the KV-SSD of FIG. 1, according to an embodiment of the inventive concept.
Figure 15B:
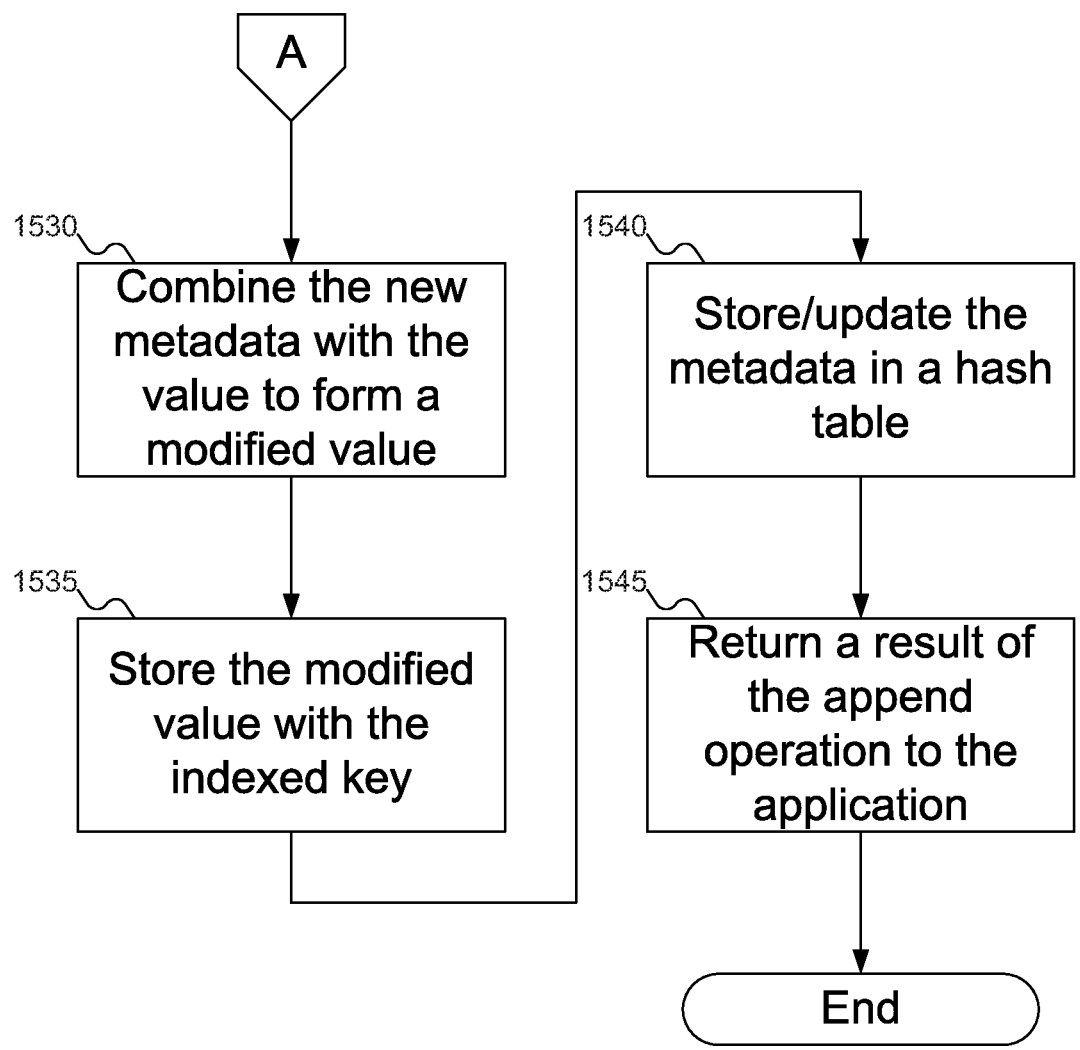

FIGS. 15A-15B show a flowchart of an example procedure for KVV 160 of FIG. 1 to support append request 505 of FIG. 5 on KV-SSD 125 of FIG. 1, according to an embodiment of the inventive concept. In FIG. 15A, at block 1505, application 120 of FIG. 1 may send append request 505 of FIG. 5 to KVV 160 of FIG. 1. At block 1510, index determining software 850 of FIG. 8 may determine the highest append index for key 150-1 of FIG. 1. The operation of index determining software 850 of FIG. 8 is discussed further with reference to FIGS. 18A-20 below. At block 1515, KVV 160 of FIG. 1 may increment the highest append index to form a new highest append index. At block 1520, combiner software 810 of FIG. 8 may combine the new highest append index with key 150-1 of FIG. 1 to form indexed key 910 of FIG. 9. At block 1525, metadata software 825 of FIG. 8 may generate metadata 170-1 of FIG. 1 for key 150-1 of FIG. 1.

At block 1530 (FIG. 15B), second combiner software 830 of FIG. 8 may combine metadata 170-1 of FIG. 1 with value 155-1 of FIG. 1 to form modified value 1105 of FIG. 11. At block 1535, execution software 815 of FIG. 8 may send a store operation on KV-SSD 125 to store modified value 1105 of FIG. 11 associated with indexed key 910 of FIG. 9. At block 1540, hash table software 835 of FIG. 8 may be used to store and/or update metadata 170-1 of FIG. 1 in hash table 165 of FIG. 1. Note that block 1540 is almost identical to block 1340 of FIG. 13B, except that if metadata 170-1 of FIG. 1 is already in hash table 165 of FIG. 1, then metadata 170-1 of FIG. 1 in hash table 165 of FIG. 1 merely needs to be updated with the new metadata information (such as new highest append index 905 of FIG. 9 and updated append search structure 1015 of FIG. 10), rather than being stored new outright. Finally, at block 1545, result software 820 of FIG. 8 may return a result of append request 505 of FIG. 5 from KVV 160 of FIG. 1 to application 120 of FIG. 1.

Figure 16A:
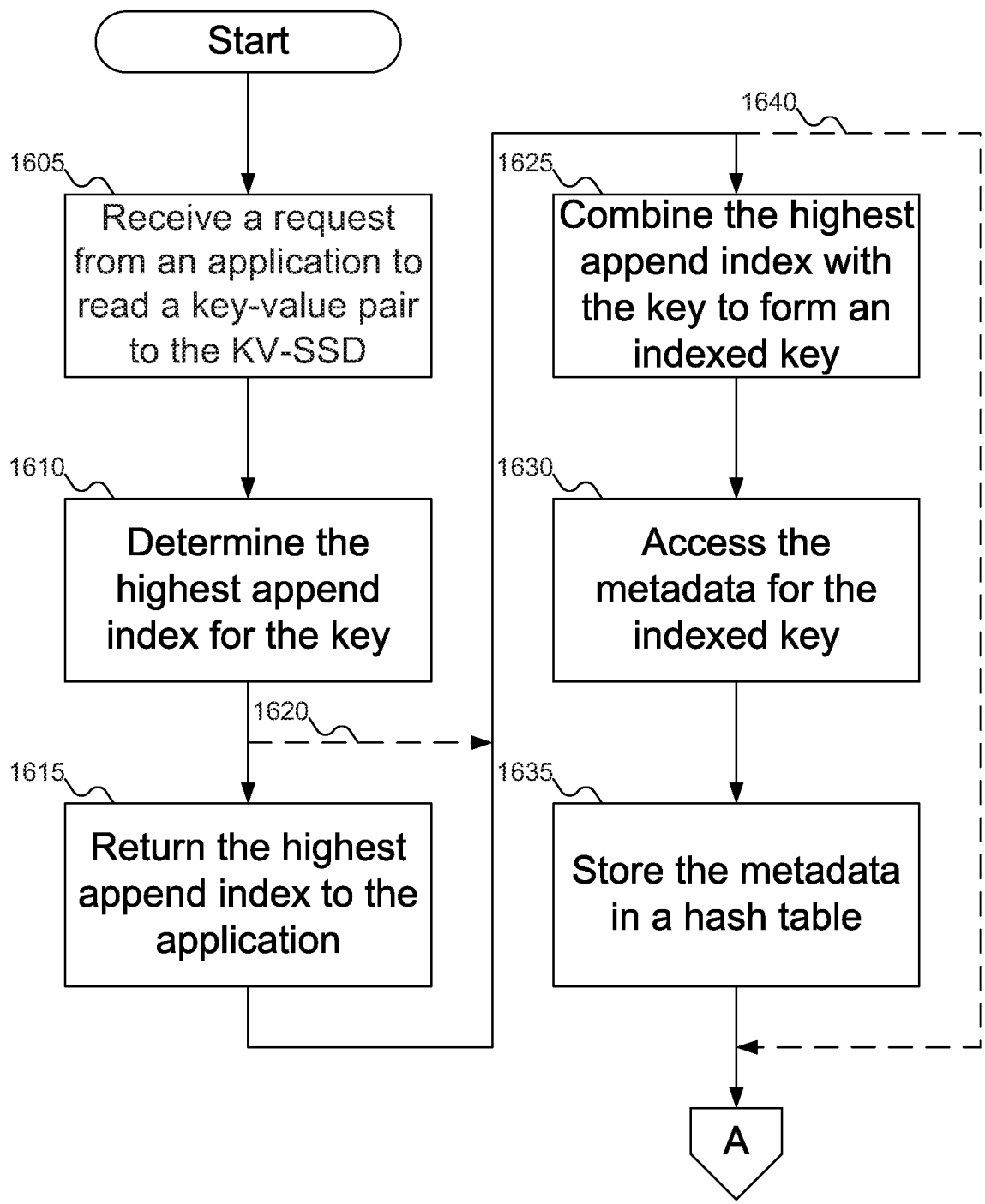
FIGS. 16A-16C shows a flowchart of an example procedure for the KVV of FIG. 1 to support the read request of FIG. 6 on the KV-SSD of FIG. 1, according to an embodiment of the inventive concept.
Figure 16B:
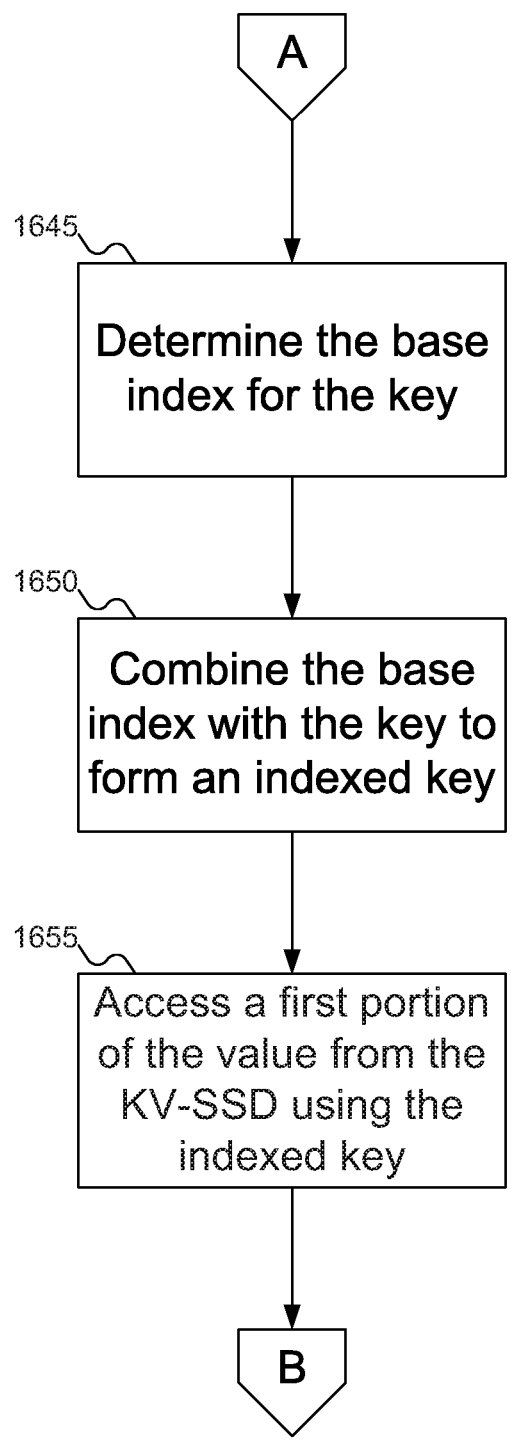
Figure 16C:
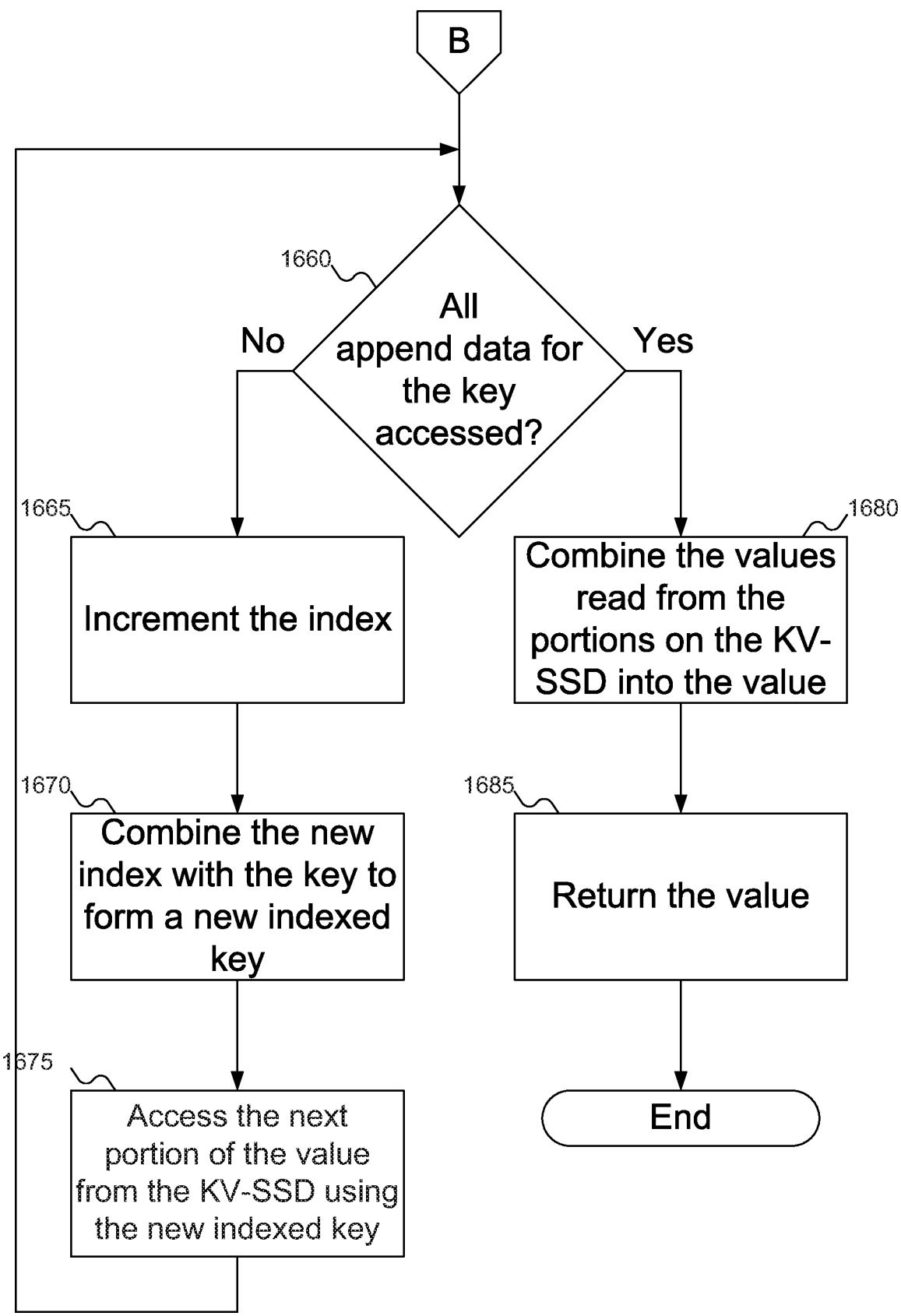

FIGS. 16A-16C shows a flowchart of an example procedure for KVV 160 of FIG. 1 to support read request 605 of FIG. 6 on KV-SSD 125 of FIG. 1, according to an embodiment of the inventive concept. In FIG. 16A, at block 1605, application 120 of FIG. 1 may send read request 605 of FIG. 6 to KVV 160 of FIG. 1. At block 1610, index determining software 850 of FIG. 8 may determine the highest append index for key 150-1 of FIG. 1. The operation of index determining software 850 of FIG. 8 is discussed further with reference to FIGS. 18A-20 below. At block 1615, result software 820 of FIG. 8 may report to application 120 of FIG. 1 the highest append index for key 150-1 of FIG. 1. As discussed above with reference to FIG. 6, application 120 of FIG. 1 may use this information to allocate sufficient memory or other resources to use value 155-1 of FIG. 1. Block 1615 may be omitted, as shown by dashed line 1620.

At block 1625, combiner software 810 of FIG. 8 may combine the highest append index for key 150-1 of FIG. 1 with key 150-1 of FIG. 1 to form indexed key 910 of FIG. 9. At block 1630, execution software 815 of FIG. 8 may use indexed key 910 of FIG. 9 to access metadata 170-1 of FIG. 1 from KV-SSD 125 of FIG. 1, after which (at block 1635) hash table software 835 of FIG. 8 may store metadata 170-1 of FIG. 1 in hash table 165 of FIG. 1. Blocks 1625, 1630, and 1635 may be omitted, as shown by dashed line 1640.

Once KVV 160 of FIG. 1 knows the highest append index for key 150-1 of FIG. 1, at block 1645 (FIG. 16B) KVV 160 of FIG. 1 may determine the base index for key 150-1 of FIG. 1. At block 1650, combiner software 810 of FIG. 8 may combine the base index with key 150-1 of FIG. 1 to produce indexed key 910 of FIG. 9. At block 1655, execution software 815 of FIG. 8 may access modified value 1105 of FIG. 11 from KV-SSD 125 of FIG. 1 and extract value 155-1 of FIG. 1 that was included in original write request 405 of FIG. 4.

At block 1660 (FIG. 16C), KVV 160 of FIG. 1 may determine whether all the requested data has been accessed from KV-SSD 125 of FIG. 1. Put another way, KVV 160 of FIG. 1 may compare the current index that was used to access value 155-1 of FIG. 1 from KV-SSD 125 of FIG. 1 with the highest append index for key 150-1 of FIG. 1. If there are still append requests 505 of FIG. 21 for key 150-1 of FIG. 1 to be accessed from KV-SSD 125 of FIG. 1, then at block 1665 KVV 160 of FIG. 1 may increment or otherwise adjust the index to the next value. At block 1670, combiner software 810 of FIG. 1 may combine the new index with key 150-1 of FIG. 1 to form new indexed value 910 of FIG. 9. At block 1675, execution software 815 of FIG. 8 may access modified value 1105 of FIG. 11 from KV-SSD 125 of FIG. 1 and extract value 155-1 of FIG. 1 that was included in the indexed append request 505 of FIG. 5, after which control returns to block 1660.

Once KVV 160 of FIG. 1 has retrieved all data associated with key 150-1 of FIG. 1, then at block 1680 KVV 160 of FIG. 1 may concatenate the various retrieved values to form the value desired by application 120 of FIG. 1. Finally, at block 1685, result software 820 of FIG. 8 may return the assembled value to application 120 of FIG. 1.

Note that the example procedure shown in FIGS. 16A-16C may operate without first determining the highest append index for key 150-1 of FIG. 1. Specifically, since KVV 160 of FIG. 1 will need to read the original write value and all subsequent append values from KV-SSD 125 of FIG. 1, KVV 160 of FIG. 1 may operate by simply reading each index for key 150-1 of FIG. 1 in turn starting with the base index, and ending when KV-SSD 125 of FIG. 1 reports that KV-SSD 125 of FIG. 1 does not store a value for a particular indexed key. And even if result software 820 of FIG. 8 needs to report the highest append index to application 120 of FIG. 1 before the assembled value is returned, KVV 160 of FIG. 1 may temporarily store the assembled value after reporting the highest append index to give application 120 of FIG. 1 time to use the highest append index.

In FIGS. 16A-16C, read request 605 of FIG. 6 is assumed to request the entire value for key 150-1, starting with original write request 405 of FIG. 4 and including every append request 505 of FIG. 5. If only a subset of these write/append requests is desired in read request 605 of FIG. 6, the base index mentioned in FIGS. 16A-16C may be replaced with the lower append index provided by application 120 of FIG. 1, and the highest append index may be replaced with the upper append index provided by application 120 of FIG. 1.

In some embodiments of the inventive concept, read request 605 of FIG. 6 may support an offset parameter. The offset parameter may indicate that only a portion of the data is to be returned, starting a particular offset relative to the value. Such embodiments of the inventive concept may use metadata 170-1 of FIG. 1 to find the append index for append request 505 of FIG. 5 storing the data beginning at that offset. That is, embodiments of the inventive concept may search metadata 170-1 of FIG. 1 to locate append index 905 of FIG. 9 such that append offset 1005 of FIG. 10 is less than or equal to the desired offset and append offset 1005 of FIG. 10 plus append length 1010 of FIG. 10 is greater than or equal to the desired offset. This search may be performed in any manner desired, using conventional techniques to access information in append search structure 1015 of FIG. 10. In such embodiments of the inventive concept, the base index referred to above in the discussion regarding FIGS. 16A-16C may then be replaced with the append index that includes the desired offset.

Figure 17A:
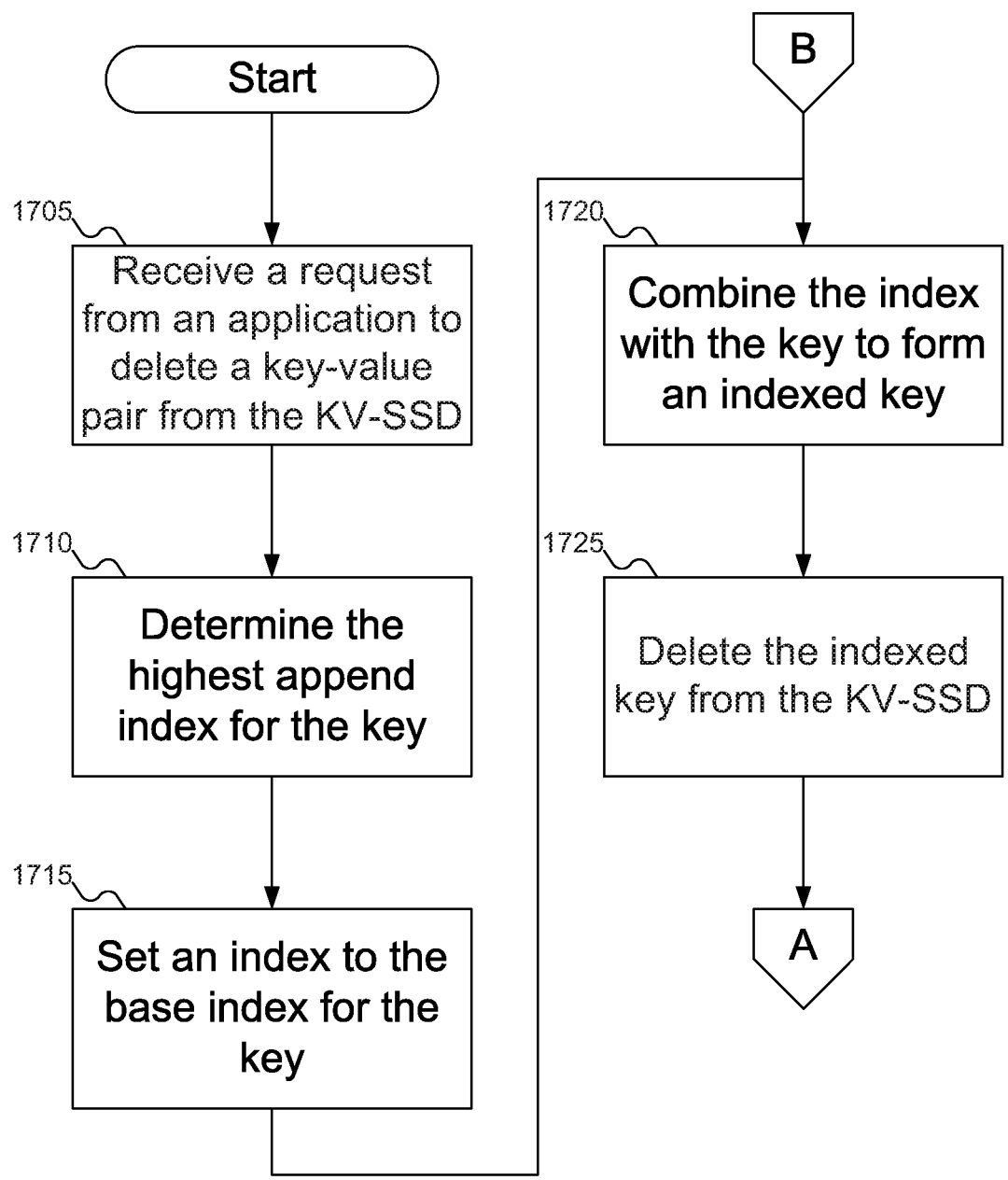
FIGS. 17A-17C shows a flowchart of an example procedure for the KVV of FIG. 1 to support the delete request of FIG. 7 on the KV-SSD of FIG. 1, according to an embodiment of the inventive concept.
Figure 17B:
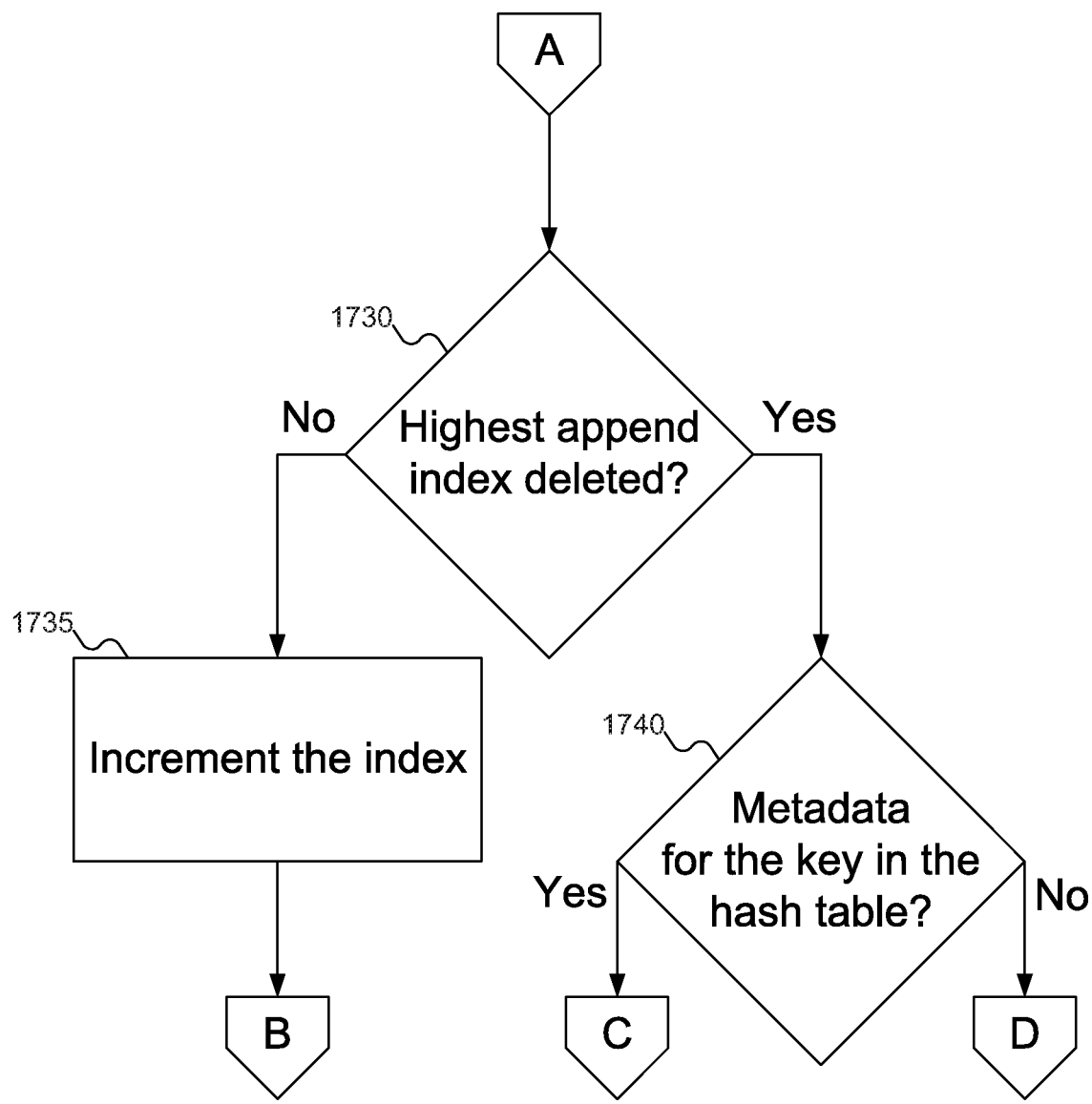
Figure 17C:
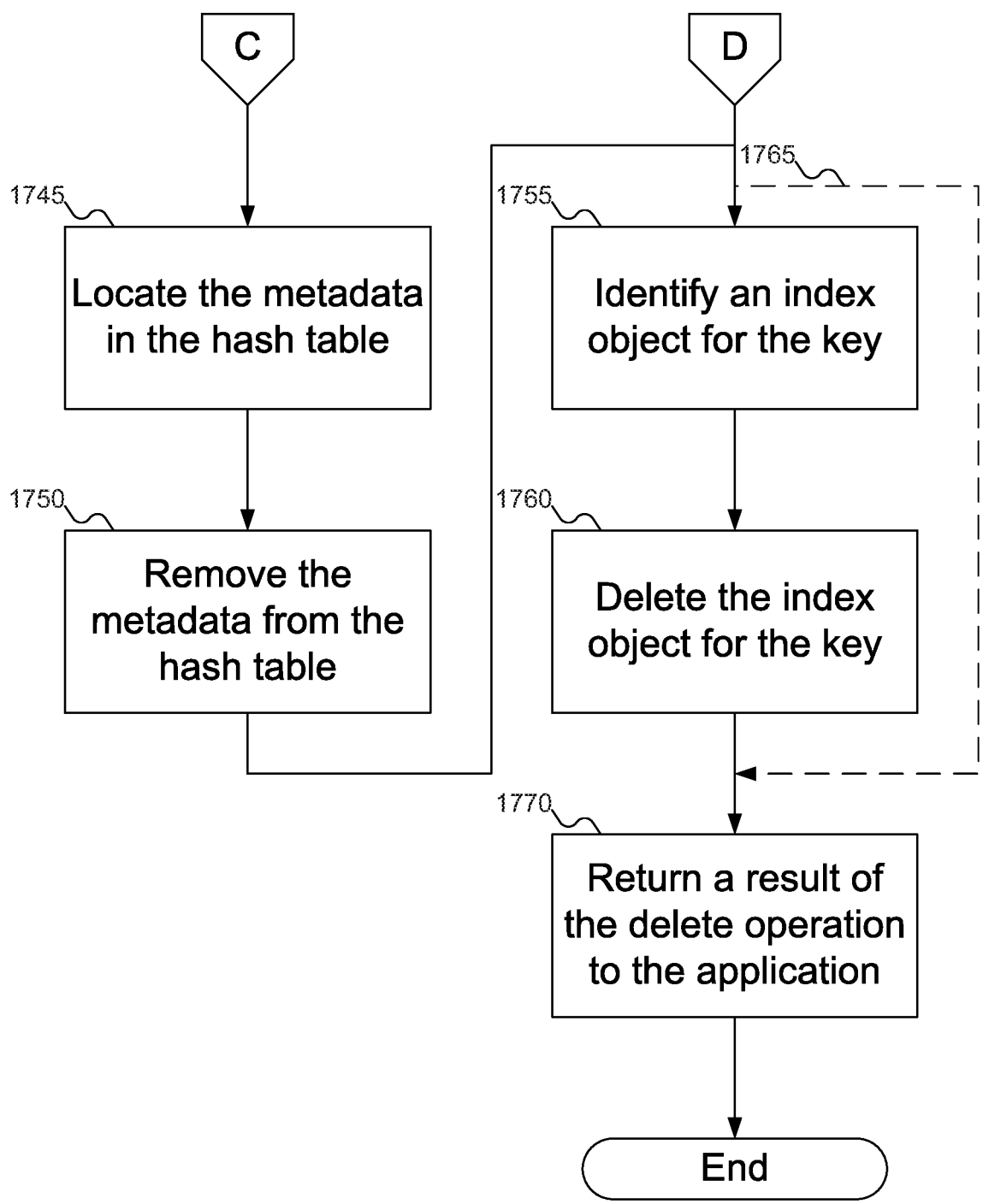

FIGS. 17A-17C shows a flowchart of an example procedure for KVV 160 of FIG. 1 to support delete request 705 of FIG. 7 on KV-SSD 125 of FIG. 1, according to an embodiment of the inventive concept. In FIG. 17A, at block 1705, application 120 of FIG. 1 may send delete request 705 of FIG. 7 to KVV 160 of FIG. 1. At block 1710, index determining software 850 of FIG. 8 may determine the highest append index for key 150-1 of FIG. 1. The operation of index determining software 850 of FIG. 8 is discussed further with reference to FIGS. 18A-20 below. At block 1715, KVV 160 of FIG. 1 may determine the base index for key 150-1 of FIG. 1. At block 1720, combiner software 810 of FIG. 8 may combine the base index with key 150-1 of FIG. 1 to form indexed key 910 of FIG. 9. At block 1725, execution software 815 of FIG. 8 may instruct KV-SSD 125 of FIG. 1 to delete the indexed key.

At block 1730 (FIG. 17B), KVV 160 of FIG. 1 may determine if all the append indices for key 150-1 of FIG. 1 have been deleted. KVV 160 of FIG. 1 may make this determination by comparing the current index with the highest append index for key 150-1 of FIG. 1: if the current index is less than the highest append index for key 150-1 of FIG. 1, then not all append indices for key 150-1 of FIG. 1 have been deleted. If not all append indices for key 150-1 of FIG. 1 have been deleted, the at block 1735 KVV 160 of FIG. 1 may increment or otherwise modify the index to the next value, and control may return to block 1720 of FIG. 17A. Otherwise, at block 1740, hash table software 835 of FIG. 8 may determine whether metadata 170-1 of FIG. 1 for key-150-1 of FIG. 1 is in hash table 165 of FIG. 1.

If metadata 170-1 of FIG. 1 is in hash table 165 of FIG. 1, then at block 1745 (FIG. 17C) hash table software 835 of FIG. 8 may locate metadata 170-1 of FIG. 1, and at block 1750 hash table software 835 of FIG. 8 may remove (i.e., delete) metadata 170-1 of FIG. 1 from hash table 165 of FIG. 1.

Whether or not hash table 165 of FIG. 1 contained metadata 170-1 of FIG. 1, at block 1755 KVV 160 of FIG. 1 may form a key representing the index object that may exist and store the highest append index for key 150-1 of FIG. 1. Then, at block 1760, execution software 815 of FIG. 8 may instruct KV-SSD 125 of FIG. 1 to delete the index object. Blocks 1755 and 1760 may be omitted, as shown by dashed line 1765. Finally, at block 1770, result software 820 of FIG. 8 may return a result of delete request 705 of FIG. 7 from KVV 160 of FIG. 1 to application 120 of FIG. 1.

In FIGS. 14A-17C, there are some blocks that include determining the highest append index for a key. FIGS. 18A-20 show various embodiments for determining the highest append index for a key. As noted above with reference to FIG. 12, these embodiments may be combined, and are not mutually exclusive.

Figure 18A:
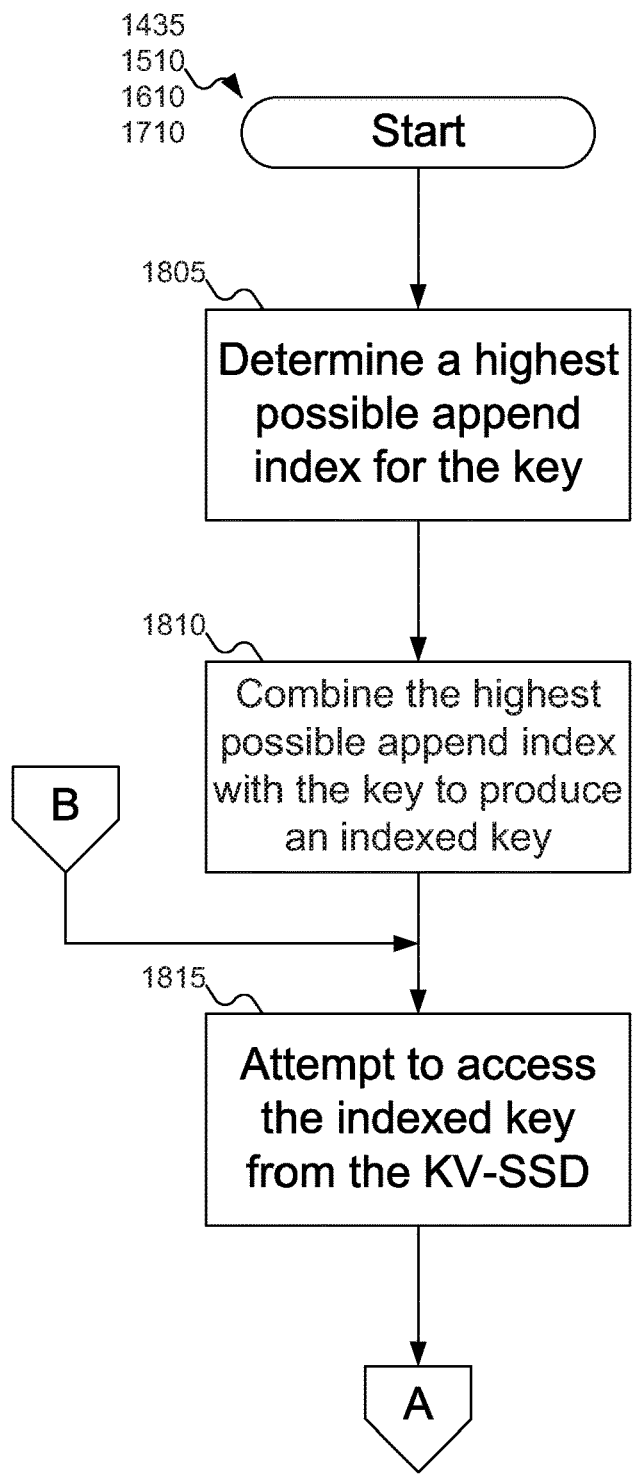
FIGS. 18A-18B show a flowchart of an example procedure for the KVV of FIG. 1 to determine the highest append index for a key on the KV-SSD of FIG. 1, according to an embodiment of the inventive concept.
Figure 18B:
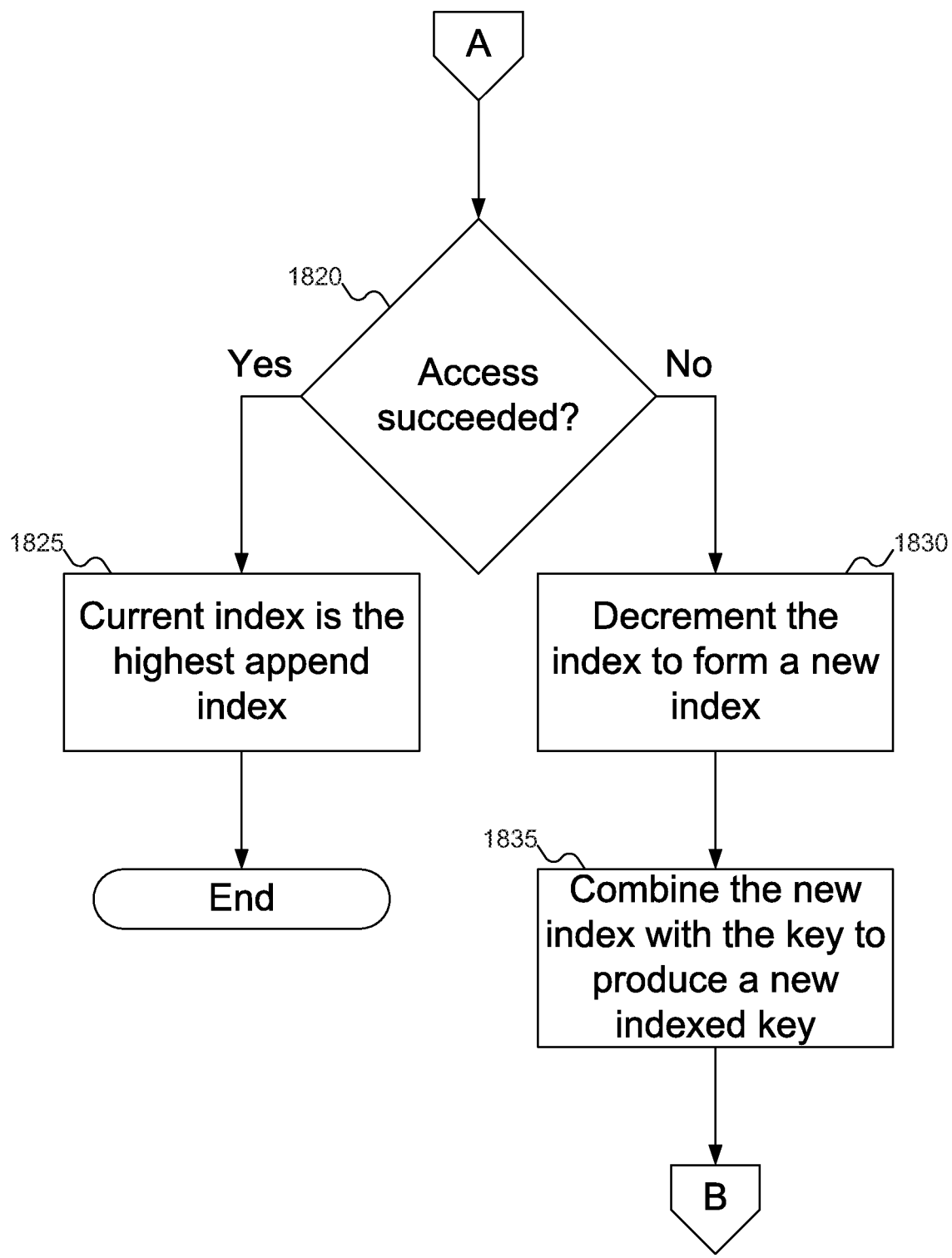

FIGS. 18A-18B show a flowchart of an example procedure for KVV 160 of FIG. 1 to determine the highest append index for a key on KV-SSD 125 of FIG. 1, according to an embodiment of the inventive concept. In FIG. 18A, at block 1805, index determining software 850 of FIG. 8 may determine the highest possible append index. As discussed above, KVV 160 of FIG. 1 may set a limit on the number of append operations that may be performed: this limit relates to the highest possible append index. For example, if a total of 1024 write/append requests are permitted for a given key, and the base index is 0, then the highest possible append index would be 1023.

At block 1810, combining software 810 of FIG. 1 may combine the highest possible append index with key 150-1 of FIG. 1 to form indexed key 910 of FIG. 9. At block 1815, execution software 815 of FIG. 8 may attempt to access a value associated with this indexed key 910 of FIG. 9 from KV-SSD 125 of FIG. 1.

At block 1820 (FIG. 18B), index determining software 850 of FIG. 8 may determine if KV-SSD 125 of FIG. 1 stores an object with indexed key 910 of FIG. 9. If so, then at block 1825 the index is the highest append index for key 150-1 of FIG. 1, and processing may end. Otherwise, KV-SSD 125 of FIG. 1 does not store an object with indexed key 910 of FIG. 9. At block 1830, index determining software 850 of FIG. 8 may decrement the index, and at block 1835 combining software 810 of FIG. 8 may combine the new index with key 150-1 of FIG. 1 to form new indexed key 910 of FIG. 1. Processing may then return to block 1815 to see if KV-SSD 125 of FIG. 1 stores an object with new indexed key 910 of FIG. 9. In this manner, index determining software 850 of FIG. 8 may iteratively search for the highest append index for key 150-1 of FIG. 1.

Note that in FIGS. 18A-18B, index determining software 850 of FIG. 8 may search sequentially downward from the highest possible append index to locate the highest append index for key 150-1 of FIG. 1. But index determining software 850 of FIG. 8 may also search sequentially upward from the base index, incrementing the index until KV-SSD 125 of FIG. 1 indicates that no object was found for a particular indexed key, at which point index determining software 850 of FIG. 8 would know that the previous index was the highest append index for the key.

Figure 19A:
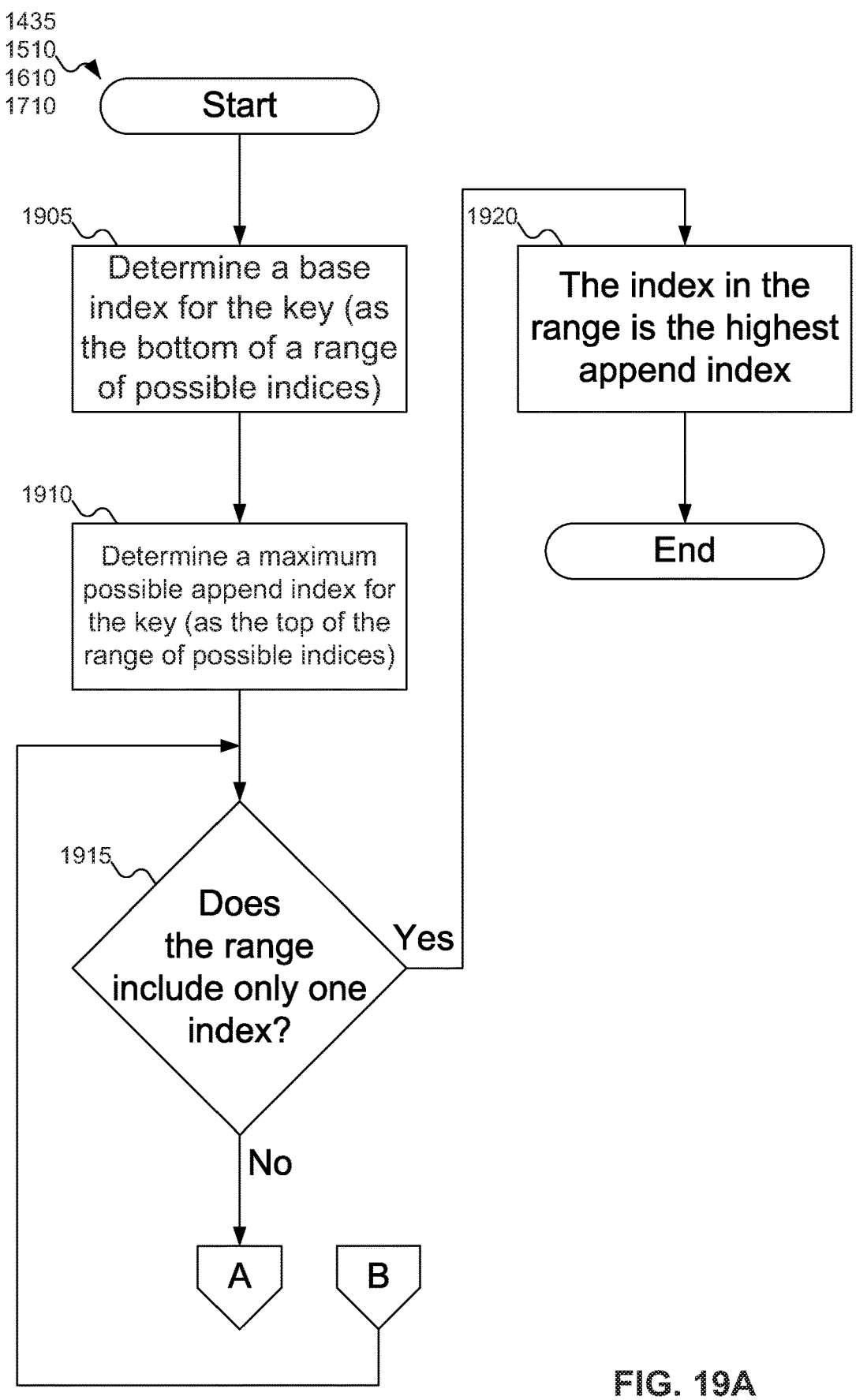
FIGS. 19A-19B show a flowchart of an example procedure for the KVV of FIG. 1 to determine the highest append index for a key on the KV-SSD of FIG. 1, according to another embodiment of the inventive concept.
Figure 19B:
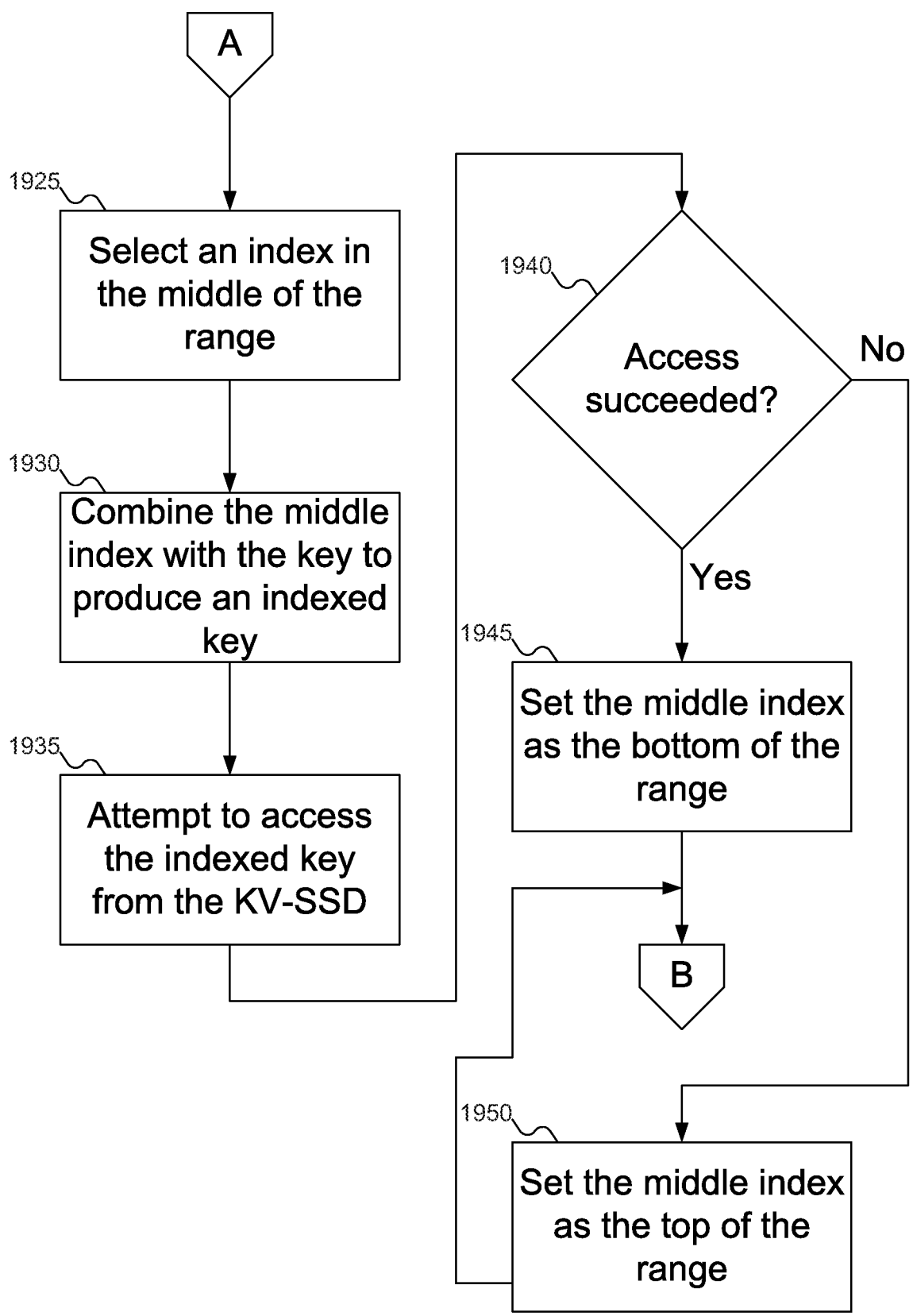

FIGS. 19A-19B show a flowchart of an example procedure for KVV 160 of FIG. 1 to determine the highest append index for a key on KV-SSD 125 of FIG. 1, according to another embodiment of the inventive concept. In FIG. 19A, at block 1905, index determining software 850 of FIG. 8 may determine the base index for key 150-1 of FIG. 1. At block 1910, index determining software 850 of FIG. 8 may determine the highest possible append index for key 150-1 of FIG. 1. As with block 1805 of FIG. 18A, the highest append index may be determined relative to the maximum number of append requests for a key permitted by KVV 160 of FIG. 1. Blocks 1905 and 1910 between them define a range of possible append indices to be searched for the highest append index for key 150-1 of FIG. 1.

At block 1915, index determining software 850 of FIG. 8 may check to see if the range has been narrowed down to a single index: that is, the lower end of the range is equal to the upper end of the range. If so, then at block 1920 the highest append index for key 150-1 of FIG. 1 has been found, and processing may end.

Otherwise, at block 1925 (FIG. 19B), index determining software 850 of FIG. 8 may select an index in the middle of the range. For example, if low represents the index at the lower end of the range and high represents the index at the upper end of the range, this middle index may be calculated as (high−low)÷2 (if that value is not an integer, the numbers just above or below this value may be selected). At block 1930, combiner software 810 of FIG. 8 may combine this middle index value with key 150-1 of FIG. 1 to form indexed key 910 of FIG. 9. At block 1935, execution software 815 of FIG. 8 may attempt to access a value for indexed key 910 of FIG. 9 from KV-SSD 125 of FIG. 1. At block 1940, index determining software 850 of FIG. 8 may determine if the access succeeded: that is, KV-SSD 125 of FIG. 1 stored an object with the indexed key. Note that index determining software 850 of FIG. 8 is not concerned here with any value stored in the object on KV-SSD 125 of FIG. 1: all index determining software 850 of FIG. 8 is interested in is whether the object exists on KV-SSD 125 of FIG. 1. If the access succeeded, then at block 1945, index determining software 850 of FIG. 8 may replace the lower end of the range with the middle index; otherwise at block 1950 index determining software 850 of FIG. 8 may replace the upper end of the range with the middle index. Either way, control returns to block 1915 (FIG. 19A) to see if the highest append index has been located.

Figure 20:
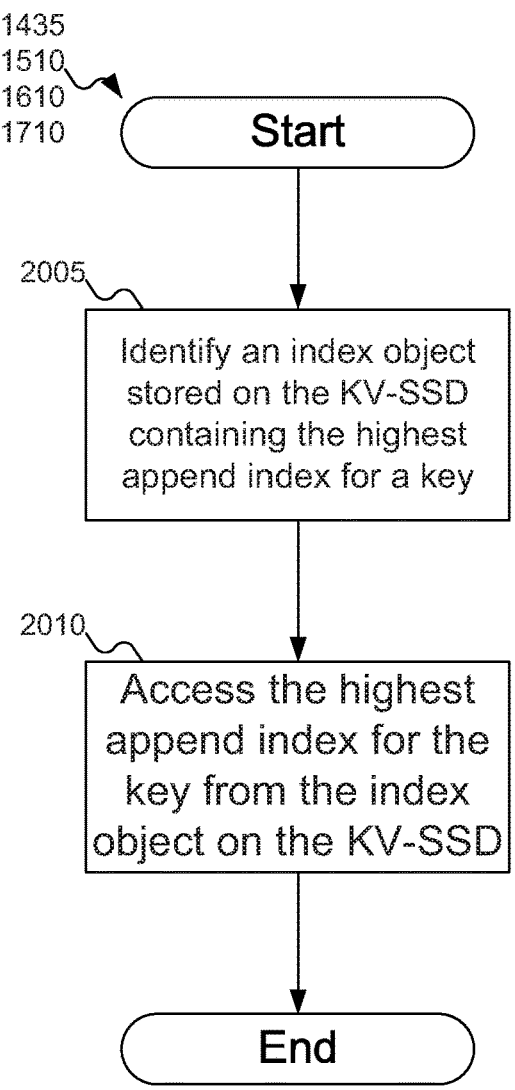
FIG. 20 shows a flowchart of an example procedure for the KVV of FIG. 1 to determine the highest append index for a key on the KV-SSD of FIG. 1, according to yet another embodiment of the inventive concept.

FIG. 20 shows a flowchart of an example procedure for KVV 160 of FIG. 1 to determine the highest append index for a key on KV-SSD 125 of FIG. 1, according to yet another embodiment of the inventive concept. In FIG. 20, at block 2005, index determining software 850 of FIG. 8 may determine the key associated with an index object stored on KV-SSD 125 of FIG. 1 that stores the highest append index for key 150-1 of FIG. 1. Finally, at block 2010, execution software 815 of FIG. 8 may access the highest append index from the index object on KV-SSD 125 of FIG. 1.

In FIGS. 13A-20, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer technical advantages over the prior art. Embodiments of the inventive concept provide a mechanism by which data may be appended to existing values stored on KV-SSD 125 of FIG. 1. In conventional systems, when application 120 of FIG. 1 wants to append new data to a value stored on KV-SSD 125, application 120 must read the existing value, modify that value to append the new data, and store the modified value back on KV-SSD 125 of FIG. 1 (which, to reuse the original key, requires invaliding the original object stored on KV-SSD 125 of FIG. 1). This approach requires a read request, a write request, and a delete request sent by application 120 of FIG. 1 to KV-SSD 125 of FIG. 1, plus whatever processor cycles are needed to modify the value to append the new data. In addition, the delete operation means that there is more storage on KV-SSD 125 of FIG. 1 storing invalidated data that requires garbage collection, which may be an expensive (time-consuming) process.

In contrast, assuming that metadata 170-1 of FIG. 1 is stored in hash table 165 of FIG. 1 (which should be a correct assumption most of the time), there is no need for either a read request or a delete request of KV-SSD 125 of FIG. 1 in embodiments of the inventive concept. All that is needed is a write request of KV-SSD 125 of FIG. 1 to store the append information. In addition, no processor cycles are needed to modify the value. Finally, by avoiding the need to delete an object from KV-SSD 125 of FIG. 1, the need for garbage collection on KV-SSD 125 of FIG. 1 may be reduced.

The append semantic also offers other benefits. In conventional systems, application 120 of FIG. 1 must handle the possibility that a particular value may exceed the maximum object size permitted on KV-SSD 125 of FIG. 1. With the append semantic offered by embodiments of the inventive concept, KVV 160 of FIG. 1 may handle the possibility that a particular value may be too large to fit in a single object on KV-SSD 125 of FIG. 1, eliminating the need for application 120 of FIG. 1 to deal with this situation.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system. The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes software implemented using a circuit, including:

an Application Programming Interface (API) to receive a request from an application relating to a key-value pair for a Key-Value Solid State Drive (KV-SSD), the key-value pair including a key and a value, the application being executed by a processor;

combiner software to combine the key with an index to produce an indexed key; and execution software to execute an operation on the KV-SSD using the indexed key and the value.

Statement 2. An embodiment of the inventive concept includes software implemented using the circuit according to statement 1, further comprising result software to return a result of the request to the application.

Statement 3. An embodiment of the inventive concept includes software implemented using the circuit according to statement 1, wherein the circuit includes a second processor.

Statement 4. An embodiment of the inventive concept includes software implemented using the circuit according to statement 3, wherein the second processor is the processor executing the application.

Statement 5. An embodiment of the inventive concept includes software implemented using the circuit according to statement 4, wherein the software is part of an operating system executed by the processor.

Statement 6. An embodiment of the inventive concept includes software implemented using the circuit according to statement 3, wherein the second processor is a component of the KV-SSD.

Statement 7. An embodiment of the inventive concept includes software implemented using the circuit according to statement 1, wherein the circuit includes at least one of a Field Programmable Gate Array (FPGA), a Graphics Processing Unit (GPU), and an Application-Specific Integrated Circuit (ASIC).

Statement 8. An embodiment of the inventive concept includes software implemented using the circuit according to statement 1, further comprising metadata software to generate metadata for the key.

Statement 9. An embodiment of the inventive concept includes software implemented using the circuit according to statement 8, wherein the metadata includes at least one of an append index, an append offset, an append length, and a data structure of append requests for the key-value pair.

Statement 10. An embodiment of the inventive concept includes software implemented using the circuit according to statement 8, further comprising:

second combiner software to combine the metadata with the value to produce a modified value; and the execution software is operative to execute an operation on the KV-SSD using the indexed key and the modified value.

Statement 11. An embodiment of the inventive concept includes software implemented using the circuit according to statement 8, further comprising hash table software to use a hash table in a memory storing the metadata associated with the key.

Statement 12. An embodiment of the inventive concept includes software implemented using the circuit according to statement 11, wherein the hash table software include eviction software to evict an old metadata from the hash table.

Statement 13. An embodiment of the inventive concept includes software implemented using the circuit according to statement 1, wherein:

the request includes one of a write request and an append request; and the execution software is operative to store the value on the KV-SSD associated with the indexed key.

Statement 14. An embodiment of the inventive concept includes software implemented using the circuit according to statement 13, wherein:

the value is larger than a maximum size for an object on the KV-SSD;

the combiner software is operative to combine the key with a plurality of indices to produce a plurality of indexed keys;

the software implemented using the circuit further comprises dividing software to divide the value into a plurality of portions; and the execution software is operative to store the plurality of portions on the KV-SSD associated with the plurality of indexed keys.

Statement 15. An embodiment of the inventive concept includes software implemented using the circuit according to statement 14, wherein the hash table software is operative to add an entry in the hash table for the key.

Statement 16. An embodiment of the inventive concept includes software implemented using the circuit according to statement 14, wherein the hash table software is operative to update an entry in the hash table for the key.

Statement 17. An embodiment of the inventive concept includes software implemented using the circuit according to statement 1, wherein:

the request includes a read request; and the execution software is operative to read a plurality of values associated with a plurality of indexed keys on the KV-SSD and to combine the values to produce the value.

Statement 18. An embodiment of the inventive concept includes software implemented using the circuit according to statement 1, wherein:
the request includes a delete request; and
the execution software is operative to delete a plurality of indexed keys on the KV-SSD.

Statement 19. An embodiment of the inventive concept includes software implemented using the circuit according to statement 18, wherein
the hash table software is operative to delete an entry in the hash table for the key.

Statement 20. An embodiment of the inventive concept includes software implemented using the circuit according to statement 1, further comprising index determining software to determine a highest append index for the key.

Statement 21. An embodiment of the inventive concept includes software implemented using the circuit according to statement 20, wherein the index determining software is operative to access the highest append index for the key from metadata for the key stored in a hash table in memory.

Statement 22. An embodiment of the inventive concept includes software implemented using the circuit according to statement 20, wherein the index determining software is operative to search the KV-SSD for the highest append index for the key.

Statement 23. An embodiment of the inventive concept includes software implemented using the circuit according to statement 22, wherein the index determining software is operative to sequentially attempt to access indexed keys on the KV-SSD to determine the highest append index for the key.

Statement 24. An embodiment of the inventive concept includes software implemented using the circuit according to statement 22, wherein the index determining software is operative to perform a binary search of a range of indexed keys on the KV-SSD to determine the highest append index.

Statement 25. An embodiment of the inventive concept includes software implemented using the circuit according to statement 20, wherein the index determining software is operative to access the highest append index from an index object on the KV-SSD.

Statement 26. An embodiment of the inventive concept includes a method, comprising:
receiving a write request from an application to store a value associated with a key on a Key-Value Solid State Drive (KV-SSD) as a key-value pair, the application being executed by a processor;
determining a base index for the key;
combining the base index with the key to produce an indexed key; and
performing a store operation on the KV-SSD associating the indexed key with the value.

Statement 27. An embodiment of the inventive concept includes the method according to statement 26, further comprising returning a write result of the store operation to the application.

Statement 28. An embodiment of the inventive concept includes the method according to statement 26, wherein:
the method further comprises:
establishing a first metadata for the key; and
combining the value with the first metadata to produce a first modified value; and performing a store operation on the KV-SSD associating the indexed key with the value includes performing the store operation on the KV-SSD associating the indexed key with the first modified value.

Statement 29. An embodiment of the inventive concept includes the method according to statement 28, wherein the first metadata includes the base index for the key.

Statement 30. An embodiment of the inventive concept includes the method according to statement 29, wherein the first metadata further includes a first append offset and a first append length.

Statement 31. An embodiment of the inventive concept includes the method according to statement 29, wherein the first metadata further includes a first data structure of append write requests for the key-value pair.

Statement 32. An embodiment of the inventive concept includes the method according to statement 29, further comprising storing the first metadata in a hash table in a memory, the first metadata associated with the key.

Statement 33. An embodiment of the inventive concept includes the method according to statement 32, wherein storing the first metadata in a hash table in a memory includes evicting an exiting metadata associated with a second key from the hash table.

Statement 34. An embodiment of the inventive concept includes the method according to statement 33, wherein evicting an exiting metadata associated with a second key from the hash table includes selecting the second key as a least recently used key in the hash table.

Statement 35. An embodiment of the inventive concept includes the method according to statement 26, wherein:
the method further comprises, based at least in part on the value exceeding a maximum size for an object on the KV-SSD, determining a number of objects needed to store the value;
combining the base index with the key to produce an indexed key includes combining a plurality of indices with the key to produce a plurality of indexed keys, wherein the plurality of indexed keys is at least as large as the number of objects needed to store the value; and
performing a store operation on the KV-SSD associating the indexed key with the value includes performing a plurality of store operations on the KV-SSD associating each of the plurality of indexed keys with a portion of the value.

Statement 36. An embodiment of the inventive concept includes the method according to statement 26, further comprising bypassing the operations of determining a base index for the key, combining the base index with the key to produce an indexed key, and performing a store operation on the KV-SSD associating the indexed key with the value and instead performing a conventional store operation on the KV-SSD associating the key with the value.

Statement 37. An embodiment of the inventive concept includes the method according to statement 36, wherein bypassing the operations of determining a base index for the key, combining the base index with the key to produce an indexed key, and performing a store operation on the KV-SSD associating the indexed key with the value and instead performing a conventional store operation on the KV-SSD associating the key with the value is based at least in part on the write request specifying a conventional store operation.

Statement 38. An embodiment of the inventive concept includes the method according to statement 26, further comprising:
receiving an append request from the application to append a second value to the value associated with the key on the KV-SSD;

determining a highest append index for the key;
incrementing the highest append index to produce a new highest append index;
combining the new highest append index with the key to produce an append indexed key; and
performing a second store operation on the KV-SSD associating the append indexed key with the second value.

Statement 39. An embodiment of the inventive concept includes the method according to statement 38, further comprising returning an append result of the second store operation to the application.

Statement 40. An embodiment of the inventive concept includes the method according to statement 38, wherein:
the method further comprises:
establishing a second metadata for the key; and
combining the second value with the second metadata to produce a second modified value; and
performing a second store operation on the KV-SSD associating the append indexed key with the second value includes performing the second store operation on the KV-SSD associating the append indexed key with the second modified value.

Statement 41. An embodiment of the inventive concept includes the method according to statement 40, wherein the second metadata includes the append index for the key.

Statement 42. An embodiment of the inventive concept includes the method according to statement 41, wherein the second metadata further includes a second append offset and a second append length.

Statement 43. An embodiment of the inventive concept includes the method according to statement 41, wherein the second metadata further includes a second data structure of append requests for the key-value pair.

Statement 44. An embodiment of the inventive concept includes the method according to statement 41, further comprising storing the second metadata in a hash table in a memory, the second metadata associated with the key.

Statement 45. An embodiment of the inventive concept includes the method according to statement 44, wherein storing the second metadata in a hash table in a memory includes evicting an exiting metadata associated with a second key from the hash table.

Statement 46. An embodiment of the inventive concept includes the method according to statement 45, wherein evicting an exiting metadata associated with a second key from the hash table includes selecting the second key as a least recently used key in the hash table.

Statement 47. An embodiment of the inventive concept includes the method according to statement 44, wherein storing the second metadata in a hash table in a memory, the second metadata associated with the key includes:
determining that the hash table does not store the first metadata associated with the key;
determining the highest append index for the key; and
accessing the first metadata from the KV-SSD responsive to the highest append index for the key.

Statement 48. An embodiment of the inventive concept includes the method according to statement 47, wherein determining the highest append index for the key includes systematically requesting data associated with keys from the KV-SSD until the highest append index for the key is determined.

Statement 49. An embodiment of the inventive concept includes the method according to statement 48, wherein systematically requesting data associated with keys from the KV-SSD until the highest append index for the key is determined includes:
determining a highest possible append index for the key;
combining the highest possible append index for the key with the key to produce a test key; and
attempting to access the data associated the test key.

Statement 50. An embodiment of the inventive concept includes the method according to statement 49, wherein systematically requesting data associated with keys from the KV-SSD until the highest append index for the key is determined further includes:
decrementing the highest possible append index for the key to produce a new possible append index;
combining the new possible append index for the key with the key to produce a new test key;
attempting to access the data associated with the new test key; and
based at least in part on the KV-SSD response to the attempt to access the data associated with the new test key, repeating the operations of decrementing the highest possible append index for the key, combining the new possible append index for the key with the key, and attempting to access the data until the KV-SSD reports data associated with the new test key.

Statement 51. An embodiment of the inventive concept includes the method according to statement 48, wherein systematically requesting data associated with keys from the KV-SSD until the highest append index for the key is determined includes:
determining a range of possible highest append indices for the key;
selecting a middle append index in the middle of the range of possible highest append indices for the key;
combining the middle append index with the key to produce a test key;
attempting to access the data associated with the test key;
based at least in part on part on the KV-SSD response to the attempt to access the data associated with the test key, narrowing the range of possible highest append indices for the key to one of a first half range and a second half range; and
repeating the operations of selecting a middle append index, combining the middle append index with the key, narrowing the range of possible highest append indices for the key, and attempting to access the data associated with the test key until the range includes a single possible highest append index.

Statement 52. An embodiment of the inventive concept includes the method according to statement 47, wherein determining the highest append index for the key includes accessing the highest append index for the key from an index object for the key on the KV-SSD.

Statement 53. An embodiment of the inventive concept includes the method according to statement 44, further comprising, based at least in part on the key being selected for eviction from the hash table, storing the new highest append index in an index object for the key on the KV-SSD.

Statement 54. An embodiment of the inventive concept includes the method according to statement 38, further comprising:
receiving a read request from the application to read the value associated with the key from the KV-SSD;
determining the base index for the key;
determining the new highest append index for the key;
combining each index from the base index for the key to the new highest append index for the key with the key to produce at least two indexed keys;

performing a read operation on the KV-SSD for each of the at least two indexed keys, producing at least two read values;

combining the at least two read values to produce the value; and returning the value to the application in response to the read request.

Statement 55. An embodiment of the inventive concept includes the method according to statement 54, wherein:

the KV-SSD stores a first metadata associated with the key and a second metadata associated with the key, the first metadata including at least one of the first append index, a first offset, a first length, and a first data structure of append requests for the key-value pair, the second metadata including at least one of the new highest append index, a second offset, a second length, and a second data structure of append requests for the key-value pair, the second metadata also stored in a hash table in a memory; and determining the new highest append index for the key includes determining the new highest append index for the key from the second metadata in the hash table.

Statement 56. An embodiment of the inventive concept includes the method according to statement 54, further comprising storing a second metadata associated with the key in the hash table in the memory, the second metadata including at least one of the new highest append index, a second offset, a second length, and a second data structure of append requests for the key-value pair.

Statement 57. An embodiment of the inventive concept includes the method according to statement 56, wherein storing the second metadata in a hash table in a memory includes evicting an exiting metadata associated with a second key from the hash table.

Statement 58. An embodiment of the inventive concept includes the method according to statement 57, wherein evicting an exiting metadata associated with a second key from the hash table includes selecting the second key as a least recently used key in the hash table.

Statement 59. An embodiment of the inventive concept includes the method according to statement 56, wherein storing the second metadata in a hash table in a memory, the second metadata associated with the key includes:

determining that the hash table does not store the second metadata associated with the key; and accessing the second metadata from the KV-SSD responsive to the new highest append index for the key.

Statement 60. An embodiment of the inventive concept includes the method according to statement 59, wherein determining the highest append index for the key includes systematically requesting data associated with keys from the KV-SSD until the new highest append index for the key is determined.

Statement 61. An embodiment of the inventive concept includes the method according to statement 60, wherein systematically requesting data associated with keys from the KV-SSD until the new highest append index for the key is determined includes:

determining a highest possible append index for the key;

combining the highest possible append index for the key with the key to produce a test key; and attempting to access the data associated the test key.

Statement 62. An embodiment of the inventive concept includes the method according to statement 61, wherein systematically requesting data associated with keys from the KV-SSD until the highest append index for the key is determined further includes:

decrementing the highest possible append index for the key to produce a new possible append index;

combining the new possible append index for the key with the key to produce a new test key;

attempting to access the data associated with the new test key; and based at least in part on the KV-SSD response to the attempt to access the data associated with the new test key, repeating the operations of decrementing the highest possible append index for the key, combining the new possible append index for the key with the key, and attempting to access the data until the KV-SSD reports data associated with the new test key.

Statement 63. An embodiment of the inventive concept includes the method according to statement 60, wherein systematically requesting data associated with keys from the KV-SSD until the new highest append index for the key is determined includes:

determining a range of possible highest append indices for the key;

selecting a middle append index in the middle of the range of possible highest append indices for the key;

combining the middle append index with the key to produce a test key;

attempting to access the data associated with the test key;

based at least in part on part on the KV-SSD response to the attempt to access the data associated with the test key, narrowing the range of possible highest append indices for the key to one of a first half range and a second half range; and repeating the operations of selecting a middle append index, combining the middle append index with the key, narrowing the range of possible highest append indices for the key, and attempting to access the data associated with the test key until the range includes a single possible highest append index.

Statement 64. An embodiment of the inventive concept includes the method according to statement 59, wherein determining the new highest append index for the key includes accessing the new highest append index for the key from an index object for the key on the KV-SSD.

Statement 65. An embodiment of the inventive concept includes the method according to statement 56, further comprising, based at least in part on the key being selected for eviction from the hash table, storing the new highest append index in an index object for the key on the KV-SSD.

Statement 66. An embodiment of the inventive concept includes the method according to statement 54, further comprising returning the new highest append index to the application.

Statement 67. An embodiment of the inventive concept includes the method according to statement 66, wherein returning the new highest append index to the application includes returning the new highest append index to the application before returning the value to the application in response to the read request.

Statement 68. An embodiment of the inventive concept includes the method according to statement 38, further comprising:

receiving a delete request from the application to delete a value associated with a key on a Key-Value Solid State Drive (KV-SSD) as a key-value pair;

determining a base index for the key;

combining the base index with the key to produce a first indexed key;

performing a first delete operation on the KV-SSD for the first indexed key;

determining at least one append index for the key;

combining the at least one append index with the key to produce at least one second indexed key; and performing at least one second delete operation on the KV-SSD for the at least one second indexed key.

Statement 69. An embodiment of the inventive concept includes the method according to statement 68, further comprising returning a delete result of the first delete operation and the at least one second delete operation to the application.

Statement 70. An embodiment of the inventive concept includes the method according to statement 68, further comprising:

locating a metadata in a hash table in a memory, the metadata associated with the key; and removing the metadata from the hash table in the memory.

Statement 71. An embodiment of the inventive concept includes the method according to statement 68, further comprising:

identifying an index object for the key stored on the KV-SSD; and deleting the index object for the key from the KV-SSD.

Statement 72. An embodiment of the inventive concept includes a method comprising:

receiving an append request from an application to append a second value to a value associated with a key on a Key-Value Solid State Drive (KV-SSD) as a key-value pair, the application being executed by a processor;

determining a highest append index for the key;

incrementing the highest append index to produce a new highest append index;

combining the new highest append index with the key to produce an append indexed key; and performing a second store operation on the KV-SSD associating the append indexed key with the second value.

Statement 73. An embodiment of the inventive concept includes the method according to statement 72, further comprising returning an append result of the second store operation to the application.

Statement 74. An embodiment of the inventive concept includes the method according to statement 72, wherein:

the KV-SSD stores a first metadata associated with the key, the first metadata including at least one of the highest append index, a first offset, a first length, and a first data structure of append requests for the key-value pair;

the method further comprises:

establishing a second metadata for the key; and combining the second value with the second metadata to produce a second modified value; and performing a second store operation on the KV-SSD associating the append indexed key with the second value includes performing the second store operation on the KV-SSD associating the append indexed key with the second modified value.

Statement 75. An embodiment of the inventive concept includes the method according to statement 74, wherein the second metadata includes the new highest append index for the key.

Statement 76. An embodiment of the inventive concept includes the method according to statement 75, wherein the second metadata further includes a second append offset and a second append length.

Statement 77. An embodiment of the inventive concept includes the method according to statement 75, wherein the second metadata further includes a second data structure of append requests for the key-value pair.

Statement 78. An embodiment of the inventive concept includes the method according to statement 75, further comprising storing the second metadata in a hash table in a memory, the second metadata associated with the key.

Statement 79. An embodiment of the inventive concept includes the method according to statement 78, wherein storing the second metadata in a hash table in a memory includes evicting an exiting metadata associated with a second key from the hash table.

Statement 80. An embodiment of the inventive concept includes the method according to statement 79, wherein evicting an exiting metadata associated with a second key from the hash table includes selecting the second key as a least recently used key in the hash table.

Statement 81. An embodiment of the inventive concept includes the method according to statement 78, wherein storing the second metadata in a hash table in a memory, the second metadata associated with the key includes:

determining that the hash table does not store the first metadata associated with the key;

determining the highest append index for the key; and accessing the first metadata from the KV-SSD responsive to the highest append index for the key.

Statement 82. An embodiment of the inventive concept includes the method according to statement 81, wherein determining the highest append index for the key includes systematically requesting data associated with keys from the KV-SSD until the highest append index for the key is determined.

Statement 83. An embodiment of the inventive concept includes the method according to statement 82, wherein systematically requesting data associated with keys from the KV-SSD until the highest append index for the key is determined includes:

determining a highest possible append index for the key;

combining the highest possible append index for the key with the key to produce a test key; and attempting to access the data associated the test key.

Statement 84. An embodiment of the inventive concept includes the method according to statement 83, wherein systematically requesting data associated with keys from the KV-SSD until the highest append index for the key is determined further includes:

decrementing the highest possible append index for the key to produce a new possible append index;

combining the new possible append index for the key with the key to produce a new test key;

attempting to access the data associated with the new test key; and based at least in part on the KV-SSD response to the attempt to access the data associated with the new test key, repeating the operations of decrementing the highest possible append index for the key, combining the new possible append index for the key with the key, and attempting to access the data until the KV-SSD reports data associated with the new test key.

Statement 85. An embodiment of the inventive concept includes the method according to statement 82, wherein systematically requesting data associated with keys from the KV-SSD until the highest append index for the key is determined includes:

determining a range of possible highest append indices for the key;

selecting a middle append index in the middle of the range of possible highest append indices for the key;

combining the middle append index with the key to produce a test key;

attempting to access the data associated with the test key;

based at least in part on part on the KV-SSD response to the attempt to access the data associated with the test key, narrowing the range of possible highest append indices for the key to one of a first half range and a second half range; and repeating the operations of selecting a middle append index, combining the middle append index with the key, narrowing the range of possible highest append indices for the key, and attempting to access the data associated with the test key until the range includes a single possible highest append index.

Statement 86. An embodiment of the inventive concept includes the method according to statement 81, wherein determining the highest append index for the key includes accessing the highest append index for the key from an index object for the key on the KV-SSD.

Statement 87. An embodiment of the inventive concept includes the method according to statement 78, further comprising, based at least in part on the key being selected for eviction from the hash table, storing the new highest append index in an index object for the key on the KV-SSD.

Statement 88. An embodiment of the inventive concept includes a method, comprising:

receiving a read request from an application to read a value associated with a key from a Key-Value Solid State Drive (KV-SSD) as a key-value pair, the application being executed by a processor;

determining a base index for the key;

determining a highest append index for the key;

combining each index from the base index for the key to the highest append index for the key with the key to produce at least two indexed keys;

performing a read operation on the KV-SSD for each of the at least two indexed keys, producing at least two read values;

combining the at least two read values to produce the value; and returning the value to the application in response to the read request.

Statement 89. An embodiment of the inventive concept includes the method according to statement 88, wherein:

the KV-SSD stores a first metadata associated with the key and a second metadata associated with the key, the first metadata including at least one of the first append index, a first offset, a first length, and a first data structure of append requests for the key-value pair, the second metadata including at least one of the highest append index, a second offset, a second length, and a second data structure of append requests for the key-value pair, the second metadata also stored in a hash table in a memory; and determining a highest append index for the key includes determining the highest append index for the key from the second metadata in the hash table.

Statement 90. An embodiment of the inventive concept includes the method according to statement 88, further comprising storing a second metadata in the hash table in the memory, the second metadata including at least one of the highest append index, a second offset, a second length, and a second data structure of append requests for the key-value pair.

Statement 91. An embodiment of the inventive concept includes the method according to statement 90, wherein storing the second metadata in a hash table in a memory includes evicting an exiting metadata associated with a second key from the hash table.

Statement 92. An embodiment of the inventive concept includes the method according to statement 91, wherein evicting an exiting metadata associated with a second key from the hash table includes selecting the second key as a least recently used key in the hash table.

Statement 93. An embodiment of the inventive concept includes the method according to statement 90, wherein storing the second metadata in a hash table in a memory, the second metadata associated with the key includes:

determining that the hash table does not store the second metadata associated with the key; and accessing the second metadata from the KV-SSD responsive to the highest append index for the key.

Statement 94. An embodiment of the inventive concept includes the method according to statement 93, wherein determining the highest append index for the key includes systematically requesting data associated with keys from the KV-SSD until the highest append index for the key is determined.

Statement 95. An embodiment of the inventive concept includes the method according to statement 94, wherein systematically requesting data associated with keys from the KV-SSD until the highest append index for the key is determined includes:

determining a highest possible append index for the key;

combining the highest possible append index for the key with the key to produce a test key; and attempting to access the data associated the test key.

Statement 96. An embodiment of the inventive concept includes the method according to statement 95, wherein systematically requesting data associated with keys from the KV-SSD until the highest append index for the key is determined further includes:

decrementing the highest possible append index for the key to produce a new possible append index;

combining the new possible append index for the key with the key to produce a new test key;

attempting to access the data associated with the new test key; and based at least in part on the KV-SSD response to the attempt to access the data associated with the new test key, repeating the operations of decrementing the highest possible append index for the key, combining the new possible append index for the key with the key, and attempting to access the data until the KV-SSD reports data associated with the new test key.

Statement 97. An embodiment of the inventive concept includes the method according to statement 94, wherein systematically requesting data associated with keys from the KV-SSD until the highest append index for the key is determined includes:

determining a range of possible highest append indices for the key;

selecting a middle append index in the middle of the range of possible highest append indices for the key;

combining the middle append index with the key to produce a test key;

attempting to access the data associated with the test key;

based at least in part on part on the KV-SSD response to the attempt to access the data associated with the test key, narrowing the range of possible highest append indices for the key to one of a first half range and a second half range; and repeating the operations of selecting a middle append index, combining the middle append index with the key, narrowing the range of possible highest append indices for the key, and attempting to access the data associated with the test key until the range includes a single possible highest append index.

Statement 98. An embodiment of the inventive concept includes the method according to statement 93, wherein determining the highest append index for the key includes accessing the highest append index for the key from an index object for the key on the KV-SSD.

Statement 99. An embodiment of the inventive concept includes the method according to statement 90, further comprising, based at least in part on the key being selected for eviction from the hash table, storing the highest append index in an index object for the key on the KV-SSD.

Statement 100. An embodiment of the inventive concept includes the method according to statement 88, further comprising returning the highest append index to the application.

Statement 101. An embodiment of the inventive concept includes the method according to statement 100, wherein returning the highest append index to the application includes returning the highest append index to the application before returning the value to the application in response to the read request.

Statement 102. An embodiment of the inventive concept includes a method, comprising:
 receiving a delete request from an application to delete a value associated with a key on a Key-Value Solid State Drive (KV-SSD) as a key-value pair, the application being executed by a processor;
 determining a base index for the key;
 combining the base index with the key to produce a first indexed key;
 performing a delete operation on the KV-SSD for the first indexed key;
 determining at least one append index for the key;
 combining the at least one append index with the key to produce at least one second indexed key; and
 performing at least one delete operation on the KV-SSD for the at least one second indexed key.

Statement 103. An embodiment of the inventive concept includes the method according to statement 102, further comprising returning a delete result of the first delete operation and the at least one second delete operation to the application.

Statement 104. An embodiment of the inventive concept includes the method according to statement 102, further comprising:
 locating a metadata in a hash table in a memory, the metadata associated with the key; and
 removing the metadata from the hash table in the memory.

Statement 105. An embodiment of the inventive concept includes the method according to statement 102, further comprising:
 identifying an index object for the key stored on the KV-SSD; and
 deleting the index object for the key from the KV-SSD.

Statement 106. An embodiment of the inventive concept includes an article, comprising a non-transitory storage medium, the non-transitory storage medium having stored thereon instructions that, when executed by a machine, result in:
 receiving a write request from an application to store a value associated with a key on a Key-Value Solid State Drive (KV-SSD) as a key-value pair, the application being executed by a processor;
 determining a base index for the key;
 combining the base index with the key to produce an indexed key; and
 performing a store operation on the KV-SSD associating the indexed key with the value.

Statement 107. An embodiment of the inventive concept includes the article according to statement 106, the non-transitory storage medium having stored thereon further instructions that, when executed by the machine, result in returning a write result of the store operation to the application.

Statement 108. An embodiment of the inventive concept includes the article according to statement 106, wherein:
 the method further comprises:
 establishing a first metadata for the key; and
 combining the value with the first metadata to produce a first modified value; and
 performing a store operation on the KV-SSD associating the indexed key with the value includes performing the store operation on the KV-SSD associating the indexed key with the first modified value.

Statement 109. An embodiment of the inventive concept includes the article according to statement 108, wherein the first metadata includes the base index for the key.

Statement 110. An embodiment of the inventive concept includes the article according to statement 109, wherein the first metadata further includes a first append offset and a first append length.

Statement 111. An embodiment of the inventive concept includes the article according to statement 109, wherein the first metadata further includes a first data structure of append write requests for the key-value pair.

Statement 112. An embodiment of the inventive concept includes the article according to statement 109, the non-transitory storage medium having stored thereon further instructions that, when executed by the machine, result in storing the first metadata in a hash table in a memory, the first metadata associated with the key.

Statement 113. An embodiment of the inventive concept includes the article according to statement 112, wherein storing the first metadata in a hash table in a memory includes evicting an exiting metadata associated with a second key from the hash table.

Statement 114. An embodiment of the inventive concept includes the article according to statement 113, wherein evicting an exiting metadata associated with a second key from the hash table includes selecting the second key as a least recently used key in the hash table.

Statement 115. An embodiment of the inventive concept includes the article according to statement 106, wherein:
 the method further comprises, based at least in part on the value exceeding a maximum size for an object on the KV-SSD, determining a number of objects needed to store the value;
 combining the base index with the key to produce an indexed key includes combining a plurality of indices with the key to produce a plurality of indexed keys, wherein the plurality of indexed keys is at least as large as the number of objects needed to store the value; and
 performing a store operation on the KV-SSD associating the indexed key with the value includes performing a plurality of store operations on the KV-SSD associating each of the plurality of indexed keys with a portion of the value.

Statement 116. An embodiment of the inventive concept includes the article according to statement 106, the non-transitory storage medium having stored thereon further instructions that, when executed by the machine, result in bypassing the operations of determining a base index for the key, combining the base index with the key to produce an indexed key, and performing a store operation on the KV-SSD associating the indexed key with the value and instead performing a conventional store operation on the KV-SSD associating the key with the value.

Statement 117. An embodiment of the inventive concept includes the article according to statement 116, wherein bypassing the operations of determining a base index for the key, combining the base index with the key to produce an indexed key, and performing a store operation on the KV-SSD associating the indexed key with the value and instead performing a conventional store operation on the KV-SSD associating the key with the value is based at least in part on the write request specifying a conventional store operation.

Statement 118. An embodiment of the inventive concept includes the article according to statement 106, the non-transitory storage medium having stored thereon further instructions that, when executed by the machine, result in:
  receiving an append request from the application to append a second value to the value associated with the key on the KV-SSD;
  determining a highest append index for the key;
  incrementing the highest append index to produce a new highest append index;
  combining the new highest append index with the key to produce an append indexed key; and
  performing a second store operation on the KV-SSD associating the append indexed key with the second value.

Statement 119. An embodiment of the inventive concept includes the article according to statement 118, the non-transitory storage medium having stored thereon further instructions that, when executed by the machine, result in returning an append result of the second store operation to the application.

Statement 120. An embodiment of the inventive concept includes the article according to statement 118, wherein:
  the method further comprises:
  establishing a second metadata for the key; and
  combining the second value with the second metadata to
    produce a second modified value; and
  performing a second store operation on the KV-SSD associating the append indexed key with the second value includes performing the second store operation on the KV-SSD associating the append indexed key with the second modified value.

Statement 121. An embodiment of the inventive concept includes the article according to statement 120, wherein the second metadata includes the append index for the key.

Statement 122. An embodiment of the inventive concept includes the article according to statement 121, wherein the second metadata further includes a second append offset and a second append length.

Statement 123. An embodiment of the inventive concept includes the article according to statement 121, wherein the second metadata further includes a second data structure of append requests for the key-value pair.

Statement 124. An embodiment of the inventive concept includes the article according to statement 121, the non-transitory storage medium having stored thereon further instructions that, when executed by the machine, result in storing the second metadata in a hash table in a memory, the second metadata associated with the key.

Statement 125. An embodiment of the inventive concept includes the article according to statement 124, wherein storing the second metadata in a hash table in a memory includes evicting an exiting metadata associated with a second key from the hash table.

Statement 126. An embodiment of the inventive concept includes the article according to statement 125, wherein evicting an exiting metadata associated with a second key from the hash table includes selecting the second key as a least recently used key in the hash table.

Statement 127. An embodiment of the inventive concept includes the article according to statement 124, wherein storing the second metadata in a hash table in a memory, the second metadata associated with the key includes:
  determining that the hash table does not store the first metadata associated with the key;
  determining the highest append index for the key; and
  accessing the first metadata from the KV-SSD responsive to the highest append index for the key.

Statement 128. An embodiment of the inventive concept includes the article according to statement 127, wherein determining the highest append index for the key includes systematically requesting data associated with keys from the KV-SSD until the highest append index for the key is determined.

Statement 129. An embodiment of the inventive concept includes the article according to statement 128, wherein systematically requesting data associated with keys from the KV-SSD until the highest append index for the key is determined includes:
  determining a highest possible append index for the key;
  combining the highest possible append index for the key with the key to produce a test key; and
  attempting to access the data associated the test key.

Statement 130. An embodiment of the inventive concept includes the article according to statement 129, wherein systematically requesting data associated with keys from the KV-SSD until the highest append index for the key is determined further includes:
  decrementing the highest possible append index for the key to produce a new possible append index;
  combining the new possible append index for the key with the key to produce a new test key;
  attempting to access the data associated with the new test key; and
  based at least in part on the KV-SSD response to the attempt to access the data associated with the new test key, repeating the operations of decrementing the highest possible append index for the key, combining the new possible append index for the key with the key, and attempting to access the data until the KV-SSD reports data associated with the new test key.

Statement 131. An embodiment of the inventive concept includes the article according to statement 128, wherein systematically requesting data associated with keys from the KV-SSD until the highest append index for the key is determined includes:
  determining a range of possible highest append indices for the key;
  selecting a middle append index in the middle of the range of possible highest append indices for the key;
  combining the middle append index with the key to produce a test key;
  attempting to access the data associated with the test key;
  based at least in part on part on the KV-SSD response to the attempt to access the data associated with the test key, narrowing the range of possible highest append indices for the key to one of a first half range and a second half range; and
  repeating the operations of selecting a middle append index, combining the middle append index with the key, narrowing the range of possible highest append indices for the key, and attempting to access the data associated with the test key until the range includes a single possible highest append index.

Statement 132. An embodiment of the inventive concept includes the article according to statement 127, wherein determining the highest append index for the key includes accessing the highest append index for the key from an index object for the key on the KV-SSD.

Statement 133. An embodiment of the inventive concept includes the article according to statement 124, the non-transitory storage medium having stored thereon further instructions that, when executed by the machine, result in, based at least in part on the key being selected for eviction from the hash table, storing the new highest append index in an index object for the key on the KV-SSD.

Statement 134. An embodiment of the inventive concept includes the article according to statement 118, the non-transitory storage medium having stored thereon further instructions that, when executed by the machine, result in:
 receiving a read request from the application to read the value associated with the key from the KV-SSD;
 determining the base index for the key;
 determining the new highest append index for the key;
 combining each index from the base index for the key to the new highest append index for the key with the key to produce at least two indexed keys;
 performing a read operation on the KV-SSD for each of the at least two indexed keys, producing at least two read values;
 combining the at least two read values to produce the value; and
 returning the value to the application in response to the read request.

Statement 135. An embodiment of the inventive concept includes the article according to statement 134, wherein:
 the KV-SSD stores a first metadata associated with the key and a second metadata associated with the key, the first metadata including at least one of the first append index, a first offset, a first length, and a first data structure of append requests for the key-value pair, the second metadata including at least one of the new highest append index, a second offset, a second length, and a second data structure of append requests for the key-value pair, the second metadata also stored in a memory; and
 determining the new highest append index for the key includes determining the new highest append index for the key from the second metadata in the hash table.

Statement 136. An embodiment of the inventive concept includes the article according to statement 134, the non-transitory storage medium having stored thereon further instructions that, when executed by the machine, result in storing a second metadata associated with the key in the hash table in the memory, the second metadata including at least one of the new highest append index, a second offset, a second length, and a second data structure of append requests for the key-value pair.

Statement 137. An embodiment of the inventive concept includes the article according to statement 136, wherein storing the second metadata in a hash table in a memory includes evicting an exiting metadata associated with a second key from the hash table.

Statement 138. An embodiment of the inventive concept includes the article according to statement 137, wherein evicting an exiting metadata associated with a second key from the hash table includes selecting the second key as a least recently used key in the hash table.

Statement 139. An embodiment of the inventive concept includes the article according to statement 136, wherein storing the second metadata in a hash table in a memory, the second metadata associated with the key includes:
 determining that the hash table does not store the second metadata associated with the key; and
 accessing the second metadata from the KV-SSD responsive to the new highest append index for the key.

Statement 140. An embodiment of the inventive concept includes the article according to statement 139, wherein determining the highest append index for the key includes systematically requesting data associated with keys from the KV-SSD until the new highest append index for the key is determined.

Statement 141. An embodiment of the inventive concept includes the article according to statement 140, wherein systematically requesting data associated with keys from the KV-SSD until the new highest append index for the key is determined includes:
 determining a highest possible append index for the key;
 combining the highest possible append index for the key with the key to produce a test key; and
 attempting to access the data associated the test key.

Statement 142. An embodiment of the inventive concept includes the article according to statement 141, wherein systematically requesting data associated with keys from the KV-SSD until the highest append index for the key is determined further includes:
 decrementing the highest possible append index for the key to produce a new possible append index;
 combining the new possible append index for the key with the key to produce a new test key;
 attempting to access the data associated with the new test key; and
 based at least in part on the KV-SSD response to the attempt to access the data associated with the new test key, repeating the operations of decrementing the highest possible append index for the key, combining the new possible append index for the key with the key, and attempting to access the data until the KV-SSD reports data associated with the new test key.

Statement 143. An embodiment of the inventive concept includes the article according to statement 140, wherein systematically requesting data associated with keys from the KV-SSD until the new highest append index for the key is determined includes:
 determining a range of possible highest append indices for the key;
 selecting a middle append index in the middle of the range of possible highest append indices for the key;
 combining the middle append index with the key to produce a test key;
 attempting to access the data associated with the test key;
 based at least in part on part on the KV-SSD response to the attempt to access the data associated with the test key, narrowing the range of possible highest append indices for the key to one of a first half range and a second half range; and
 repeating the operations of selecting a middle append index, combining the middle append index with the key, narrowing the range of possible highest append indices for the key, and attempting to access the data associated with the test key until the range includes a single possible highest append index.

Statement 144. An embodiment of the inventive concept includes the article according to statement 139, wherein determining the new highest append index for the key includes accessing the new highest append index for the key from an index object for the key on the KV-SSD.

Statement 145. An embodiment of the inventive concept includes the article according to statement 136, the non-transitory storage medium having stored thereon further instructions that, when executed by the machine, result in, based at least in part on the key being selected for eviction from the hash table, storing the new highest append index in an index object for the key on the KV-SSD.

Statement 146. An embodiment of the inventive concept includes the article according to statement 134, the non-transitory storage medium having stored thereon further instructions that, when executed by the machine, result in returning the new highest append index to the application.

Statement 147. An embodiment of the inventive concept includes the article according to statement 146, wherein returning the new highest append index to the application includes returning the new highest append index to the application before returning the value to the application in response to the read request.

Statement 148. An embodiment of the inventive concept includes the article according to statement 118, the non-transitory storage medium having stored thereon further instructions that, when executed by the machine, result in:
receiving a delete request from the application to delete a value associated with a key on a Key-Value Solid State Drive (KV-SSD) as a key-value pair;
determining a base index for the key;
combining the base index with the key to produce a first indexed key;
performing a first delete operation on the KV-SSD for the first indexed key;
determining at least one append index for the key;
combining the at least one append index with the key to produce at least one second indexed key; and
performing at least one second delete operation on the KV-SSD for the at least one second indexed key.

Statement 149. An embodiment of the inventive concept includes the article according to statement 148, the non-transitory storage medium having stored thereon further instructions that, when executed by the machine, result in returning a delete result of the first delete operation and the at least one second delete operation to the application.

Statement 150. An embodiment of the inventive concept includes the article according to statement 148, the non-transitory storage medium having stored thereon further instructions that, when executed by the machine, result in:
locating a metadata in a hash table in a memory, the metadata associated with the key; and
removing the metadata from the hash table in the memory.

Statement 151. An embodiment of the inventive concept includes the article according to statement 148, the non-transitory storage medium having stored thereon further instructions that, when executed by the machine, result in:
identifying an index object for the key stored on the KV-SSD; and
deleting the index object for the key from the KV-SSD.

Statement 152. An embodiment of the inventive concept includes an article, comprising a non-transitory storage medium, the non-transitory storage medium having stored thereon instructions that, when executed by a machine, result in:
receiving an append request from an application to append a second value to a value associated with a key on a Key-Value Solid State Drive (KV-SSD) as a key-value pair, the application being executed by a processor;
determining a highest append index for the key;
incrementing the highest append index to produce a new highest append index;
combining the new highest append index with the key to produce an append indexed key; and
performing a second store operation on the KV-SSD associating the append indexed key with the second value.

Statement 153. An embodiment of the inventive concept includes the article according to statement 152, the non-transitory storage medium having stored thereon further instructions that, when executed by the machine, result in returning an append result of the second store operation to the application.

Statement 154. An embodiment of the inventive concept includes the article according to statement 152, wherein:
the KV-SSD stores a first metadata associated with the key, the first metadata including at least one of the highest append index, a first offset, a first length, and a first data structure of append requests for the key-value pair;
the method further comprises:
establishing a second metadata for the key; and
combining the second value with the second metadata to produce a second modified value; and
performing a second store operation on the KV-SSD associating the append indexed key with the second value includes performing the second store operation on the KV-SSD associating the append indexed key with the second modified value.

Statement 155. An embodiment of the inventive concept includes the article according to statement 154, wherein the second metadata includes the new highest append index for the key.

Statement 156. An embodiment of the inventive concept includes the article according to statement 155, wherein the second metadata further includes a second append offset and a second append length.

Statement 157. An embodiment of the inventive concept includes the article according to statement 155, wherein the second metadata further includes a second data structure of append requests for the key-value pair.

Statement 158. An embodiment of the inventive concept includes the article according to statement 155, the non-transitory storage medium having stored thereon further instructions that, when executed by the machine, result in storing the second metadata in a hash table in a memory, the second metadata associated with the key.

Statement 159. An embodiment of the inventive concept includes the article according to statement 158, wherein storing the second metadata in a hash table in a memory includes evicting an exiting metadata associated with a second key from the hash table.

Statement 160. An embodiment of the inventive concept includes the article according to statement 159, wherein evicting an exiting metadata associated with a second key from the hash table includes selecting the second key as a least recently used key in the hash table.

Statement 161. An embodiment of the inventive concept includes the article according to statement 158, wherein storing the second metadata in a hash table in a memory, the second metadata associated with the key includes:
determining that the hash table does not store the first metadata associated with the key;
determining the highest append index for the key; and
accessing the first metadata from the KV-SSD responsive to the highest append index for the key.

Statement 162. An embodiment of the inventive concept includes the article according to statement 161, wherein determining the highest append index for the key includes systematically requesting data associated with keys from the KV-SSD until the highest append index for the key is determined.

Statement 163. An embodiment of the inventive concept includes the article according to statement 162, wherein systematically requesting data associated with keys from the KV-SSD until the highest append index for the key is determined includes:
  determining a highest possible append index for the key;
  combining the highest possible append index for the key with the key to produce a test key; and
  attempting to access the data associated the test key.

Statement 164. An embodiment of the inventive concept includes the article according to statement 163, wherein systematically requesting data associated with keys from the KV-SSD until the highest append index for the key is determined further includes:
  decrementing the highest possible append index for the key to produce a new possible append index;
  combining the new possible append index for the key with the key to produce a new test key;
  attempting to access the data associated with the new test key; and
  based at least in part on the KV-SSD response to the attempt to access the data associated with the new test key, repeating the operations of decrementing the highest possible append index for the key, combining the new possible append index for the key with the key, and attempting to access the data until the KV-SSD reports data associated with the new test key.

Statement 165. An embodiment of the inventive concept includes the article according to statement 162, wherein systematically requesting data associated with keys from the KV-SSD until the highest append index for the key is determined includes:
  determining a range of possible highest append indices for the key;
  selecting a middle append index in the middle of the range of possible highest append indices for the key;
  combining the middle append index with the key to produce a test key;
  attempting to access the data associated with the test key;
  based at least in part on part on the KV-SSD response to the attempt to access the data associated with the test key, narrowing the range of possible highest append indices for the key to one of a first half range and a second half range; and
  repeating the operations of selecting a middle append index, combining the middle append index with the key, narrowing the range of possible highest append indices for the key, and attempting to access the data associated with the test key until the range includes a single possible highest append index.

Statement 166. An embodiment of the inventive concept includes the article according to statement 161, wherein determining the highest append index for the key includes accessing the highest append index for the key from an index object for the key on the KV-SSD.

Statement 167. An embodiment of the inventive concept includes the article according to statement 158, the non-transitory storage medium having stored thereon further instructions that, when executed by the machine, result in, based at least in part on the key being selected for eviction from the hash table, storing the new highest append index in an index object for the key on the KV-SSD.

Statement 168. An embodiment of the inventive concept includes an article, comprising a non-transitory storage medium, the non-transitory storage medium having stored thereon instructions that, when executed by a machine, result in:
  receiving a read request from an application to read a value associated with a key from a Key-Value Solid State Drive (KV-SSD) as a key-value pair, the application being executed by a processor;
  determining a base index for the key;
  determining a highest append index for the key;
  combining each index from the base index for the key to the highest append index for the key with the key to produce at least two indexed keys;
  performing a read operation on the KV-SSD for each of the at least two indexed keys, producing at least two read values;
  combining the at least two read values to produce the value; and
  returning the value to the application in response to the read request.

Statement 169. An embodiment of the inventive concept includes the article according to statement 168, wherein:
  the KV-SSD stores a first metadata associated with the key and a second metadata associated with the key, the first metadata including at least one of the first append index, a first offset, a first length, and a first data structure of append requests for the key-value pair, the second metadata including at least one of the highest append index, a second offset, a second length, and a second data structure of append requests for the key-value pair, the second metadata also stored in a hash table in a memory; and
  determining a highest append index for the key includes determining the highest append index for the key from the second metadata in the hash table.

Statement 170. An embodiment of the inventive concept includes the article according to statement 168, the non-transitory storage medium having stored thereon further instructions that, when executed by the machine, result in storing a second metadata in the hash table in the memory, the second metadata including at least one of the highest append index, a second offset, a second length, and a second data structure of append requests for the key-value pair.

Statement 171. An embodiment of the inventive concept includes the article according to statement 170, wherein storing the second metadata in a hash table in a memory includes evicting an exiting metadata associated with a second key from the hash table.

Statement 172. An embodiment of the inventive concept includes the article according to statement 171, wherein evicting an exiting metadata associated with a second key from the hash table includes selecting the second key as a least recently used key in the hash table.

Statement 173. An embodiment of the inventive concept includes the article according to statement 170, wherein storing the second metadata in a hash table in a memory, the second metadata associated with the key includes:
  determining that the hash table does not store the second metadata associated with the key; and
  accessing the second metadata from the KV-SSD responsive to the highest append index for the key.

Statement 174. An embodiment of the inventive concept includes the article according to statement 173, wherein determining the highest append index for the key includes systematically requesting data associated with keys from the KV-SSD until the highest append index for the key is determined.

Statement 175. An embodiment of the inventive concept includes the article according to statement 174, wherein systematically requesting data associated with keys from the KV-SSD until the highest append index for the key is determined includes:
  determining a highest possible append index for the key;
  combining the highest possible append index for the key with the key to produce a test key; and
  attempting to access the data associated the test key.

Statement 176. An embodiment of the inventive concept includes the article according to statement 175, wherein systematically requesting data associated with keys from the KV-SSD until the highest append index for the key is determined further includes:
  decrementing the highest possible append index for the key to produce a new possible append index;
  combining the new possible append index for the key with the key to produce a new test key;
  attempting to access the data associated with the new test key; and
  based at least in part on the KV-SSD response to the attempt to access the data associated with the new test key, repeating the operations of decrementing the highest possible append index for the key, combining the new possible append index for the key with the key, and attempting to access the data until the KV-SSD reports data associated with the new test key.

Statement 177. An embodiment of the inventive concept includes the article according to statement 174, wherein systematically requesting data associated with keys from the KV-SSD until the highest append index for the key is determined includes:
  determining a range of possible highest append indices for the key;
  selecting a middle append index in the middle of the range of possible highest append indices for the key;
  combining the middle append index with the key to produce a test key;
  attempting to access the data associated with the test key;
  based at least in part on part on the KV-SSD response to the attempt to access the data associated with the test key, narrowing the range of possible highest append indices for the key to one of a first half range and a second half range; and
  repeating the operations of selecting a middle append index, combining the middle append index with the key, narrowing the range of possible highest append indices for the key, and attempting to access the data associated with the test key until the range includes a single possible highest append index.

Statement 178. An embodiment of the inventive concept includes the article according to statement 173, wherein determining the highest append index for the key includes accessing the highest append index for the key from an index object for the key on the KV-SSD.

Statement 179. An embodiment of the inventive concept includes the article according to statement 170, the non-transitory storage medium having stored thereon further instructions that, when executed by the machine, result in, based at least in part on the key being selected for eviction from the hash table, storing the highest append index in an index object for the key on the KV-SSD.

Statement 180. An embodiment of the inventive concept includes the article according to statement 168, the non-transitory storage medium having stored thereon further instructions that, when executed by the machine, result in returning the highest append index to the application.

Statement 181. An embodiment of the inventive concept includes the article according to statement 180, wherein returning the highest append index to the application includes returning the highest append index to the application before returning the value to the application in response to the read request.

Statement 182. An embodiment of the inventive concept includes an article, comprising a non-transitory storage medium, the non-transitory storage medium having stored thereon instructions that, when executed by a machine, result in:
  receiving a delete request from an application to delete a value associated with a key on a Key-Value Solid State Drive (KV-SSD) as a key-value pair, the application being executed by a processor;
  determining a base index for the key;
  combining the base index with the key to produce a first indexed key;
  performing a delete operation on the KV-SSD for the first indexed key;
  determining at least one append index for the key;
  combining the at least one append index with the key to produce at least one second indexed key; and
  performing at least one delete operation on the KV-SSD for the at least one second indexed key.

Statement 183. An embodiment of the inventive concept includes the article according to statement 182, the non-transitory storage medium having stored thereon further instructions that, when executed by the machine, result in returning a delete result of the first delete operation and the at least one second delete operation to the application.

Statement 184. An embodiment of the inventive concept includes the article according to statement 182, the non-transitory storage medium having stored thereon further instructions that, when executed by the machine, result in:
  locating a metadata in a hash table in a memory, the metadata associated with the key; and
  removing the metadata from the hash table in the memory.

Statement 185. An embodiment of the inventive concept includes the article according to statement 182, the non-transitory storage medium having stored thereon further instructions that, when executed by the machine, result in:
  identifying an index object for the key stored on the KV-SSD; and
  deleting the index object for the key from the KV-SSD.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. An article, comprising a non-transitory storage medium, the non-transitory storage medium having stored thereon instructions that, when executed by a machine, result in:
  receiving a request at an Application Programming Interface (API) from an application, the request relating to a key-value pair for a Key-Value Solid State Drive (KV-SSD), the key-value pair including a key and a value, the application being executed by a processor;
  concatenating the key with an index to produce an indexed key;
  the request includes a read request;
  executing an operation on the KV-SSD using the indexed key and the value includes reading at least two values associated with at least two indexed keys on the KV- SSD based on the read request and to combine the at least two values to produce the value.

2. The article according to claim 1, further comprising generating a metadata for the key.

3. The article according to claim 2, further comprising using a hash table in a memory storing the metadata associated with the key.

4. The article according to claim 1, wherein:
the request includes a delete request; and
executing the operation on the KV-SSD using the indexed key and the value includes deleting at least two indexed keys on the KV-SSD based on the delete request.

5. A method, comprising:
receiving a write request from an application to store a value associated with a key on a Key-Value Solid State Drive (KV-SSD) as a key-value pair, the application being executed by a processor;
determining a base index for the key;
concatenating the base index with the key to produce an indexed key;
performing a store operation on the KV-SSD associating the indexed key with the value;
establishing a first metadata for the key;
concatenating the value with the first metadata to produce a first modified value;
performing a store operation on the KV-SSD associating the indexed key with the value includes performing the store operation on the KV-SSD associating the indexed key with the first modified value.

6. The method according to claim 5, further comprising returning a write result of the store operation to the application.

7. The method according to claim 5, wherein the first metadata includes the base index for the key.

8. The method according to claim 7, further comprising storing the first metadata in a hash table in a memory, the first metadata associated with the key.

9. The method according to claim 5, wherein:
the method further comprises, based at least in part on the value exceeding a maximum size for an object on the KV-SSD, determining a number of objects needed to store the value;
concatenating the base index with the key to produce an indexed key includes concatenating at least two indices with the key to produce at least two indexed keys, wherein the at least two indexed keys is at least as large as the number of objects needed to store the value; and
performing a store operation on the KV-SSD associating the indexed key with the value includes:
performing a first store operation on the KV-SSD associating a first indexed key with a first portion of the value; and
performing a second store operation on the KV-SSD associating a second indexed key with a second portion of the value.

10. The method according to claim 5, further comprising:
receiving an append request from the application to append a second value to the value associated with the key on the KV-SSD;
determining a highest append index for the key;
incrementing the highest append index to produce a new highest append index;
concatenating the new highest append index with the key to produce an append indexed key; and
performing a second store operation on the KV-SSD associating the append indexed key with the second value.

11. A method comprising:
receiving an append request from an application to append a second value to a value associated with a key on a Key-Value Solid State Drive (KV-SSD) as a key-value pair, the application being executed by a processor;
determining a highest append index for the key;
incrementing the highest append index to produce a new highest append index;
combining the new highest append index with the key to produce an append indexed key; and
performing a second store operation on the KV-SSD associating the append indexed key with the second value.

12. The method according to claim 11, further comprising returning an append result of the second store operation to the application.

13. The method according to claim 11, wherein:
the KV-SSD stores a first metadata associated with the key, the first metadata including at least one of the highest append index, a first offset, a first length, and a first data structure of append requests for the key-value pair;
the method further comprises:
establishing a second metadata for the key; and
combining the second value with the second metadata to produce a second modified value; and
performing a second store operation on the KV-SSD associating the append indexed key with the second value includes performing the second store operation on the KV-SSD associating the append indexed key with the second modified value.

14. The method according to claim 13, wherein the second metadata includes the new highest append index for the key.

15. The method according to claim 14, further comprising storing the second metadata in a hash table in a memory, the second metadata associated with the key.

16. The method according to claim 15, wherein storing the second metadata in a hash table in a memory, the second metadata associated with the key includes:
determining that the hash table does not store the first metadata associated with the key;
determining the highest append index for the key; and
accessing the first metadata from the KV-SSD responsive to the highest append index for the key.

17. The method according to claim 16, wherein determining the highest append index for the key includes systematically requesting data associated with keys from the KV-SSD until the highest append index for the key is determined.

18. The method according to claim 17, wherein systematically requesting data associated with keys from the KV-SSD until the highest append index for the key is determined includes:
determining a range of possible highest append indices for the key;
selecting a middle append index in the middle of the range of possible highest append indices for the key;
combining the middle append index with the key to produce a test key;
attempting to access the data associated with the test key;
based at least in part on part on the KV-SSD response to the attempt to access the data associated with the test key, narrowing the range of possible highest append indices for the key to one of a first half range and a second half range; and repeating the operations of selecting a middle append index, combining the middle append index with the key, narrowing the range of possible highest append indices for the key, and attempting to access the data associated with the test key until the range includes a single possible highest append index.

\* \* \* \* \*